US012461713B2

(12) United States Patent
Ware et al.

(10) Patent No.: US 12,461,713 B2
(45) Date of Patent: Nov. 4, 2025

(54) MAC PROCESSING PIPELINES, CIRCUITRY TO CONFIGURE SAME, AND METHODS OF OPERATING SAME

(71) Applicant: Analog Devices, Inc., Wilmington, MA (US)

(72) Inventors: Frederick A. Ware, Los Altos Hills, CA (US); Cheng C. Wang, San Jose, CA (US)

(73) Assignee: Analog Devices, Inc., Wilmington, MA (US)

( * ) Notice: Subject to any disclaimer, the term of this patent is extended or adjusted under 35 U.S.C. 154(b) by 922 days.

(21) Appl. No.: 17/683,284

(22) Filed: Feb. 28, 2022

(65) Prior Publication Data

US 2022/0283779 A1    Sep. 8, 2022

Related U.S. Application Data

(60) Provisional application No. 63/156,263, filed on Mar. 3, 2021.

(51) Int. Cl.
*G06F 7/544* (2006.01)
*G06F 9/38* (2018.01)

(52) U.S. Cl.
CPC .......... *G06F 7/5443* (2013.01); *G06F 9/3893* (2013.01); *G06F 2207/3884* (2013.01)

(58) Field of Classification Search
CPC ........... G06F 7/5443; G06F 2207/3884; G06F 9/3893
See application file for complete search history.

(56) References Cited

U.S. PATENT DOCUMENTS 4,958,312 A    9/1990  Ang et al.
6,115,729 A    9/2000  Matheny et al.
(Continued)

FOREIGN PATENT DOCUMENTS

EP    0405726    3/1999
EP    2280341    6/2013
WO    WO 2018/126073    7/2018

OTHER PUBLICATIONS

Priyanka Nain, "Multiplier-Accumulator (MAC) Unit", IJDACR, vol. 5, Issue 3, Oct. 2016, 4 pages.
(Continued)

*Primary Examiner* — Matthew D Sandifer
(74) *Attorney, Agent, or Firm* — DLA Piper (US)

(57) ABSTRACT

An integrated circuit comprising a plurality MAC processors, interconnected into a linear pipeline, configurable to process input data, wherein each MAC processor includes (A) a multiplier and (B) an accumulator circuit, and (C) a plurality of rotate input data paths, wherein each rotate input data path couples two sequential MAC processors of the linear pipeline including an input of the multiplier circuit of a first MAC processor of sequential MAC processors to an input of the multiplier circuit of the immediately following MAC processor of the associated sequential MAC processors of the pipeline—wherein each rotate input data path is configurable to provide rotate input data from a first MAC processor of sequential MAC processors of the linear pipeline to the immediately following MAC processor of the associated sequential MAC processors thereby forming a serial circular path via the plurality of rotate input data paths.

20 Claims, 23 Drawing Sheets

(56) References Cited

U.S. PATENT DOCUMENTS

| | | | |
|---|---|---|---|
| 6,148,101 | A | 11/2000 | Tanaka et al. |
| 6,298,366 | B1 | 10/2001 | Gatherer et al. |
| 6,538,470 | B1 | 3/2003 | Langhammer et al. |
| 7,107,305 | B2 | 9/2006 | Deng et al. |
| 7,299,342 | B2 | 11/2007 | Nilsson et al. |
| 7,346,644 | B1 | 3/2008 | Langhammer et al. |
| 7,698,358 | B1 | 4/2010 | Langhammer et al. |
| 8,051,124 | B2 | 11/2011 | Salama et al. |
| 8,266,199 | B2 | 9/2012 | Langhammer et al. |
| 8,645,450 | B1 | 2/2014 | Choe et al. |
| 8,751,551 | B2 | 6/2014 | Streicher et al. |
| 8,788,562 | B2 | 7/2014 | Langhammer et al. |
| 9,600,278 | B1 | 3/2017 | Langhammer |
| 11,314,504 | B2 | 4/2022 | Ware et al. |
| 2003/0172101 | A1 | 9/2003 | Liao et al. |
| 2005/0144215 | A1* | 6/2005 | Simkins ............... G06F 7/5443 708/620 |
| 2007/0239967 | A1 | 10/2007 | Dally et al. |
| 2008/0211827 | A1 | 9/2008 | Donovan et al. |
| 2009/0094303 | A1 | 4/2009 | Katayama |
| 2014/0019727 | A1 | 1/2014 | Zhu et al. |
| 2014/0281370 | A1 | 9/2014 | Kahn |
| 2017/0011288 | A1 | 1/2017 | Brothers et al. |
| 2017/0115958 | A1 | 4/2017 | Langhammer |
| 2017/0116693 | A1 | 4/2017 | Rae et al. |
| 2017/0214929 | A1 | 7/2017 | Susnow et al. |
| 2017/0315778 | A1 | 11/2017 | Sano |
| 2017/0322813 | A1* | 11/2017 | Langhammer ........ G06F 9/3869 |
| 2017/0344876 | A1 | 11/2017 | Brothers |
| 2018/0052661 | A1 | 2/2018 | Langhammer |
| 2018/0081632 | A1 | 3/2018 | Langhammer |
| 2018/0081633 | A1 | 3/2018 | Langhammer |
| 2018/0157961 | A1 | 6/2018 | Henry et al. |
| 2018/0189651 | A1 | 7/2018 | Henry et al. |
| 2018/0300105 | A1 | 10/2018 | Langhammer |
| 2018/0314492 | A1 | 11/2018 | Fais et al. |
| 2018/0321909 | A1 | 11/2018 | Langhammer |
| 2018/0321910 | A1 | 11/2018 | Langhammer et al. |
| 2018/0341460 | A1 | 11/2018 | Langhammer |
| 2018/0341461 | A1 | 11/2018 | Langhammer |
| 2019/0042191 | A1 | 2/2019 | Langhammer |
| 2019/0042244 | A1 | 2/2019 | Henry et al. |
| 2019/0042544 | A1 | 2/2019 | Kashyap et al. |
| 2019/0079728 | A1 | 3/2019 | Langhammer et al. |
| 2019/0196786 | A1 | 6/2019 | Langhammer |
| 2019/0243610 | A1 | 8/2019 | Lin et al. |
| 2019/0250886 | A1 | 8/2019 | Langhammer |
| 2019/0286417 | A1 | 9/2019 | Langhammer |
| 2019/0310828 | A1 | 10/2019 | Langhammer et al. |
| 2019/0324722 | A1 | 10/2019 | Langhammer |
| 2019/0340489 | A1 | 11/2019 | Mills |
| 2019/0392297 | A1 | 12/2019 | Lau et al. |
| 2020/0004506 | A1 | 1/2020 | Langhammer et al. |
| 2020/0026493 | A1 | 1/2020 | Streicher et al. |
| 2020/0076435 | A1 | 3/2020 | Wang |
| 2020/0097799 | A1 | 3/2020 | Divakar et al. |
| 2020/0174750 | A1 | 6/2020 | Langhammer |
| 2020/0202198 | A1 | 6/2020 | Lee et al. |
| 2020/0310818 | A1 | 10/2020 | Ware et al. |
| 2020/0326939 | A1 | 10/2020 | Ware et al. |
| 2020/0326948 | A1 | 10/2020 | Langhammer |
| 2020/0401414 | A1 | 12/2020 | Ware et al. |
| 2021/0064568 | A1 | 3/2021 | Wang et al. |
| 2021/0081211 | A1 | 3/2021 | Wang |
| 2021/0103630 | A1 | 4/2021 | Ware et al. |
| 2021/0132905 | A1 | 5/2021 | Ware et al. |
| 2021/0173617 | A1 | 6/2021 | Ware et al. |
| 2021/0263993 | A1* | 8/2021 | Urbanski .............. G06F 7/5443 |
| 2021/0326286 | A1 | 10/2021 | Ware et al. |
| 2022/0027152 | A1 | 1/2022 | Ware et al. |
| 2022/0057994 | A1 | 2/2022 | Ware et al. |
| 2022/0171604 | A1 | 6/2022 | Ware et al. |
| 2022/0244917 | A1* | 8/2022 | Ware .................... G06F 7/5443 |

OTHER PUBLICATIONS

Jebashini et al., "A Survey and Comparative Analysis of Multiply-Accumulate (MAC) Block for Digital Signal Processing Application on ASIC and FPGA", Journal of Applied Science, vol. 15, Issue 7, pp. 934-946, Jul. 2015.

Agrawal et al., "A 7nm 4-Core AI Chip with 25.6TFLOPS Hybrid FP8 Training, 102.4TOPS INT4 Inference and Workload-Aware Throttling", ISSCC, pp. 144-145, 2021.

Choi et al., "Accurate and Efficient 2-Bit Quantized Neural Networks", Proceedings of $2^{nd}$ SysML Conf, 2019, 12 pages.

Sun et al., "Hybrid 8-bit Floating Point (HFP8) Training and Inference for Deep Neural Networks", NeurIPS 2019, 10 pages.

Nvidia A100 Tensor Core GPU Architecture, v1.0, 2020, 82 pages.

Papadantonakis et al., "Pipelining Saturated Accumulation", IEEE, vol. 58, No. 2, pp. 208-219, Feb. 2009.

Linley Gwennap, "IBM Demonstrates New AI Data Types", Microprocessor Report, Apr. 2021.

Liang Yun, et al., "Evaluating Fast Algorithms for Convolutional Neural Networks on FPGAs", IEEE Transactions on Computer-Aided Design of Integrated Circuits and Systems, vol. 39, No. 4, Feb. 5, 2019, 14 pages (Note: The date identified on the article attached is Mar./Apr. 2020).

Zhao et al., "A Fast Algorithm for Reducing the Computation Complexity of Convolutional Neural Networks", Algorithms 2018, 11, 159; doi:10.3390/a11100159; www. Mdpi.com/journal/algorithms, 11 pages, Oct. 2018.

International Search Report and Written Opinion of International Searching Authority re: re: PCT/US2022/018239, mailed Jun. 24, 2022, 18 pages.

* cited by examiner

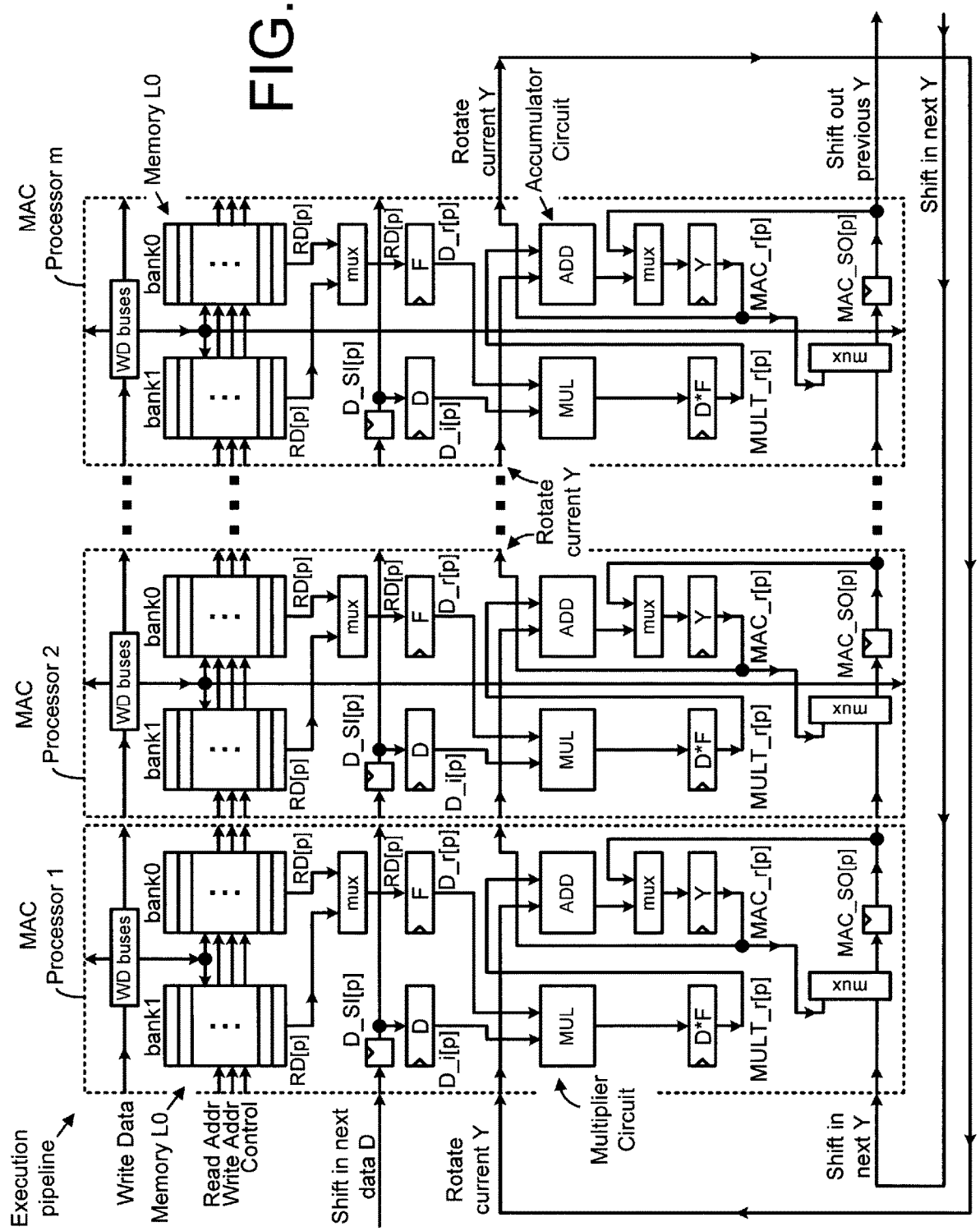

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

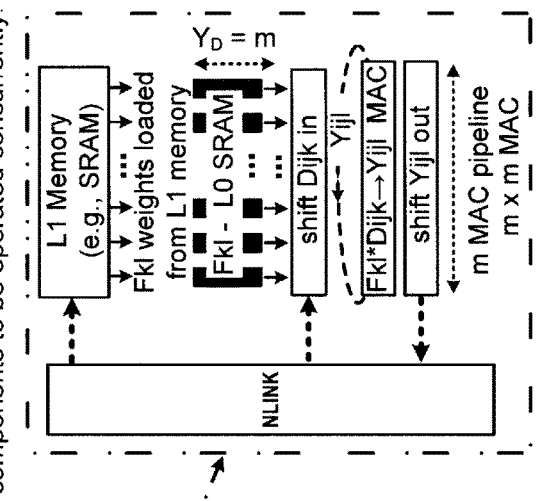

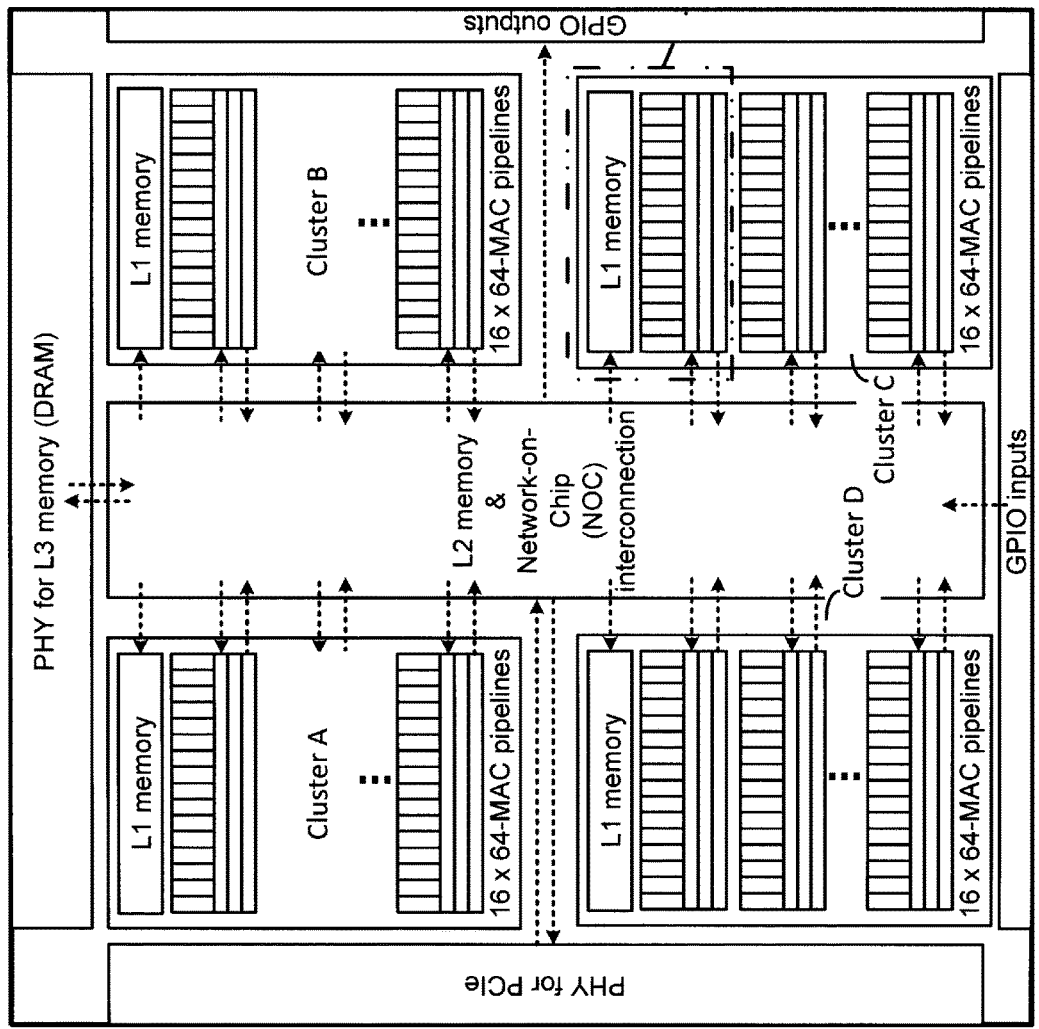

FIG. 1D

In one embodiment, each m-MAC execution pipeline includes a dedicated L0 SRAM memory, and each n x m-MAC cluster includes a shared L1 SRAM memory. The shift-in and shift-out paths of each m-MAC execution pipeline are coupled to the L2 SRAM memory. The L2 memory also couples to the L1/L0 memories. In one embodiment m=64 and n=16, as illustrated.

A network-on-chip (NOC) couples the L2 memory to a PHY (physical interface) to communicate with L3 memory (e.g., external DRAM). The NOC also couples to a PCIe PHY which, in turn, couples to an external host. In one embodiment, the NOC also couples to GPIO input/output PHYs, which allow multiple X1 components to be operated concurrently.

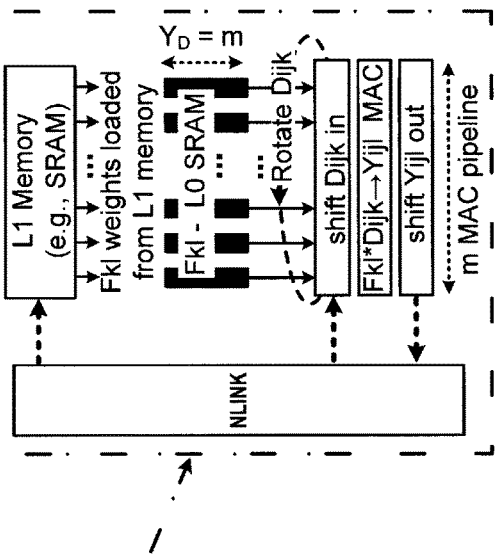

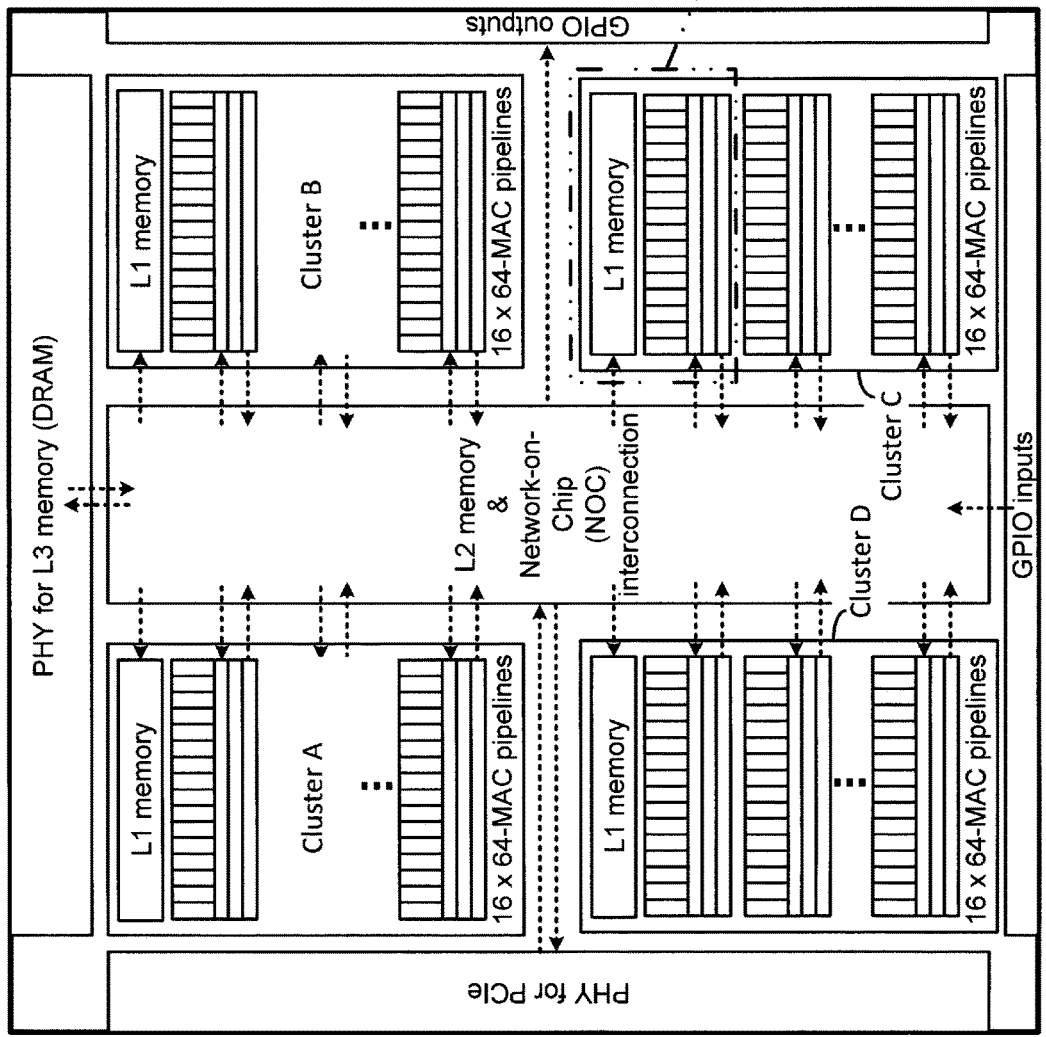

MAC PROCESSING PIPELINES, CIRCUITRY TO CONFIGURE SAME, AND METHODS OF OPERATING SAME

RELATED APPLICATION

This non-provisional application claims priority to and the benefit of U.S. Provisional Application No. 63/156,263, entitled "MAC Processing Pipelines, Circuitry to Configure Same, and Methods of Operating Same", filed Mar. 3, 2021. The '263 provisional application is hereby incorporated herein by reference in its entirety.

INTRODUCTION

There are many inventions described and illustrated herein. The present inventions are neither limited to any single aspect nor embodiment thereof, nor to any combinations and/or permutations of such aspects and/or embodiments. Importantly, each of the aspects of the present inventions, and/or embodiments thereof, may be employed alone or in combination with one or more of the other aspects of the present inventions and/or embodiments thereof. All combinations and permutations thereof are intended to fall within the scope of the present inventions.

In one aspect, the present inventions are directed to one or more multiplier-accumulator execution or processing pipelines (and methods of operating and configuring such pipeline(s)), wherein each pipeline includes a plurality of interconnected multiplier-accumulator circuits (referred to herein, at times, as "MACs" or "MAC circuits" or, singly or in singular form, "MAC" or "MAC circuit"). In one embodiment, the MACs of the processing pipeline are interconnected into a serial or linear pipeline wherein the plurality of MACs perform multiply and accumulate operations to process input data (e.g., image data) in a concatenating manner. For example, in one embodiment, the input data are input or loaded into the plurality of MACs of the pipeline and, in operation, the accumulation values generated by the MACs are rotated, transferred or moved (e.g., before, during or at the completion of each execution cycle of the execution sequence (i.e., set of associated execution cycles)) through the plurality of serially or linearly interconnected MACs of the pipeline such that each accumulation value generated by a MAC is output before, during or at the completion of each execution cycle to the immediately following MAC of the linear pipeline and employed in the accumulation operation of the accumulator circuit of that immediately following MAC. Here, the input data that are input or loaded into the plurality of MACs of the pipeline during operation do not rotate during each cycle of the set of associated execution cycles (i.e., an execution sequence)—rather, the input data is maintained, stored or held (e.g., in an input data register in the MAC), during each execution cycle of the execution sequence.

In another embodiment, a plurality of MACs are interconnected into a linear processing pipeline wherein the input data values are rotated, transferred or moved, before, during or at the completion of an execution cycle, through the MACs of the pipeline. In this embodiment, the accumulation values generated by each MAC are maintained, stored or held, during each execution cycle of the execution sequence (i.e., a set of associated execution cycles), in the respective MAC of the processing pipeline and used in the accumulation operations of the accumulator circuit of that MAC during the execution sequence. In this regard, in operation, after input or loading of the initial data input values into the MACs of the linear pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline. Thus, in operation, before, during or after each cycle of the set of associated execution cycles, the input data are rotated, transferred or moved from a MAC of the linear pipeline to the immediately successive MAC thereof. The rotated, transferred or moved input data are input or applied to the multiplier circuit of associated MAC during or in connection with the multiply operation of that MAC. As noted above, however, in this embodiment, the accumulation values generated by each MAC are maintained, stored or held (e.g., in an accumulation register in the MAC), during each execution cycle of the execution sequence, in respective MAC and used in the accumulation operation of the associated accumulator circuit thereof. Thus, in this embodiment, the input data are rotated, transferred or moved, on a cycle-by-cycle basis, from one MAC of the linear pipeline to the immediately following MAC whereas, during processing, the accumulation values generated by each MAC are not rotated, transferred or moved from one MAC of to the immediately following MAC but are maintained or stored in the MAC for use in subsequent processing.

Notably, the MACs may include a plurality of registers (including a plurality of shadow registers) wherein the circuitry also controls such registers to implement or facilitate the pipelining of the multiply and accumulate operations performed by the multiplier-accumulator circuits to increase throughput of the multiplier-accumulator execution or processing pipelines in connection with processing the related data (e.g., image data). For example, the present inventions may employ one or more of the multiplier-accumulator circuits that are described and illustrated in the exemplary embodiments of FIGS. 1A-1C of U.S. patent application Ser. No. 16/545,345, and the text associated therewith. Here, the multiplier-accumulator circuit described and/or illustrated in the '345 application facilitate concatenating the multiply and accumulate operations, and reconfiguring the circuitry thereof and operations performed thereby; in this way, a plurality of multiplier-accumulator circuits may be configured and/or re-configured to process data (e.g., image data) in a manner whereby the processing and operations are performed more rapidly and/or efficiently. The '345 application is incorporated by reference herein in their entirety.

In another aspect, the present inventions are directed to configuration control circuitry that configures (e.g., one-time or more than one-time programable) the multiplier-accumulator execution or processing pipeline(s) including, among other things, configuring the MACs of the processing pipeline and interconnection between the MACs of the processing pipeline. Here, in one embodiment, the configuration control circuitry may configure the MACs of the processing pipeline to rotate, transfer or move the accumulation values generated by the MACs before, during or at the completion of each execution cycle of the execution sequence (i.e., set of associated execution cycles), through the plurality of MACs of the linear pipeline such that each accumulation value generated by a MAC is output before, during or at the completion of each execution cycle to the immediately following MAC of the linear pipeline and employed in the accumulation operation of the accumulator circuit of that immediately following MAC during the next execution cycle.

In another embodiment, the configuration control circuitry may configure the MACs of the processing pipeline to rotate, transfer or move the input data values, on a cycle-by-cycle basis, after input or loading of the initial data input values into the MACs of the linear pipeline, from one MAC of the linear pipeline to the immediately following MAC of the pipeline and employed in the multiply operation of the multiplier circuit of that next MAC of the processing pipeline during the next execution cycle. Here, the configuration control circuitry configures or implements an architecture of the linear pipeline by controlling, providing or enabling predetermined connection(s) between MACs and/or rows of interconnected MACs. Notably, the configuration control circuitry may program or configure the MACs, for example, in situ (i.e., during normal operation of the integrated circuit) and/or at or during power-up, start-up, initialization, re-initialization, configuration, re-configuration or the like, to implement the manner of processing the input data.

In addition thereto, the configuration control circuitry may also configure and control the number of MACs employed in the linear pipeline. In this embodiment, the configuration control circuitry configures and controls a plurality of separate MACs or rows/banks of interconnected (in series) MACs to configure the length of the linear pipeline for the multiply and accumulate operations. For example, in one embodiment, the configuration control circuitry may configure or connect a selected number of MACs or rows/banks of MACs to, among other things, implement a predetermined multiplier-accumulator execution or processing pipeline or architecture thereof. (See U.S. Provisional Application 63/012,111, filed Apr. 18, 2020, which is hereby incorporated by reference in its entirety). Here, the configuration control circuitry may configure or determine the multiplier-accumulator circuits or rows/banks of interconnected multiplier-accumulator circuits that are connected in the linear pipeline and employed to perform the multiply and accumulate operations and/or the manner of processing implemented by the architecture or configuration implemented via connection of multiplier-accumulator circuits (or rows/banks of interconnected multiplier-accumulator circuits) employed to perform the multiply and accumulate operations. As noted above, the configuration control circuitry may be one-time programmable (e.g., at manufacture via, e.g., a programmable fuse array) or multiple-times programmable (including, e.g., at start-up/power-up, initialization, and/or in situ).

The MACs and execution pipelines may be organized from or disposed on one or more integrated circuits. In one embodiment, the integrated circuit is a discrete field programmable gate array (FPGA) or embedded FPGA (herein after collectively "FPGA" unless expressly stated otherwise). Briefly, an FPGA is an integrated circuit that is configured and/or reconfigured (hereinafter, unless stated otherwise, collectively "configured" or the like (e.g., "configure" and "configurable")) by a user, operator, customer and/or designer before and/or after manufacture. The FPGA may include programmable logic components (often called "logic cells", "configurable logic blocks" (CLBs), "logic array blocks" (LABs), or "logic tiles"—hereinafter collectively "logic tiles")).

In one embodiment of the present inventions, one or more (or all) logic tiles of an FPGA include a plurality of multiplier-accumulator circuits that are interconnected (e.g., serially) to implement multiply and accumulate operations, for example, in a pipelining manner. The output of the pipeline(s) may be connected to circuitry via a switch interconnect network. Here, the switch interconnect network may be configured as a hierarchical and/or mesh interconnect network. The logic tiles may include data storage elements associated with the switch interconnect network, input pins and/or look-up tables (LUTs) that, when programmed, determine the configuration and/or operation of the switches/multiplexers and, among other things, the communication between circuitry (e.g., logic components) within a logic tile (including the MAC circuits and/or MAC processing pipelines) and/or between circuitry of multiple logic tiles (e.g., between MAC circuits and/or MAC processing pipelines of a plurality of logic tiles).

The switch interconnect network may provide a connection to/from logic circuitry of the associated logic tile or a different logic tile to/from multiplier-accumulator circuits (individually) of the multiplier-accumulator circuits of the processing or execution pipelines. In this way, MAC circuits and/or MAC processing pipelines of a plurality of logic tiles may be employed, for example, concurrently, to processes related data (e.g., related image data). Indeed, such connections may be configurable and/or re-configurable—for example, in situ (i.e., during normal operation of the integrated circuit) and/or at or during power-up, start-up, initialization, re-initialization, configuration, re-configuration or the like. In one embodiment, the switch interconnect network may employ one or more embodiments, features and/or aspects of the interconnect network described and/or illustrated in the '345 application, and/or U.S. patent application Ser. No. 17/019,212, filed Sep. 12, 2020 (which is hereby incorporated by reference herein in its entirety). Moreover, the switch interconnect network may interface with and/or include one or more embodiments, features and/or aspects of the interface connector described and/or illustrated in the '345 and '212 applications (see, e.g., FIGS. 7A-7C of the '345 application; notably, certain details of the NLINK circuits/structures described and illustrated herein correlate to circuitry/structures described and/or illustrated in the '345 and '212 applications which is referred to and/or identified as NLINX (e.g., NLINX conductors, NLINX interface, NLINX interface connector, NLINX circuits, etc.)). As mentioned above, the '345 and '212 applications are hereby incorporated by reference herein in their entirety.

Notably, the integrated circuit(s) may be, for example, a processor, controller, state machine, gate array, system-on-chip (SOC), programmable gate array (PGA) and/or FPGA and/or a processor, controller, state machine and SoC including an embedded FPGA. A field programmable gate array or FPGA means both a discrete FPGA and an embedded FPGA unless expressly stated otherwise As mentioned above, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated in detail separately herein.

BRIEF DESCRIPTION OF THE DRAWINGS

The present inventions may be implemented in connection with embodiments illustrated in the drawings hereof. These drawings show different aspects of the present inventions and, where appropriate, reference numerals, nomenclature, or names illustrating like circuits, architectures, structures, components, materials and/or elements in different figures are labeled similarly. It is understood that various combinations of the structures, components, materials and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended reflect or indicate the embodiment(s) is/are "example" embodiment(s).

Notably, the configurations, block/data width, data path width, bandwidths, data lengths, values, processes, pseudo-code, operations, and/or algorithms described herein and/or illustrated in the FIGURES, and text associated therewith, are exemplary. Indeed, the inventions are not limited to any particular or exemplary circuit, logical, block, functional and/or physical diagrams, number of multiplier-accumulator circuits employed in an execution pipeline, number of execution pipelines employed in a particular processing configuration, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory. Again, the inventions are not limited to the illustrative/exemplary embodiments set forth herein.

Figure 1A:
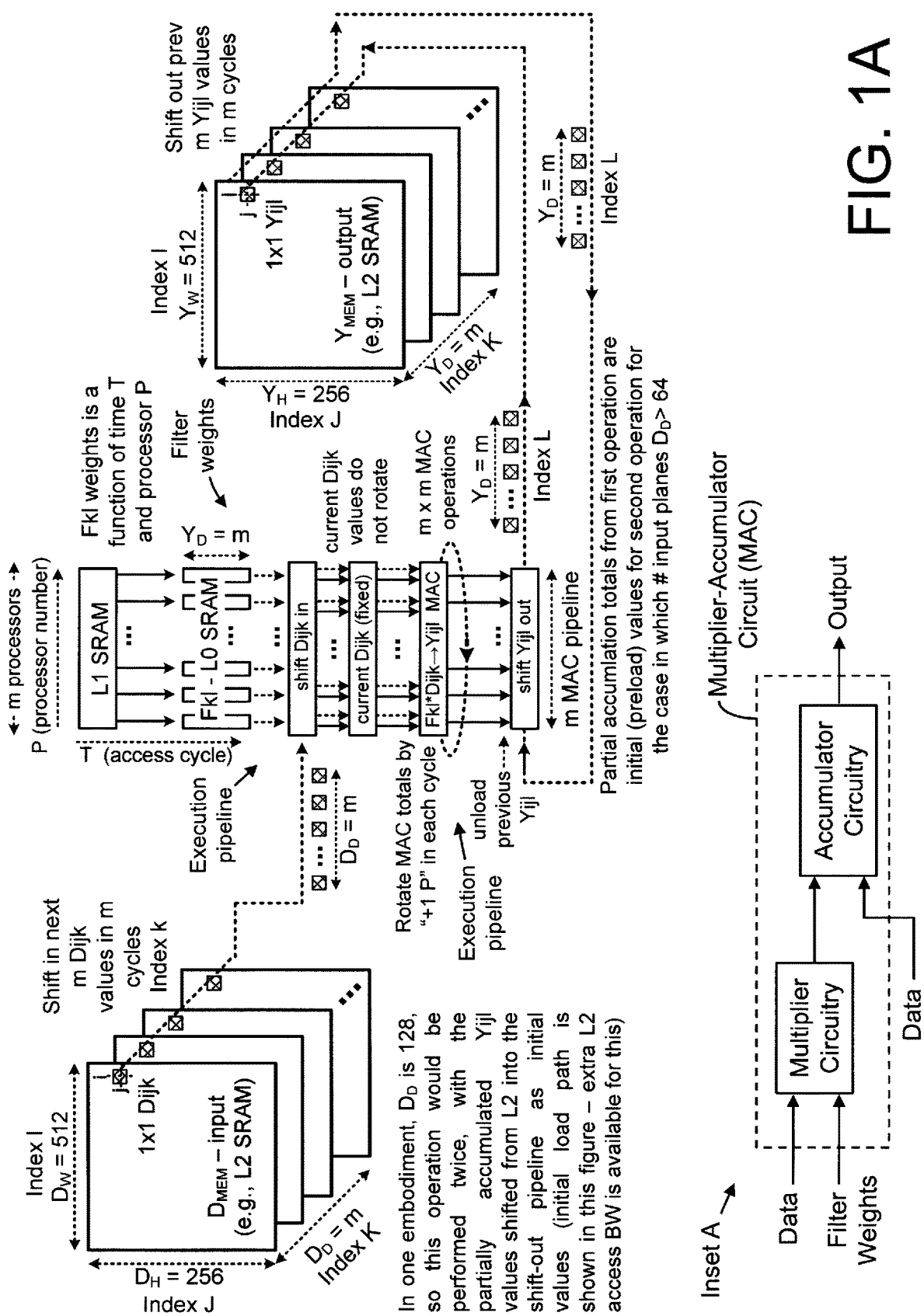
Figure 1C:
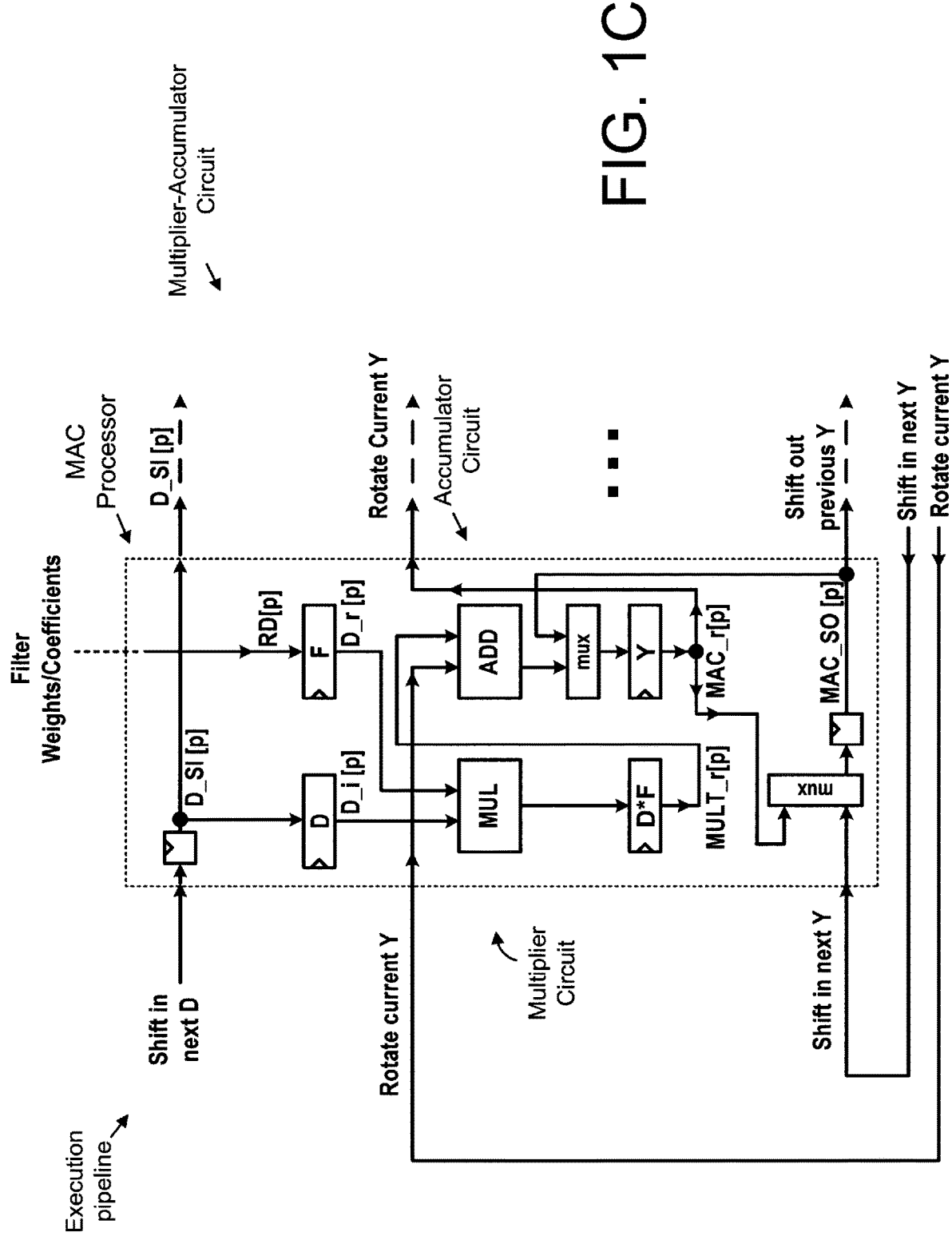

FIG. 1A illustrates a schematic block diagram of a logical overview of an exemplary multiplier-accumulator execution pipeline, connected in a linear pipeline configuration wherein the input data are input or loaded into a plurality of MACs of the pipeline and, in operation, the accumulation values generated by the MACs are rotated, transferred or moved (e.g., before, during or at the completion of each execution cycle of the execution sequence (i.e., set of associated execution cycles)) through the plurality of serially connected MACs of the pipeline such that, in one embodiment, each accumulation value generated by a MAC is output before, during or at the completion of each execution cycle to the immediately following MAC of the linear pipeline and employed in the accumulation operation of the accumulator circuit of that immediately following MAC, according to one or more aspects of the present inventions; in this illustrative embodiment, the plurality of MACs is illustrated in block diagram form; an exemplary MAC is illustrated in schematic block diagram form in Inset A; notably, in this exemplary embodiment, "m" (e.g., 64 in one illustrative embodiment) MACs are connected in a linear execution pipeline to operate concurrently whereby the processing circuits perform m×m (e.g., 64×64) multiply-accumulate operations in each m (e.g., 64) cycle interval (here, a cycle may be, for example, nominally 1 ns); notably, in one exemplary embodiment, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuit starts processing (see, e.g., the '345 and '212 applications); in one embodiment, the L1 SRAM memory may provide data to a plurality of L0 SRAM memories, wherein each MAC of each linear pipeline (like that illustrated in block diagram form in FIG. 2A) is associated with a dedicated L0 SRAM memory of the plurality of L0 SRAM memories (associated with the L1 SRAM memory);

FIGS. 1B and 1C illustrate schematic block diagrams of an exemplary multiplier-accumulator execution or processing pipelines including a plurality of serially connected MACs (e.g., 64; when m=64, see FIG. 1B) wherein the output of each accumulator circuit ("ADD") of the MACs is coupled to the input of the immediately following accumulator circuit ("ADD") of the MACs of the linear processing pipeline forming a serial circular path, including the plurality of MAC processors, via the plurality of rotate accumulation data paths connecting sequential MAC processors of the processing pipeline, wherein, in this way, accumulation values ("Y") generated by the MACs (see, MAC_r[p]) are rotated, transferred or moved (e.g., before, during or at the completion of each execution cycle of the execution sequence (i.e., set of associated execution cycles)) through the plurality of serially connected MACs of the pipeline such that each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in this exemplary embodiment, MAC processor may include or read from one or more of memory banks (e.g., two SRAM memory banks) that are dedicated to the MAC to store filter weights used by the multiplier circuit of the associated MAC (as described and illustrated in U.S. Provisional Patent Application No. 62/012,111 (filed Apr. 18, 2020), which is hereby incorporated by reference herein; notably, the individual MACs may, at times, be referred to herein as MAC processors);

FIG. 1D illustrates a high-level block diagram layout of an integrated circuit or a portion of an integrated circuit (which may be referred to, at times, as an X1 component) including a plurality of MAC execution pipelines, each pipeline having a plurality of MACs—each of which implement multiply and accumulate operations, wherein, in operation, the accumulation values (see "Yijl" in the expanded view of a portion of the high-level block diagrams of FIGS.

Figure 2A:
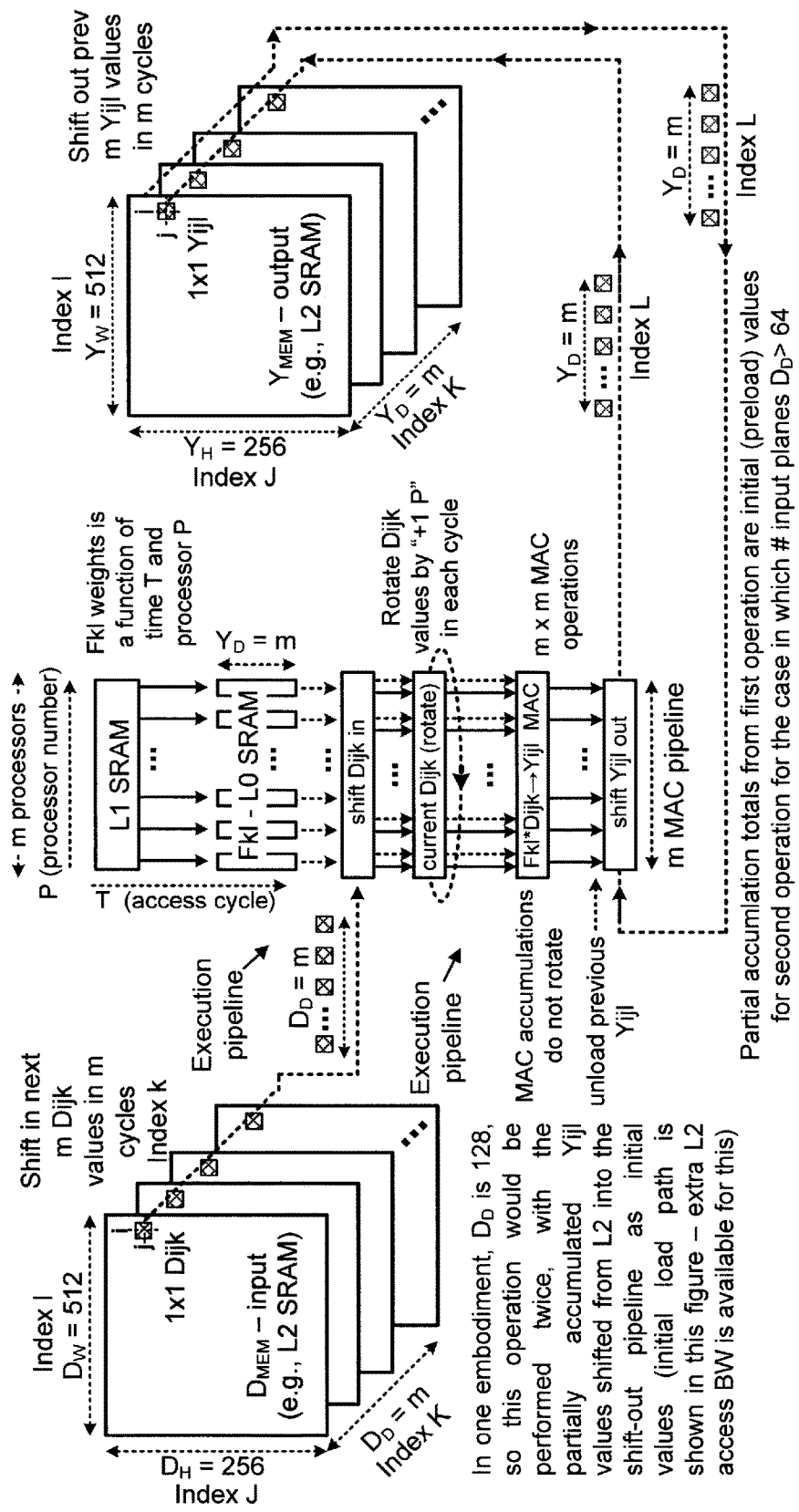
Figure 2A:
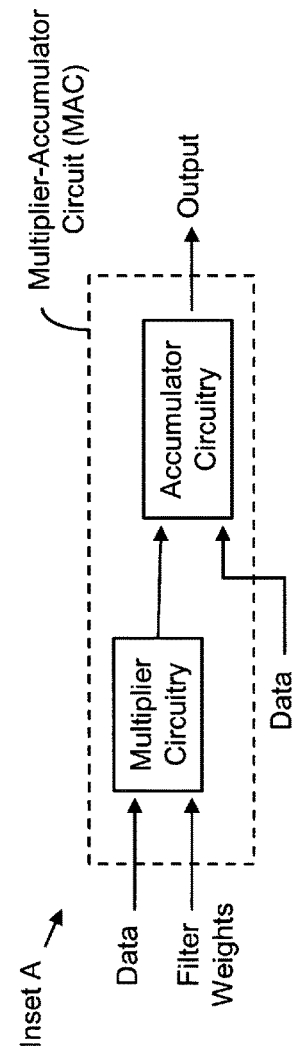

1A-1C) generated by the MACs are rotated, transferred or moved (e.g., before, during or at the completion of each execution cycle of the execution sequence (i.e., set of associated execution cycles)) through the plurality of serially connected MACs of the pipeline such that each accumulation value generated by a MAC is output before, during or at the completion of each execution cycle to the immediately following MAC of the linear pipeline and employed in the accumulation operation of the accumulator circuit of that immediately following MAC, according to one or more aspects of the present inventions; the multi-bit MAC execution pipelines and/or the plurality of MACs may be configured to implement one or more processing architectures or techniques (singly or in combination with one or more X1 components); notably, in this illustrative embodiment, the multi-bit MAC execution pipelines are organized into clusters (in this illustrative embodiment, four clusters (labeled Clusters A, B, C and D) wherein each cluster includes a plurality of multi-bit MAC execution pipelines (in this illustrative embodiment each cluster includes 16, 64-MAC execution or processing pipelines); in one embodiment, the plurality of multiplier-accumulator circuits are configurable (one-time or multiple times, e.g., at start-up and/or in situ) to implement one or more pipelining processing architectures or techniques (in the illustrative embodiment, including, e.g., 64 MACs or MAC processors) which correlates to the schematic block diagram of a logical overview of an exemplary multiplier-accumulator circuit arranged in a linear execution pipeline configuration—see FIGS. 1A-1C, 2A-2C and 3); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuits—labeled as "NMAX Rows"—see, e.g., the '345 and '212 applications); notably, in one embodiment, each MAC execution pipeline (which, in one embodiment, consists of a plurality of serially interconnected MACs which are configured in a linear pipeline) is connected to an associated plurality of L0 memories such that, in one embodiment, at least one L0 memory (e.g., SRAM memory) is connected and dedicated to a MAC of that processing pipeline; the associated L0 memory stores filter weights used by the multiplier circuit of each multiplier-accumulator circuit of that particular MAC processing pipeline in performance of the multiply operations, wherein each MAC of each processing pipeline of a given cluster is connected to an associated L0 memory (which, in one embodiment, is dedicated to the associated MAC of that MAC processing pipeline); a plurality (e.g., 16) MAC execution pipelines of a MAC cluster (and, in particular, the L0 memory of each MAC execution pipeline of the cluster) is coupled to an associated L1 memory (e.g., SRAM memory); the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIG. 2A illustrates a schematic block diagram of a logical overview of an exemplary multiplier-accumulator execution pipeline, connected in a linear pipeline configuration wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline, according to one or more aspects of the present inventions; in this embodiment, before, during or after each cycle of the set of associated execution cycles, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC; in this embodiment, the accumulation values generated by each MAC are maintained, stored or held, during each execution cycle of the execution sequence (i.e., set of associated execution cycles), in respective MAC (compare the embodiment of FIG. 1A) and used in the accumulation operation of the associated accumulator circuit thereof; that is, the accumulation values employed in subsequent processing (i.e., the accumulation operation) in the associated MAC; in this illustrative embodiment, the plurality of MACs is illustrated in block diagram form; an exemplary MAC is illustrated in schematic block diagram form in Inset A; notably, in this exemplary embodiment, "m" (e.g., 64 in one illustrative embodiment) MACs are connected in a linear execution pipeline to operate concurrently whereby the processing circuits perform m×m (e.g., 64×64) multiply-accumulate operations in each m (e.g., 64) cycle interval (here, a cycle may be, for example, nominally 1 ns); notably, in one exemplary embodiment, each m (e.g., 64) cycle interval processes a Dd/Yd (depth) column of input and output pixels/data at a particular (i,j) location (the indexes for the width Dw/Yw and height Dh/Yh dimensions of this exemplary embodiment—Dw=512, Dh=256, and Dd=128, and the Yw=512, Yh=256, and Yd=64) wherein the m (e.g., 64) cycle execution interval is repeated for each of the Dw*Dh depth columns for this stage; in addition, in one embodiment, the filter weights or weight data are loaded into memory (e.g., L1/L0 SRAM memories) before the multiplier-accumulator circuit starts processing (see, e.g., the '345 and '212 applications); in one embodiment, the L1

Figure 2B:
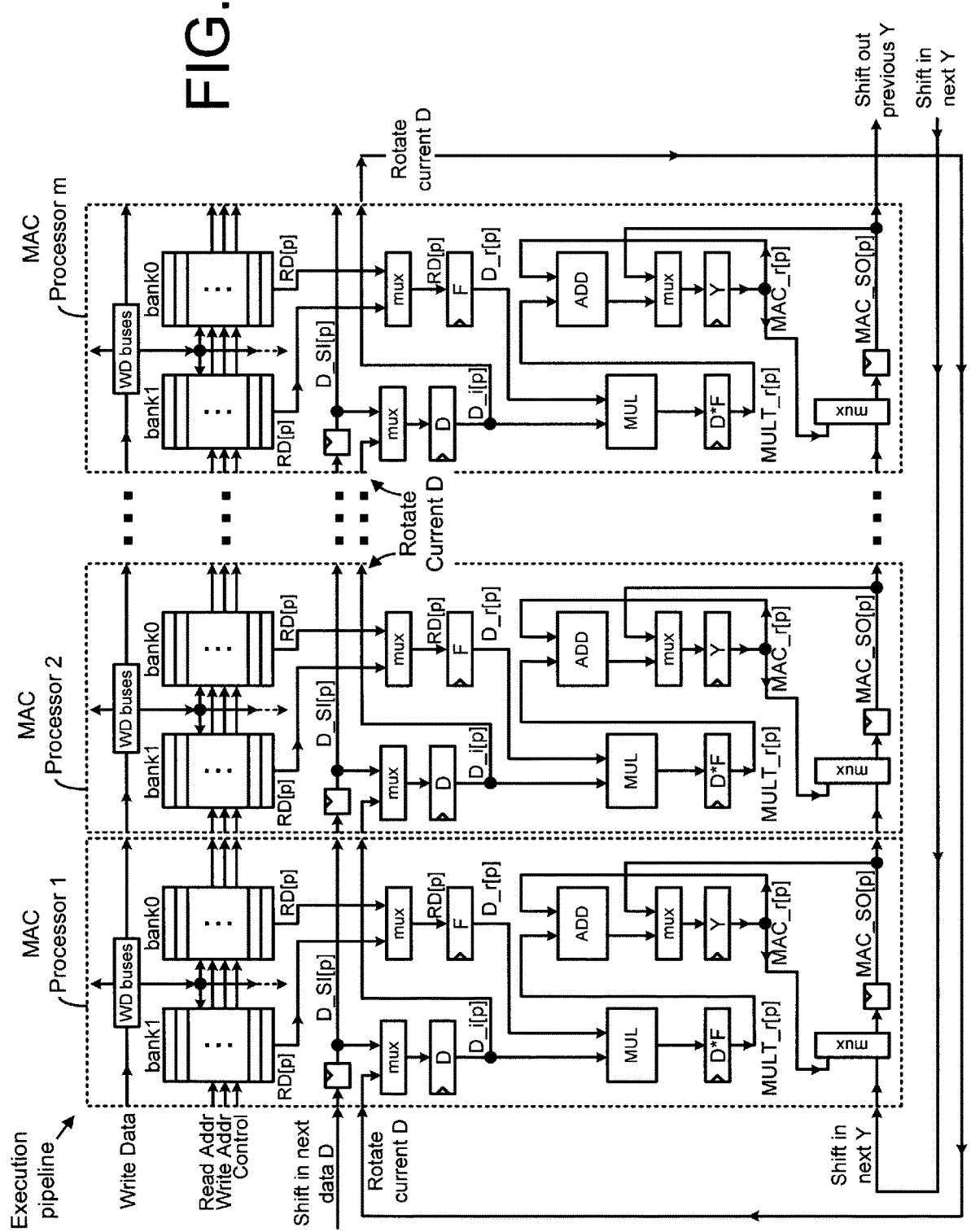
Figure 2C:
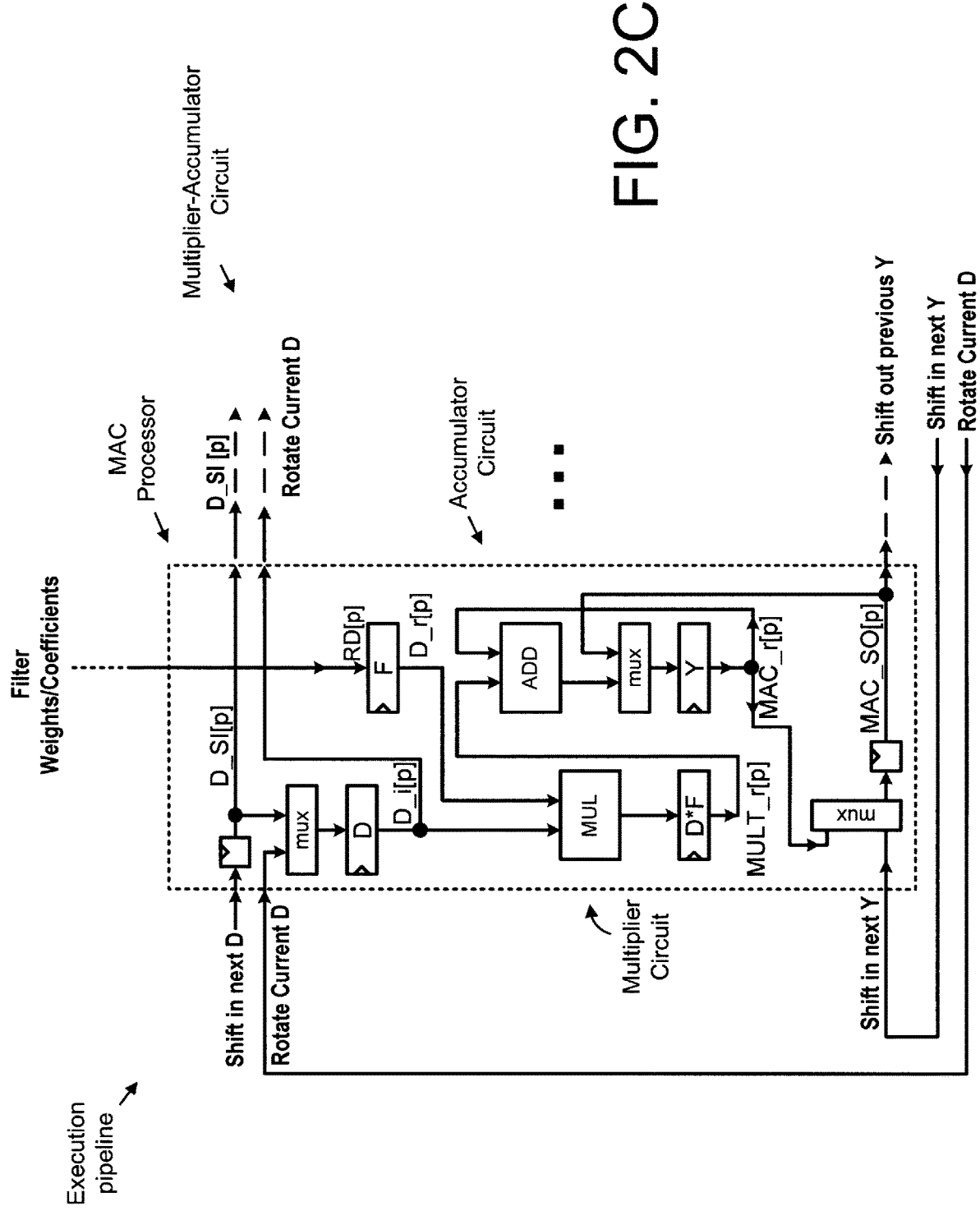
Figure 3A:
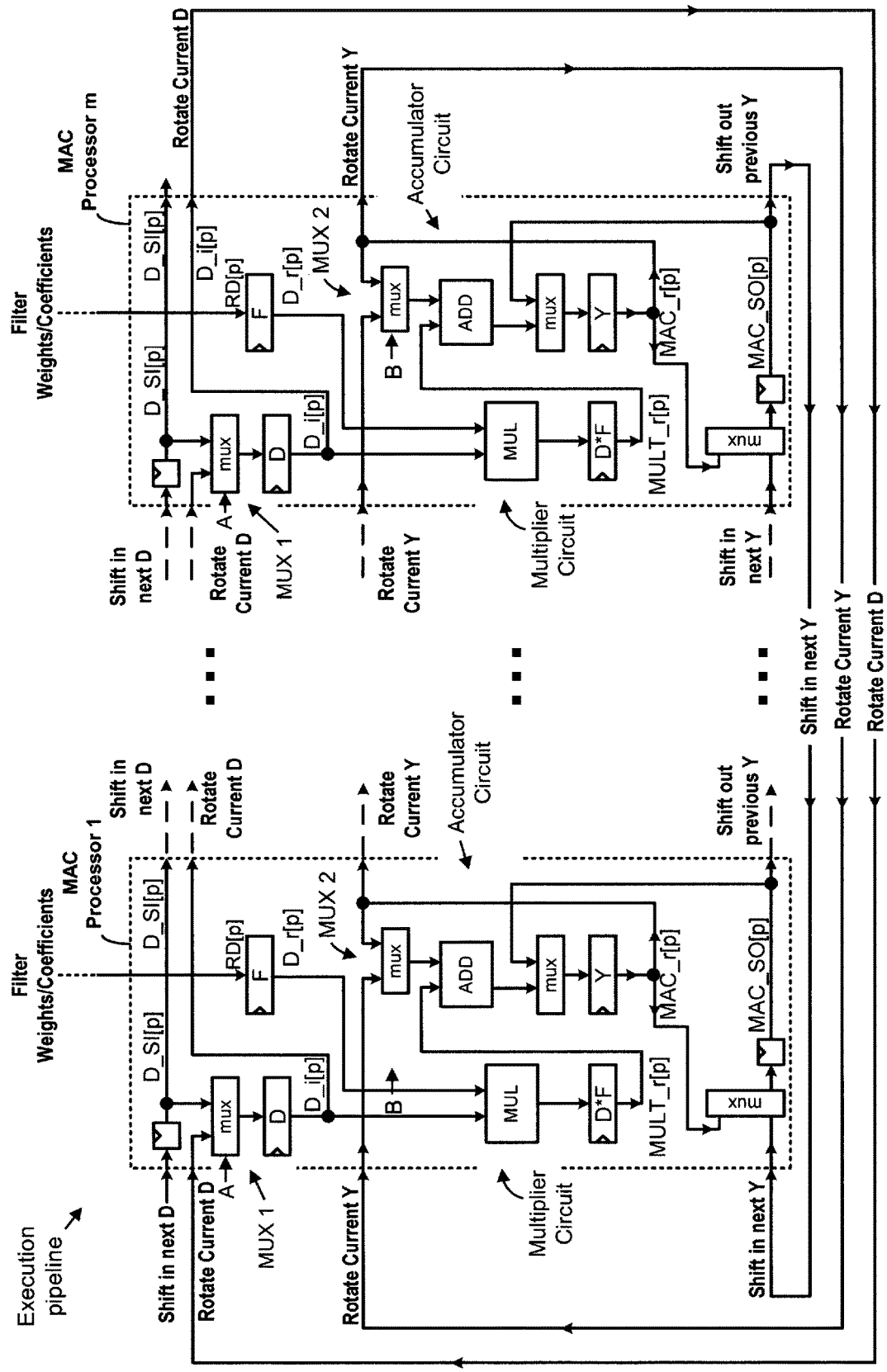
Figure 3B:
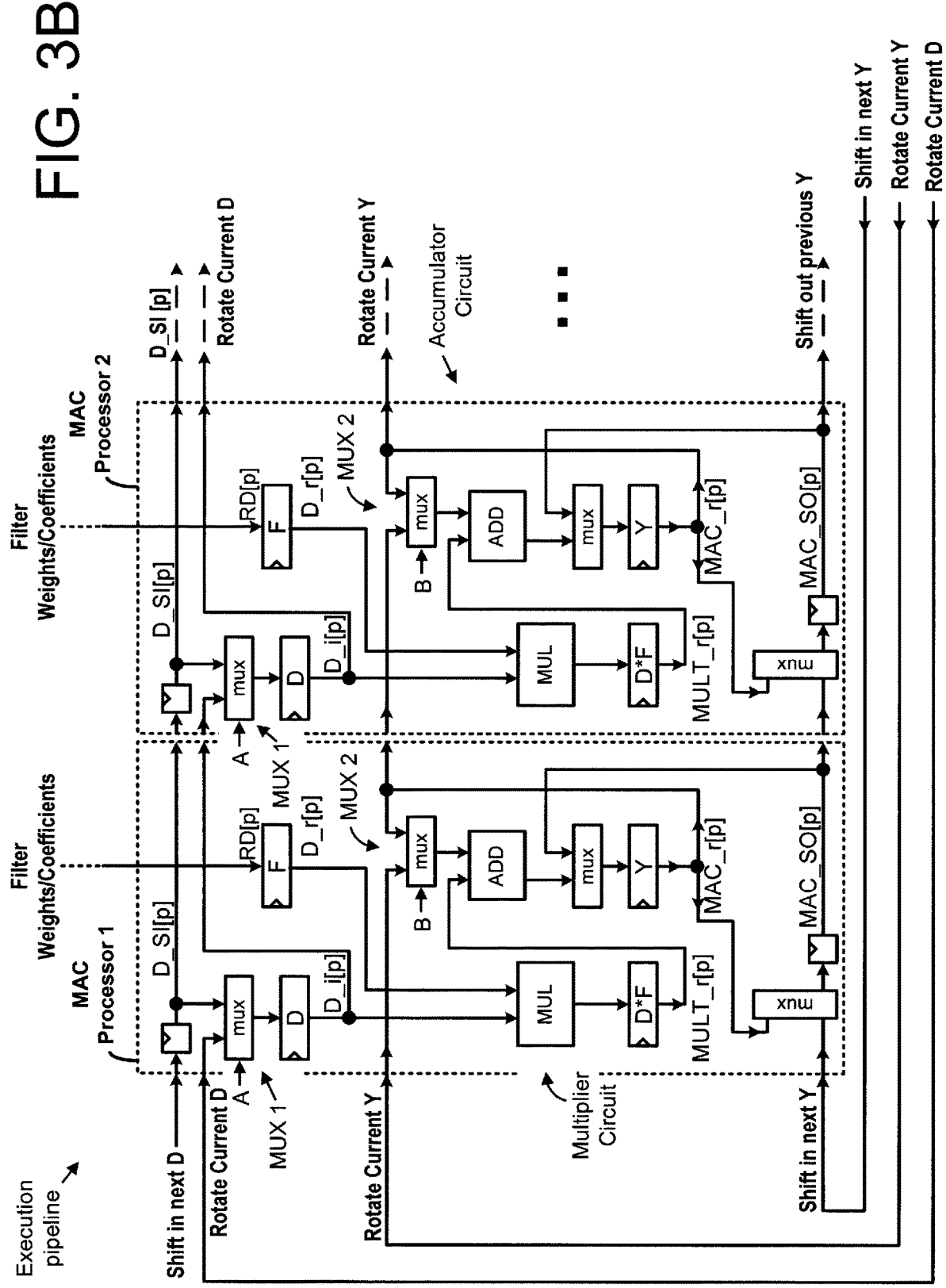
Figure 3C:
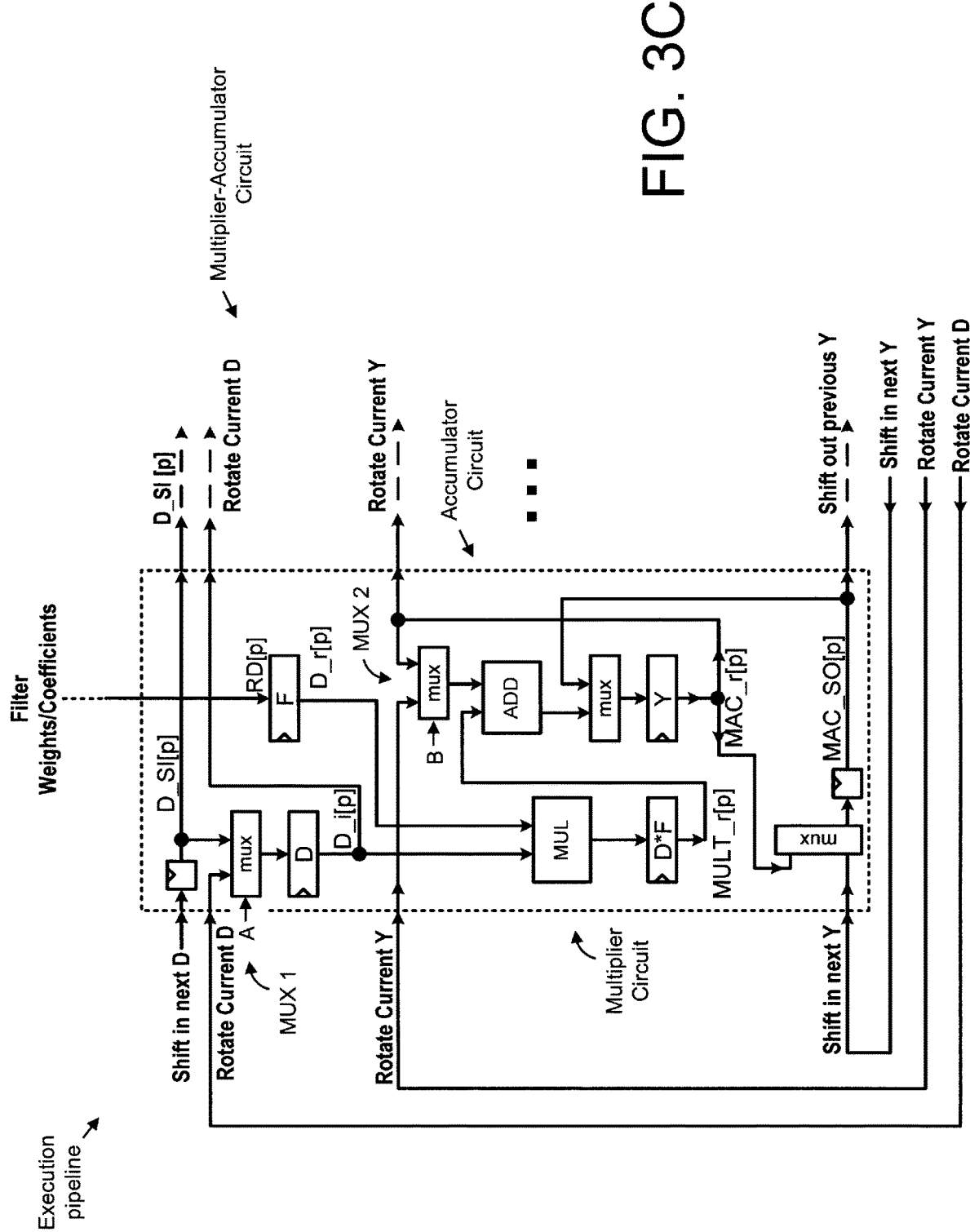
Figure 4:
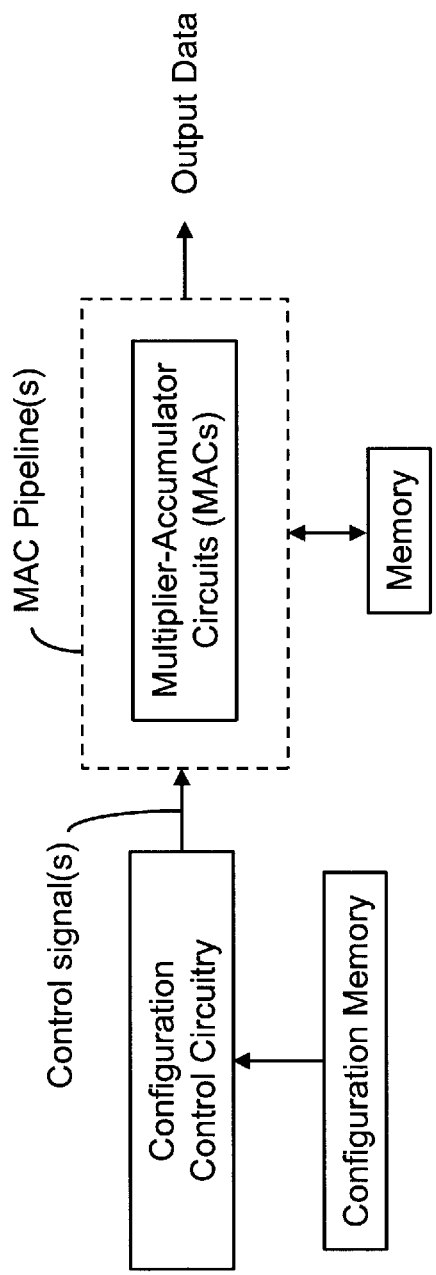
Figure 5:
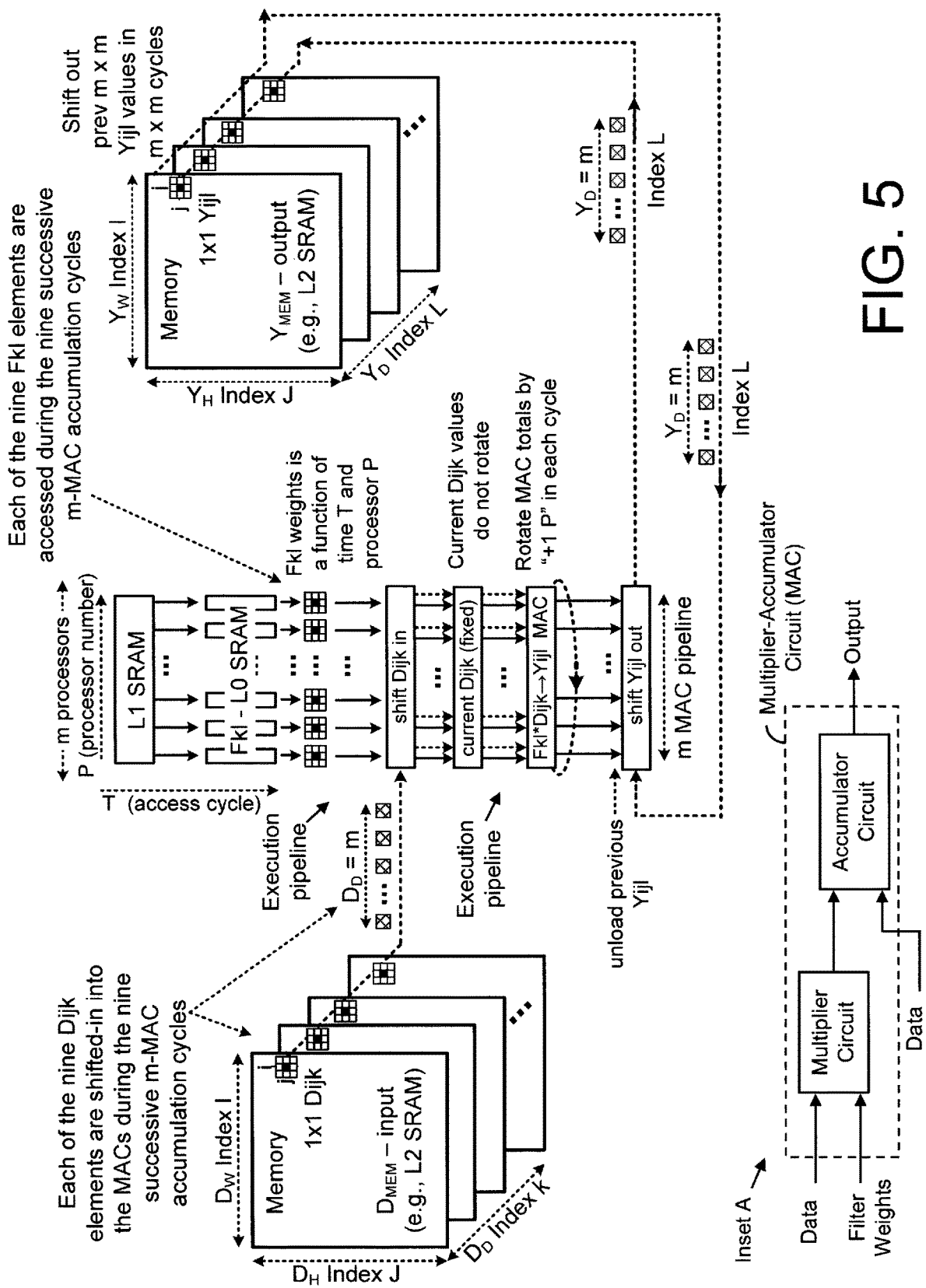
Figure 6A:
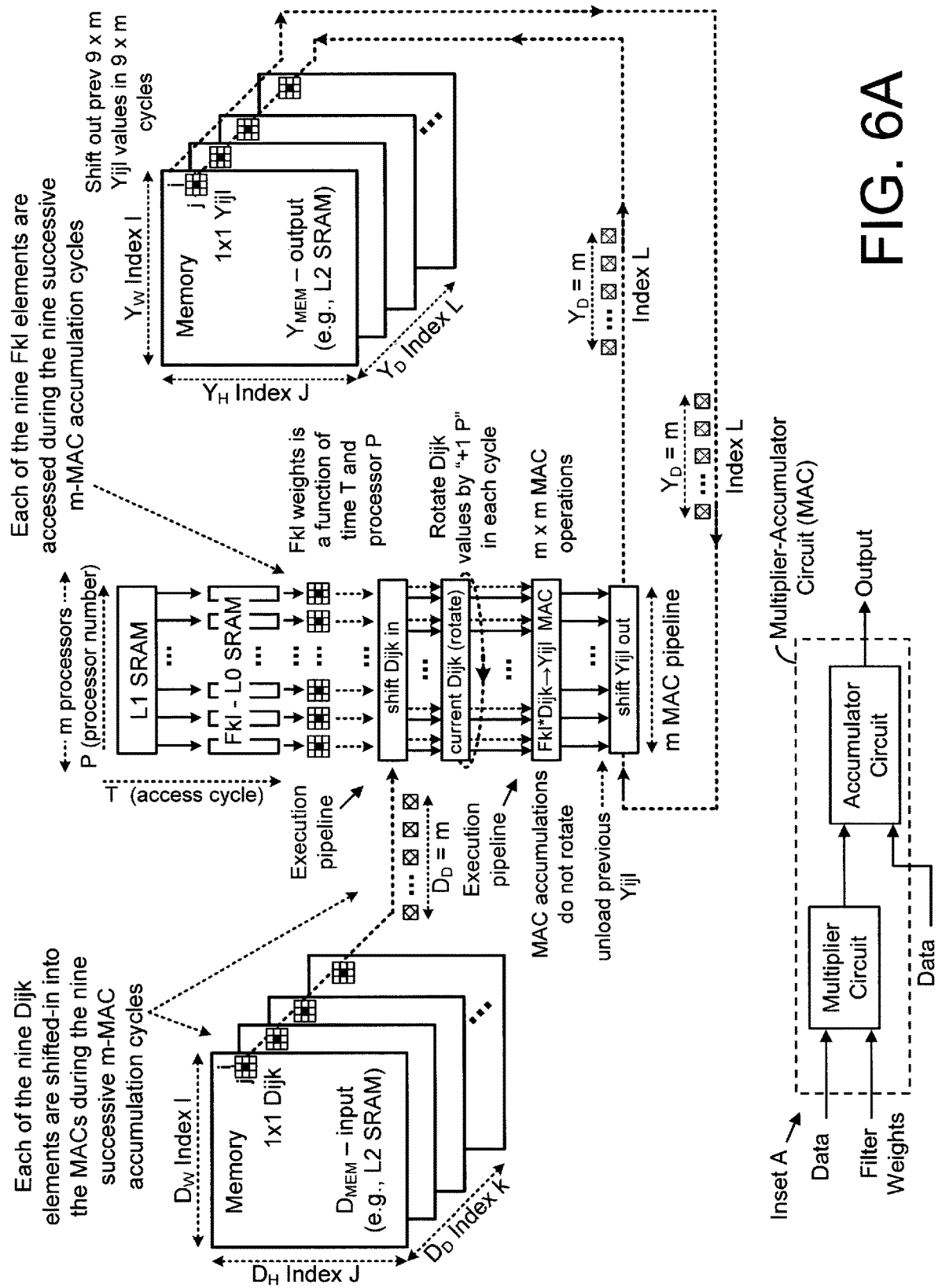
Figure 6B:
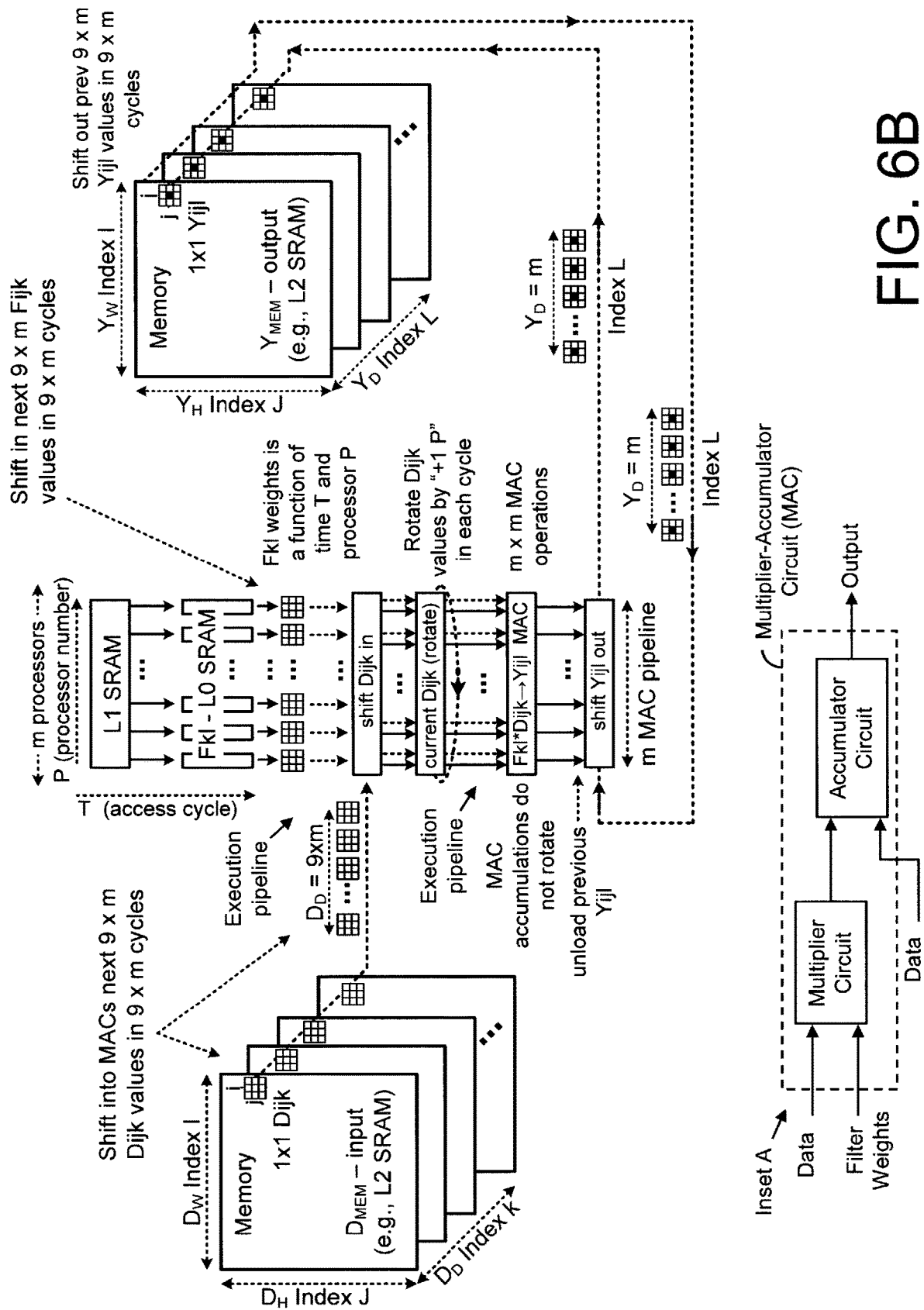
Figure 7:
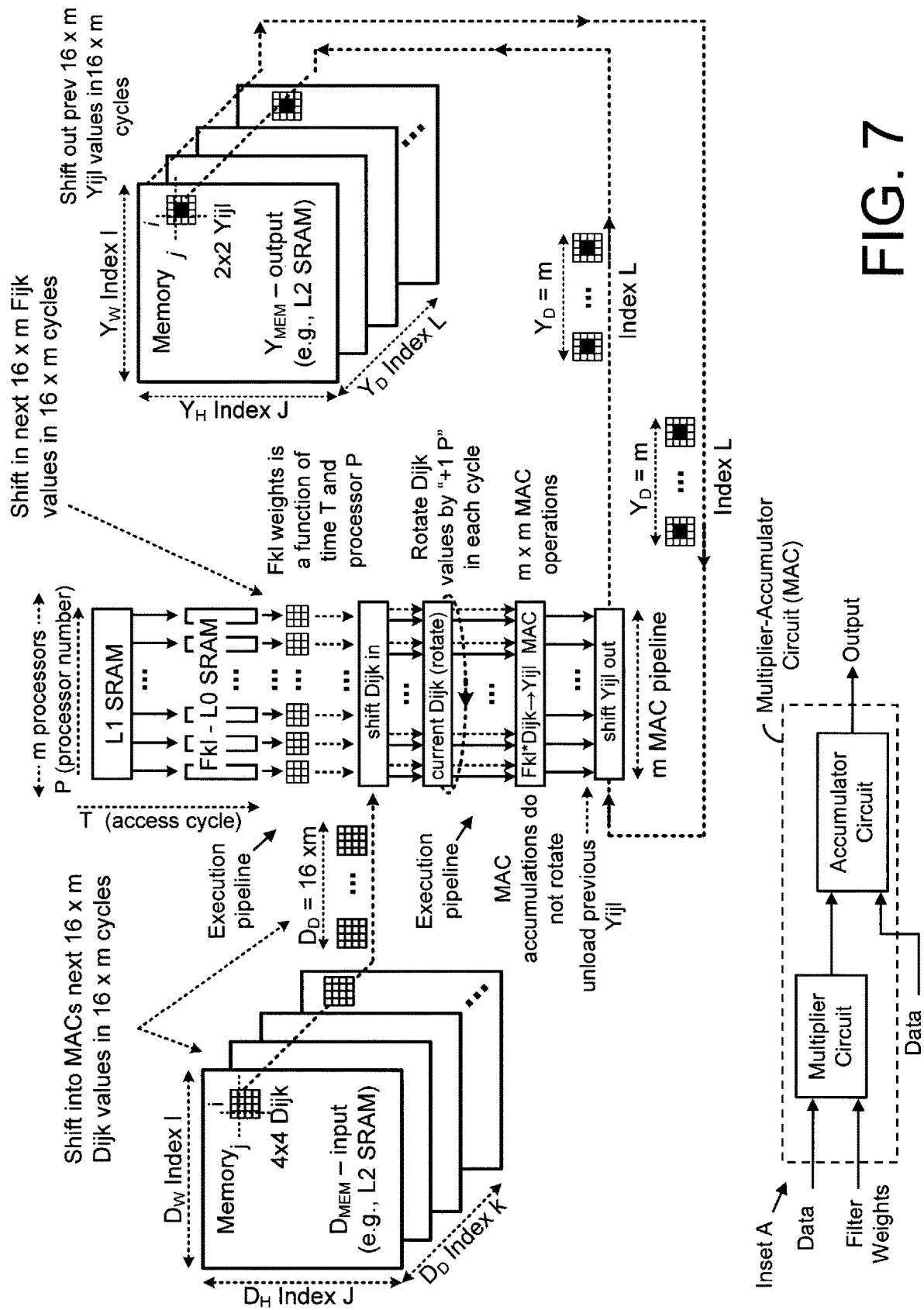
Figure 8A:
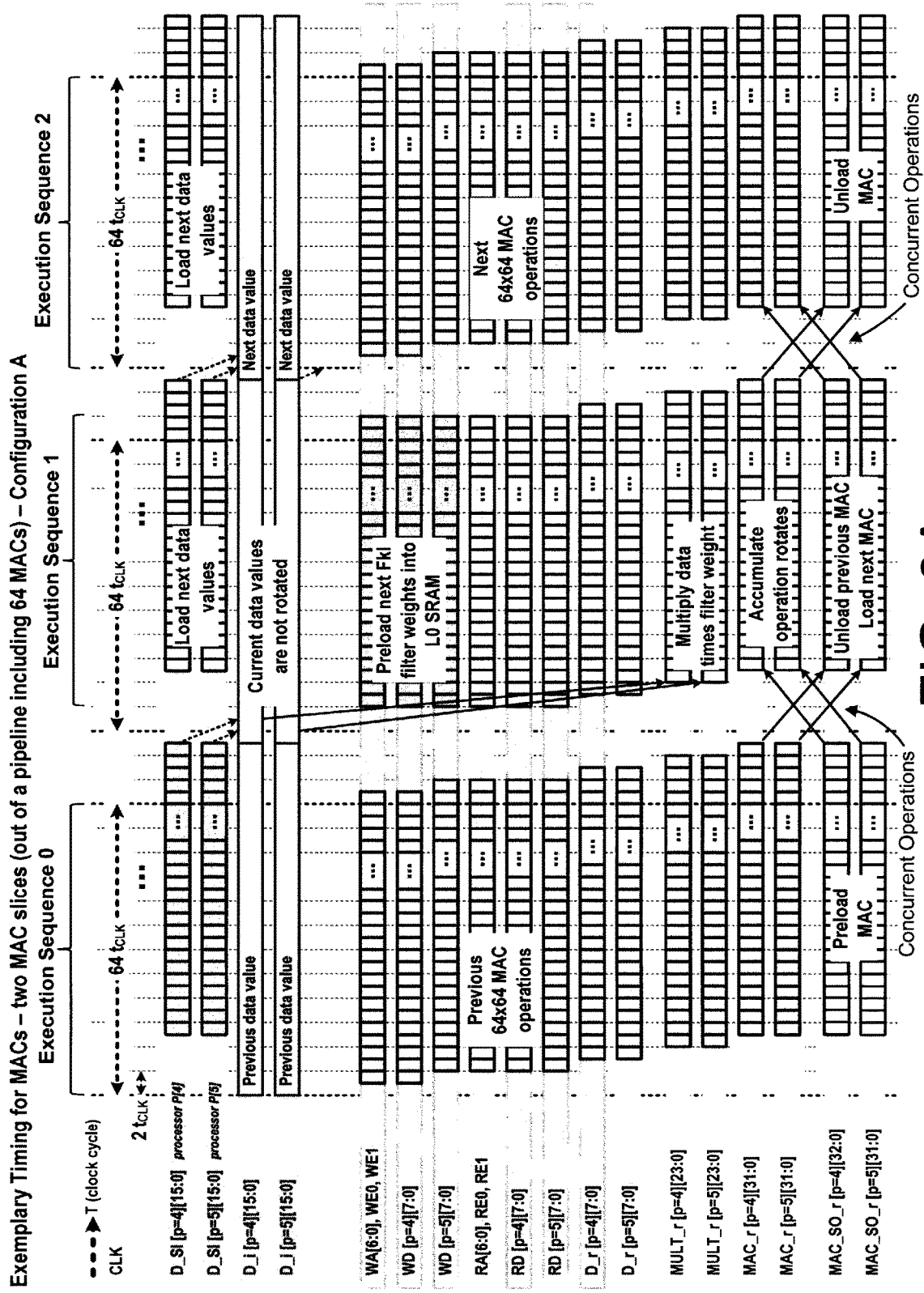
Figure 8B:
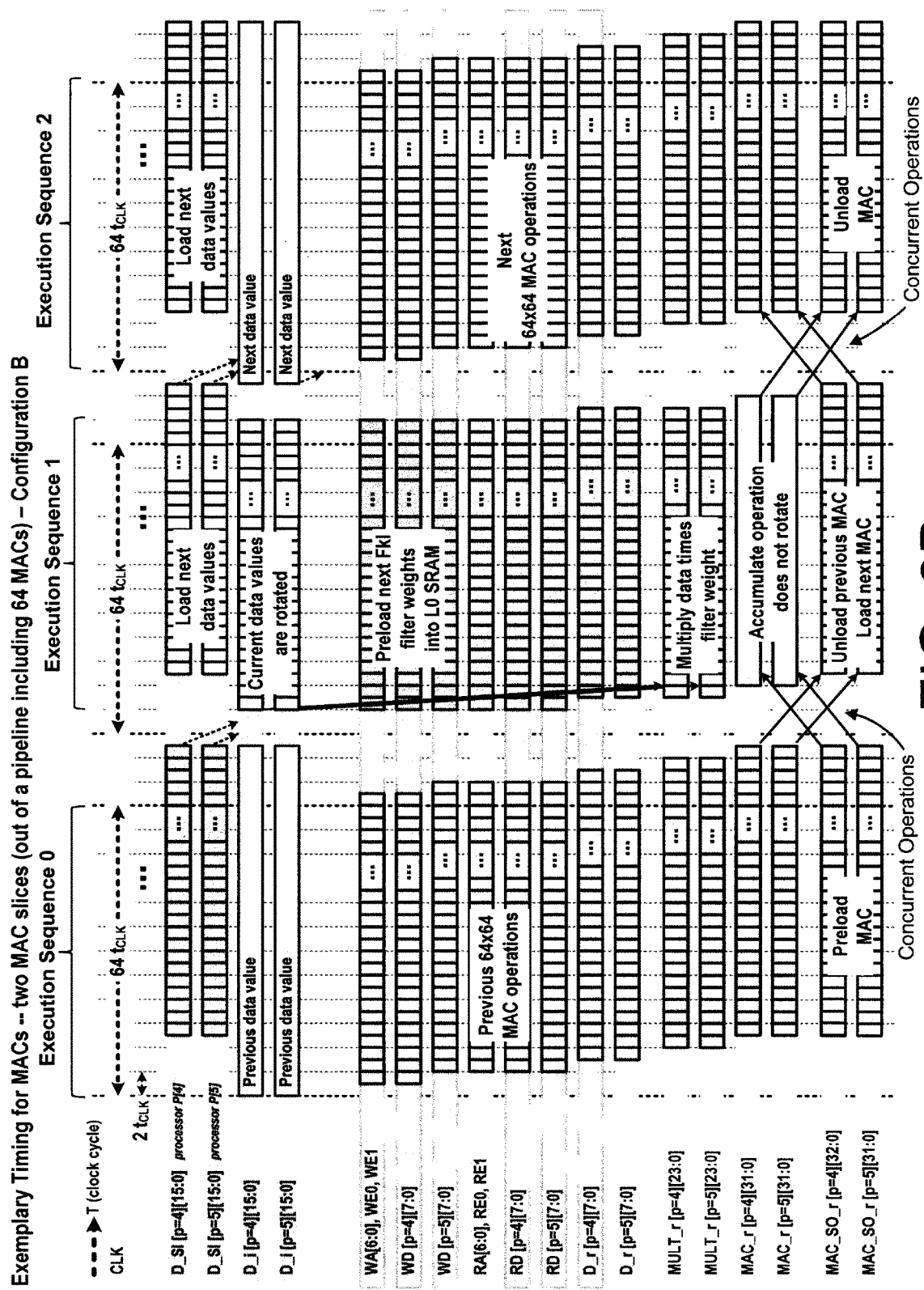
Figure 9A:
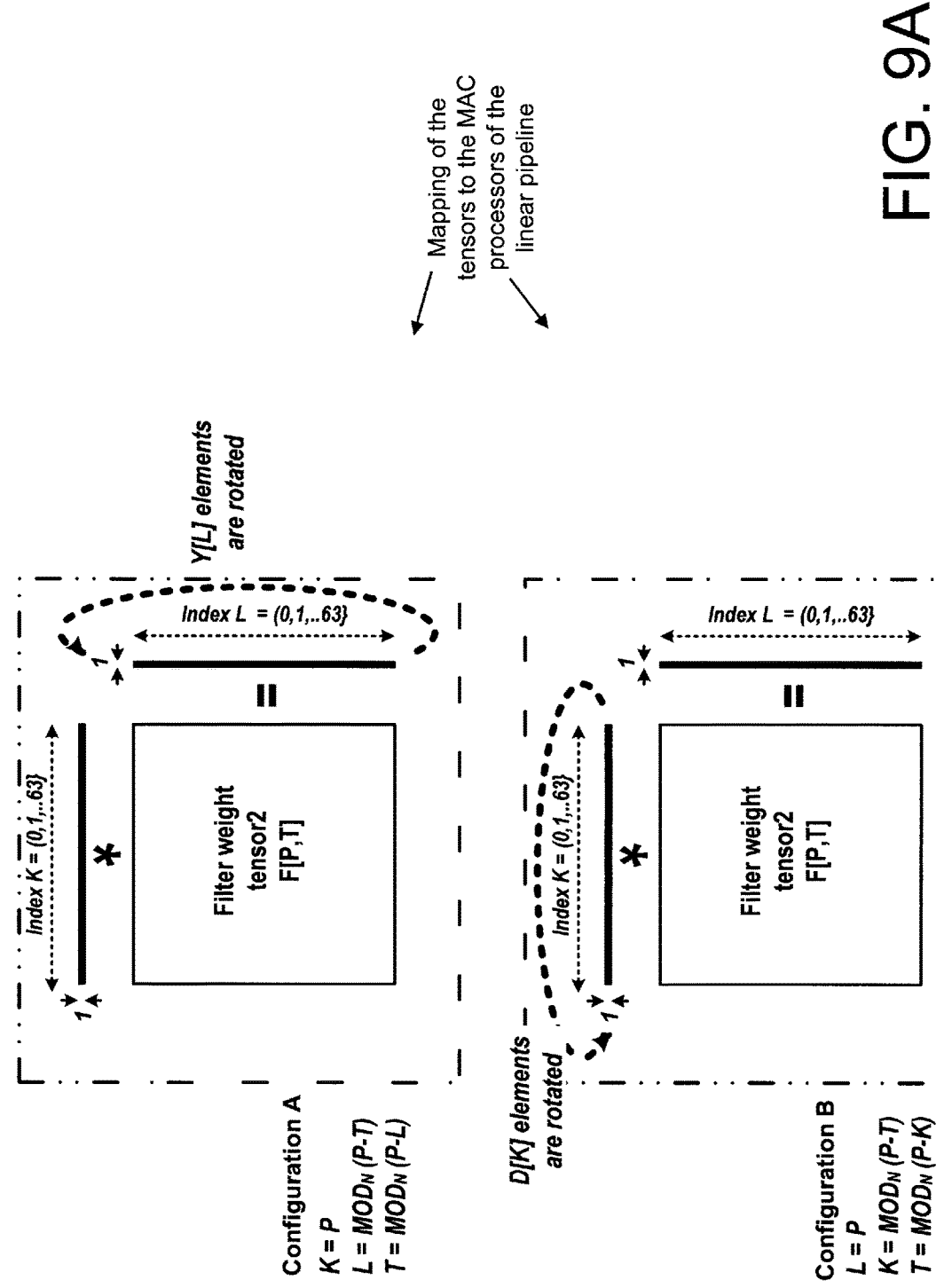
Figure 9B:
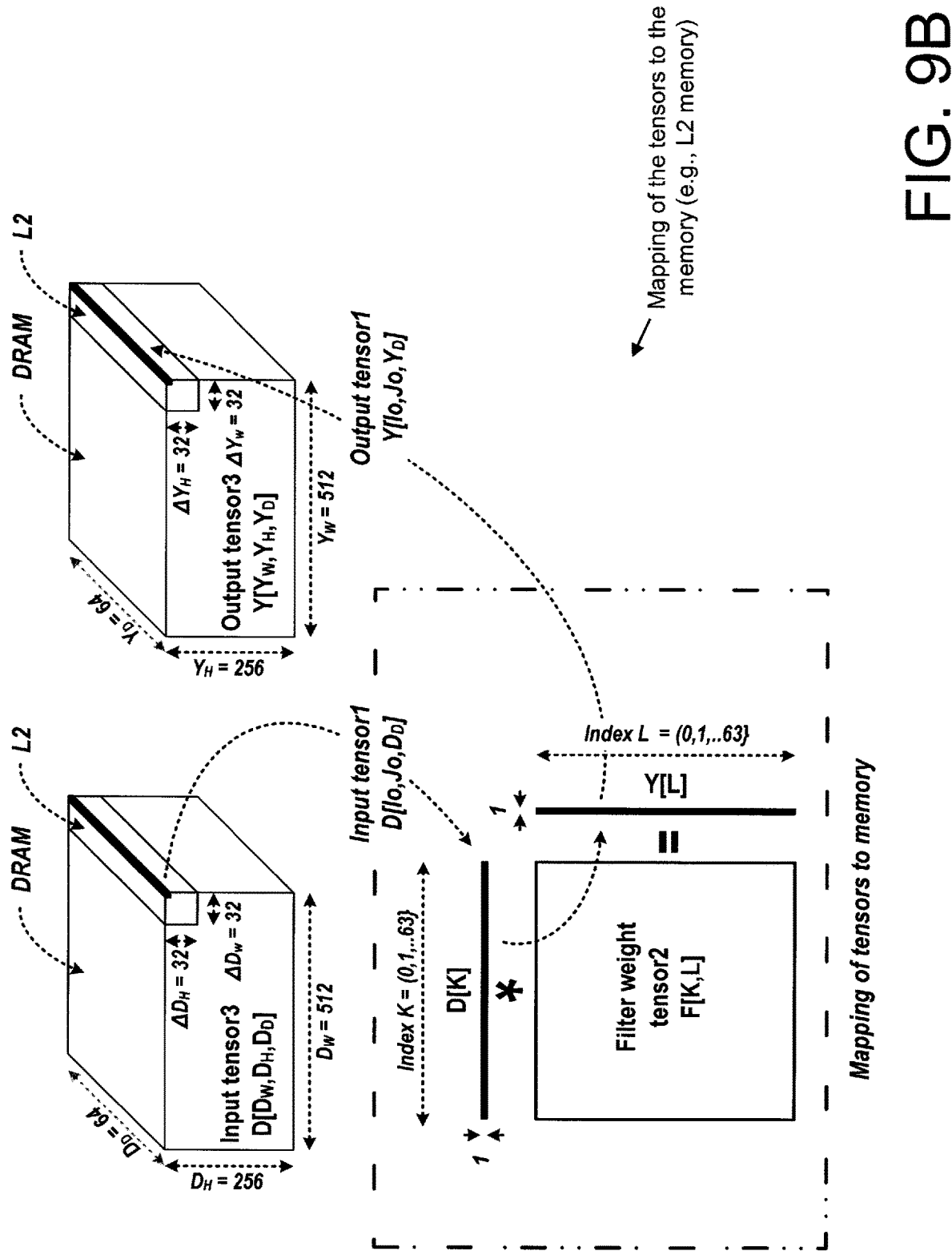
Figure 10B:
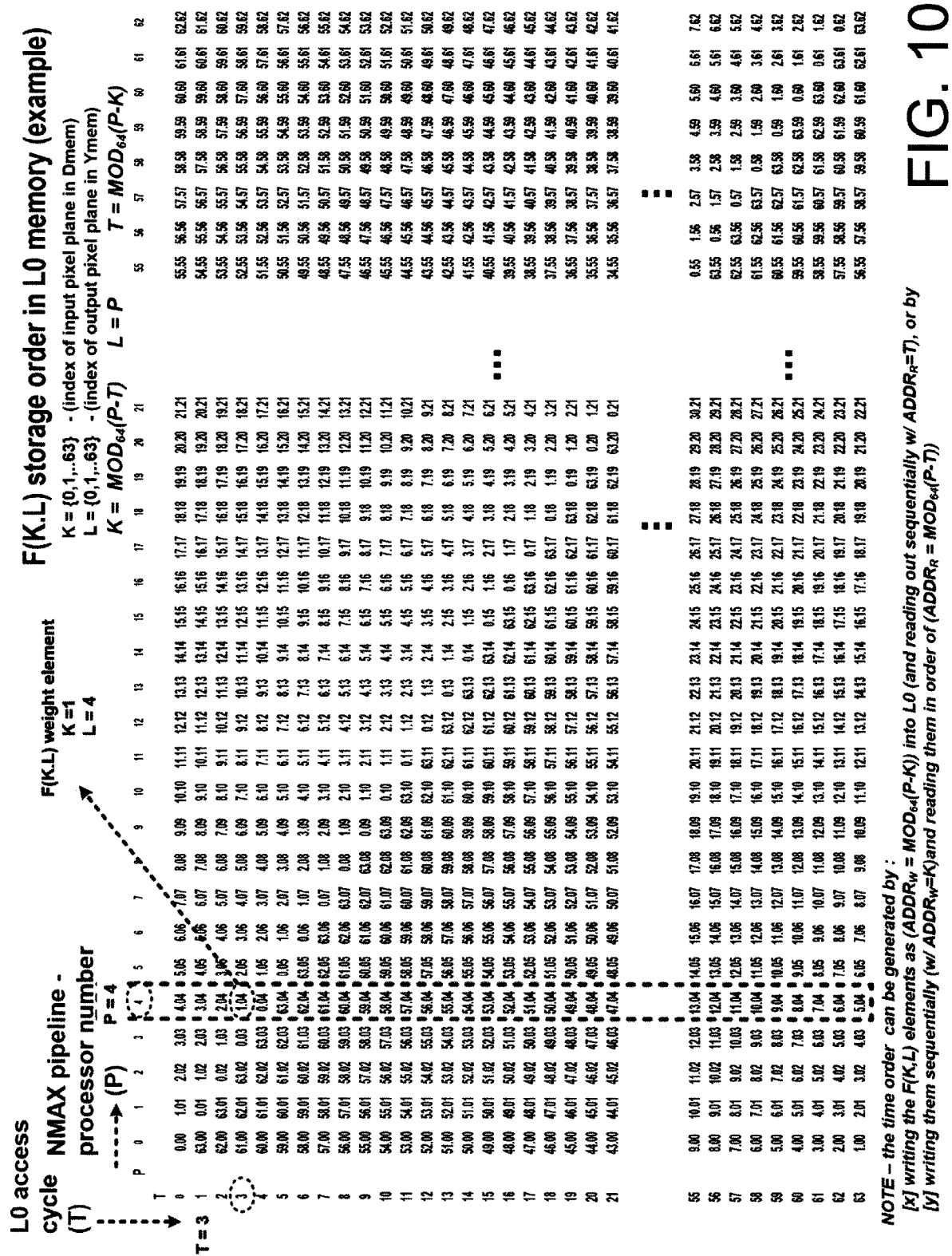
Figure 11:
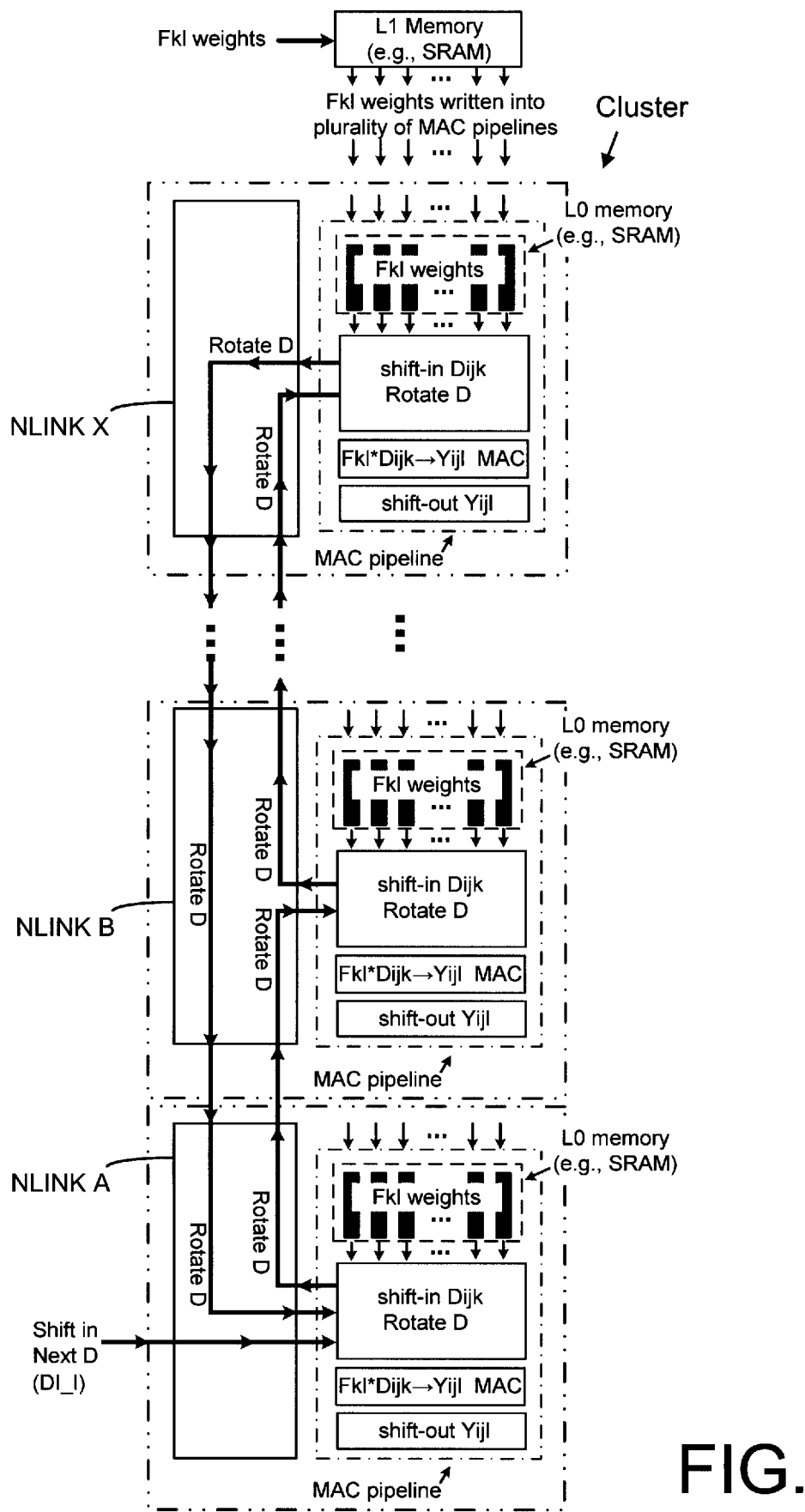

SRAM memory may provide data to a plurality of L0 SRAM memories, wherein each MAC of the linear pipeline (like that illustrated in block diagram form in FIG. 1A) is associated with a dedicated L0 SRAM memory of the plurality of L0 SRAM memories (associated with the L1 SRAM memory);

FIGS. 2B and 2C illustrate schematic block diagrams of exemplary multiplier-accumulator execution or processing pipelines including a plurality of serially connected MACs (e.g., 64; when m=64, see FIG. 2B) wherein input data values ("D") are rotated, transferred or moved, on a cycle-by-cycle basis, from one MAC (e.g., MAC Processor 1) of the linear pipeline to the immediately following MAC (e.g., MAC Processor 2) of the execution pipeline (see, D_i[p]) and employed in the multiply operation of the multiplier circuit of that next MAC (e.g., MAC Processor 2) of the processing pipeline forming a serial circular path, including the plurality of MAC processors, via the plurality of rotate current D data paths connecting sequential MAC processors of the linear pipeline, according to one or more aspects of the present inventions; in this embodiment, the output of each accumulator circuit ("ADD") of the MACs is input into the accumulator circuit ("ADD") of the associated MAC (see, MAC_r[p]) and employed in the accumulation operation; moreover the output of each accumulator circuit ("ADD") of the MACs is not rotated, transferred or moved to the immediately following MAC of the linear processing pipeline (compare FIGS. 1A-1C); in this way, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, according to one or more aspects of the present inventions; notably, each MAC includes a multiplier circuit ("MUL") to perform/implement the multiply operations and accumulator circuit ("ADD") to perform/implement the accumulate operations, according to one or more aspects of the present inventions; in this exemplary embodiment, MAC processor may include or read from one or more of memory banks (e.g., two SRAM memory banks) that are dedicated to the MAC to store filter weights used by the multiplier circuit of the associated MAC (as described and illustrated in U.S. Provisional Patent Application No. 62/012,111 (filed Apr. 18, 2020)), which is hereby incorporated by reference herein; notably, the individual MACs may, at times, be referred to herein as MAC processors);

FIG. 2D illustrates a high-level block diagram layout of an integrated circuit or a portion of an integrated circuit (which may be referred to, at times, as an X1 component) including a plurality of MAC execution pipelines, each pipeline having a plurality of MACs, wherein, MACs and the MAC pipelines are configurable such that, in operation, the data values (see "D_SI[p]" or "Dijk" in the expanded view of a portion of the high-level block diagrams of FIGS. 2A-2C) input into the MACs are rotated, transferred or moved (e.g., before, during or at the completion of each execution cycle of the execution sequence (i.e., set of associated execution cycles)) through the plurality of serially connected MACs of the processing pipeline such that each data value input into by a MAC is output before, during or at the completion of each execution cycle to the immediately following MAC of the linear pipeline and employed in the multiply operation of the multiplier circuit of that immediately following MAC, according to one or more aspects of the present inventions; the multi-bit MAC execution pipelines and/or the plurality of MACs may be configured to implement one or more processing architectures or techniques (singly or in combination with one or more X1 components); notably, in this illustrative embodiment, the multi-bit MAC execution pipelines are organized into clusters (in this illustrative embodiment, four clusters (labeled Clusters A, B, C and D) wherein each cluster includes a plurality of multi-bit MAC execution pipelines (in one illustrative embodiment each cluster includes 16, 64-MAC execution or processing pipelines); in one embodiment, the plurality of multiplier-accumulator circuits are configurable (one-time or multiple times, e.g., at start-up and/or in situ) to implement one or more pipelining processing architectures or techniques (in the illustrative embodiment, including, e.g., 64 MACs or MAC processors) which correlates to the schematic block diagram of a logical overview of an exemplary multiplier-accumulator circuit arranged in a linear execution pipeline configuration—see FIGS. 2A-2C and 3); the processing component in this illustrative embodiment includes memory (e.g., L2 memory, L1 memory and L0 memory (e.g., SRAM)), a bus interfaces (e.g., a PHY and/or GPIO) to facilitate communication with circuitry external to the component and memory (e.g., SRAM and DRAM) for storage and use by the circuitry of the component, and a plurality of switches/multiplexers which are electrically interconnected to form a switch interconnect network "Network-on-Chip" ("NOC") to facilitate interconnecting the clusters of multiplier-accumulator circuits of the MAC execution pipelines; in one embodiment, the NOC includes a switch interconnect network (e.g., a mixed-mode interconnect network (i.e., a hierarchical switch matrix interconnect network and a mesh, torus or the like interconnect network (hereinafter collectively "mesh network" or "mesh interconnect network")), associated data storage elements, input pins and/or look-up tables (LUTs) that, when programmed, determine the operation of the switches/multiplexers; in one embodiment, one or more (or all) of the clusters includes one or more computing elements (e.g., a plurality of multiplier-accumulator circuits—labeled as "NMAX Rows"—see, e.g., the '345 and '212 applications); notably, in one embodiment, each MAC execution pipeline (which, in one embodiment, includes a plurality of serially interconnected MACs which are configured in a linear pipeline) is connected to a plurality of associated L0 memories, one L0 memory (e.g., SRAM memory) is dedicated to each MAC of that processing pipeline; the associated L0 memory stores filter weights used by the multiplier circuit of each multiplier-accumulator circuit of that particular MAC processing pipeline in performance of the multiply operations, wherein each MAC processing pipeline of a given cluster is connected to an associated L0 memory (which, in one embodiment, is dedicated to the multiplier-accumulator circuits of that MAC processing pipeline); a plurality (e.g., 16) MAC execution pipelines of a MAC cluster (and, in particular, the L0 memory of each MAC execution pipeline of the cluster) is coupled to an associated L1 memory (e.g., SRAM memory); the associated L1 memory is connected to and shared by each of the MAC execution pipelines of the cluster to receive filter weights to be stored in the L0 memory associated with each MAC execution pipeline of the cluster; in one embodiment, the associated L1 memory is assigned and dedicated to the plurality of pipelines of the MAC cluster; notably, the shift-in and shift-out paths of each 64-MAC execution pipeline is coupled to L2 memory (e.g., SRAM memory) wherein the L2 memory also couples to the L1 memory and L0 memory; the NOC couples the L2 memory to the PHY (physical interface) which may connect to L3 memory (e.g., external DRAM); the NOC also couples to a PCIe or PHY which, in turn, may provide interconnection to or communication with circuitry external to the X1 processing component (e.g., an external processor, such as a host processor); the NOC, in one embodiment, may also connect a plurality of X1 components (e.g., via GPIO input/output PHYs) which allow multiple X1 components to process related data (e.g., image data), as discussed herein, in accordance with one or more aspects of the present inventions;

FIG. 3A-3C illustrate schematic block diagrams of exemplary multiplier-accumulator execution or processing pipelines including a plurality of serially connected MACs (one such MAC illustrated in detail) wherein the processing pipeline, and each MAC thereof, are configurable and/or re-configurable (e.g., via controlling the states of the MUX 1 and MUX 2) to process data (e.g., image data), according to: (1) Configuration A which includes rotating, transferring or moving the accumulation values generated by the MACs (e.g., before, during or at the completion of each execution cycle of the execution sequence (i.e., set of associated execution cycles)) through the plurality of MACs of the linear pipeline such that each accumulation value generated by a MAC is output, via an accumulation data path, before, during or at the completion of each execution cycle to the immediately following MAC of the linear pipeline (thereby providing a serial circular path, including the plurality of MAC processors, via the plurality of rotate current accumulation data paths connecting sequential MAC processors of the linear pipeline) and employed in the accumulation operation of the accumulator circuit of that immediately following MAC during the next execution cycle; or (2) Configuration B which includes rotating, transferring or moving the input data values, on a cycle-by-cycle basis, after input or loading of the initial data input values into the MACs of the linear pipeline, from one MAC of the linear pipeline to the immediately following MAC of the linear pipeline (thereby providing a serial circular path, including the plurality of MAC processors, via the plurality of rotate current D data paths connecting sequential MAC processors of the linear pipeline) and employed in the multiply operation of the multiplier circuit of that next MAC of the processing pipeline during the next execution cycle; in Configuration A, the output of each accumulator circuit ("ADD") of the MACs is coupled to the input of the immediately following accumulator circuit ("ADD") of the MACs of the linear processing pipeline wherein, in this way, accumulation values ("Y") generated by the MACs (see, MAC_r[p]) are rotated, transferred or moved (e.g., before, during or at the completion of each execution cycle of the execution sequence) through the plurality of serially connected MACs of the pipeline such that each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC; notably, each MAC includes a multiplier circuit ("MUL") to perform/implement the multiply operations and accumulator circuit ("ADD") to perform/implement the accumulate operations, according to one or more aspects of the present inventions; in this exemplary configuration, MAC processor may include or read from one or more of memory banks (e.g., two SRAM memory banks) that are dedicated to the MAC to store filter weights used by the multiplier circuit of the associated MAC; in Configuration B, after input or loading of the initial data input values into the MACs of the linear pipeline, the input data values ("D") are rotated, transferred or moved, on a cycle-by-cycle basis, from one MAC of the linear pipeline to the immediately following MAC of the execution pipeline (see, D_i[p]) and employed in the multiply operation of the multiplier circuit of that next MAC of the linear pipeline; in this configuration, the output of each accumulator circuit ("ADD") of the MACs is input into the accumulator circuit ("ADD") of the associated MAC (see, MAC_r[p]) and employed in the accumulation operation; moreover the output of each accumulator circuit ("ADD") of the MACs is not rotated, transferred or moved to the immediately following MAC of the linear processing pipeline (compare FIGS. 1A-1C); in this way, the input data values ("D") are rotated, transferred or moved (e.g., before, during or at the completion of each execution cycle of the execution sequence) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC, according to one or more aspects of the present inventions;

FIG. 4 illustrates a schematic block diagram of an exemplary embodiment of (i) a linear MAC pipeline, including configuration control circuitry to program, configure and/or control a plurality of serially interconnected MACs (e.g., FIGS. 3A and 3B) of an execution pipeline or rows/banks of interconnected (in series) MACs of an execution pipeline to process input data (e.g., image data) according to one or more aspects of the present inventions; in one embodiment, the configuration memory (e.g., a configuration register) may store configuration data, including the architecture of the MAC pipeline; such configuration memory may be programmed at or during power-up, start-up, initialization, re-initialization and/or in situ; in one embodiment, the configuration control circuitry controls, via control signal(s), the states of the multiplexers MUX 1 and MUX 2 (see FIGS. 3A-3C) and thereby establish, configure and/or determine the architecture of the data processing implemented by the MACs of the linear pipeline—e.g., whether according to a rotating of the accumulation values embodiment or a rotating of input data values embodiment (see, FIGS. 3A-3C);

FIG. 5 illustrates a schematic block diagram of a logical overview of an exemplary multiplier-accumulator execution pipeline, connected in a linear pipeline configuration wherein the input data are input or loaded into a plurality of MACs of the pipeline and, in operation, the accumulation values generated by the MACs are rotated, transferred or moved (e.g., before, during or at the completion of each execution cycle of the execution sequence (i.e., set of associated execution cycles)) through the plurality of serially connected MACs of the pipeline such that each accumulation value generated by a MAC is output before, during or at the completion of each execution cycle to the immediately following MAC of the linear pipeline and employed in the accumulation operation of the accumulator circuit of that immediately following MAC, according to one or more aspects of the present inventions; in this embodiment, the linear execution pipeline of serially connected MACs process n×n blocks of data (in the illustrative embodiment n=3, although may be any whole number, e.g., 2, 3, 4, etc.); where n=3 and m=64, the pipeline employs 9, 64-MAC execution cycles to process 64 input data/values (e.g., pixels) of Dij into the L=64 output data/values of Yij (i.e., processed data); in this illustrative embodiment, eight input data (D((i±1,j±1) pixels surrounding each pixel at Dij are also multiplied by the additional eight Fkl(i±1,j±1) weight values; as such, in one embodiment, (i) there are nine loading sequences for loading the 9×64 Dijk values from L2 memory, (ii) there are nine execution sequences with each performing 64×64 MAC operations, and (iii) there is a single unloading sequence at the end to move the 64 Yijl values to L2 memory; notably, the plurality of MACs is illustrated in block diagram form; an exemplary MAC is illustrated in schematic block diagram form in Inset A; in addition, in one embodiment, the filter weights or weight data are loaded into memory (e.g., L1/L0 SRAM memories) before the multiplier-accumulator circuit starts processing (see, e.g., the '345 and '212 applications); in one embodiment, the L1 SRAM memory may provide data to a plurality of L0 SRAM memories, wherein each MAC of the linear pipeline is associated with a dedicated L0 SRAM memory of the plurality of L0 SRAM memories (associated with the L1 SRAM memory);

FIGS. 6A and 6B illustrate schematic block diagrams of logical overviews of an exemplary multiplier-accumulator execution pipeline, connected in a linear pipeline configuration wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline, according to one or more aspects of the present inventions; in this embodiment, before, during or after each cycle of the set of associated execution cycles, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC; in this embodiment, the accumulation values generated by each MAC are maintained, stored or held, during each execution cycle of the execution sequence (i.e., set of associated execution cycles), in respective MAC and used in the accumulation operation of the associated accumulator circuit thereof and employed in subsequent processing; in addition, in this embodiment, the linear execution pipeline of serially connected MACs process n×n blocks of data (in the illustrative embodiment n=3, although may be any whole number, e.g., 2, 3, 4, etc.); where n=3 and m=64, the pipeline employs 9, 64-MAC execution cycles to process 64 input data/values (e.g., pixels) of Dij into the L=64 output data/values of Yij (i.e., processed data); in this illustrative embodiment, eight input data (D((i±1,j±1) pixels surrounding each pixel at Dij are also multiplied by the additional eight Fkl(i±1,j±1) weight values; as such, in one embodiment, (i) there are nine loading sequences for loading the 9×64 Dijk values from L2 memory, (ii) there are nine execution sequences with each performing 64×64 MAC operations, and (iii) there is a single unloading sequence at the end to move the 64 Yijl values to L2 memory; notably, the plurality of MACs is illustrated in block diagram form; an exemplary MAC is illustrated in schematic block diagram form in Inset A; in addition, in one embodiment, the filter weights or weight data are loaded into memory (e.g., L1/L0 SRAM memories) before the multiplier-accumulator circuit starts processing (see, e.g., the '345 and '212 applications); in one embodiment, the L1 SRAM memory may provide data to a plurality of L0 SRAM memories, wherein each MAC of the linear pipeline is associated with a dedicated L0 SRAM memory of the plurality of L0 SRAM memories (associated with the L1 SRAM memory);

FIG. 7 illustrates a schematic/flow block diagram of a logical overview of an exemplary embodiment of a plurality of multiplier-accumulator circuit (MAC) execution or processing pipelines wherein the input data and the filter weights or coefficients are organized into a plurality of groups for Winograd type processing via the MAC processing pipelines wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline, according to one or more aspects of the present inventions; in this embodiment, before, during or after each cycle of the execution sequence (i.e., set of associated execution cycles), the input data are rotated, transferred or moved from a MAC of the linear pipeline to successive MAC thereof wherein the rotated, transferred or moved input data are input or applied to the multiplier circuit of associated MAC during or in connection with the multiply operation of that MAC; in this embodiment, the accumulation values generated by each MAC are maintained, stored or held, during each execution cycle of the execution sequence, in respective MAC and used in the accumulation operation of the associated accumulator circuit thereof and employed in subsequent processing; in this embodiment, a plurality of filter weights are also associated, arranged in or employed by and/or input into the processing circuitry in groups (e.g., 16 filter coefficients in each group wherein each group may be arranged in and/or employed as a 4×4 matrix); the filter weights, in a Winograd format, are then available to or input into the plurality of MACs of the execution pipelines which implement/perform the multiply and accumulate operations to process the input data (Dij, e.g., image data); input data values (Dij) are rotated, transferred or moved, on a cycle-by-cycle basis, from one MAC of the linear pipeline to the immediately following MAC of the pipeline and employed in the multiply operation of the multiplier circuit of that next MAC of the processing pipeline, according to one or more aspects of the present inventions; in this exemplary embodiment, multiplier-accumulator circuit implements Winograd processing techniques, to process the image data, described and/or illustrated in U.S. Non-Provisional patent application Ser. No. 16/796,111, entitled "Multiplier-Accumulator circuit having Processing Pipelines and Methods of Operating Same", filed Feb. 20, 2020 and/or U.S. Provisional Patent Application No. 62/823,161, entitled "Multiplier-Accumulator circuit having Processing Pipeline and Methods of Operating and Using Same", filed Mar. 25, 2019; U.S. Non-Provisional patent application Ser. No. 17/031,631, entitled "MAC Processing Pipeline having Conversion Circuitry, and Methods of Operating Same", filed Sep. 24, 2020, and/or U.S. Provisional Patent Application No. 62/909,293, entitled "Multiplier-Accumulator circuit Processing Pipeline and Methods of Operating Same", filed Oct. 2, 2019; these four (4) patent applications are incorporated herein by reference; moreover, the Winograd conversion circuitry may employ the circuitry and techniques described and/or illustrated in the '111 application, the '161 application, the '631 application and/or the '293 application; notably, Inset A illustrates an exemplary pseudo-code of the schematic block diagram of a logical overview of the illustrated exemplary embodiment of MAC processing pipelines;

FIG. 8A illustrates an exemplary timing diagram for two MAC processors (p=4 and p=5) configured according to the embodiment of, for example, FIGS. 1A and/or 1B, according to one embodiment of the present inventions, wherein the time interval illustrated herein for two of the MAC processors (p=4 and p=5) of a 64 MAC linear pipeline, provides over 200 pipeline execution cycles; in a 64 MAC pipeline, the time interval set forth herein includes three (3), 64-cycle execution sequences (i.e., in this illustrative example, 64 execution cycles in the execution sequence) for the two MAC processors; notably, the other MAC processors will include the same timing;

FIG. 8B illustrates an exemplary timing diagram for two MAC processors (p=4 and p=5) configured according to the embodiment of, for example, FIGS. 2A and/or 2B, according to one embodiment of the present inventions, wherein the time interval illustrated herein for two of MAC processors (p=4 and p=5), of a 64 MAC linear pipeline, provides over 200 pipeline execution cycles; in a 64 MAC pipeline, the time interval set forth herein includes three (3), 64-cycle execution sequences (i.e., in this illustrative example, 64 execution cycles in the execution sequence) for the two MAC processors; notably, the other MAC processors will include the same timing;

FIG. 9A illustrates a mapping of the tensors to the MAC processors for the configuration according to the embodiment of, for example, FIGS. 1A-1C (referred to, at times, as Embodiment A or Configuration A), and the configuration according to the embodiment of, for example, FIG. 2A-2C (referred to, at times, as Embodiment B or Configuration B), according to aspects of the present inventions;

FIG. 9B illustrates a mapping of the tensors to memory (e.g., L3 memory or DRAM, and L2 memory or SRAM) for the configuration according to the embodiment of, for example, FIG. 1A/1B, and the configuration according to the embodiment of, for example, FIG. 2A/2B, according to aspects of the present inventions; notably, the mapping of the tensors to memory for each configuration embodiment may be the same;

Figure 10A:
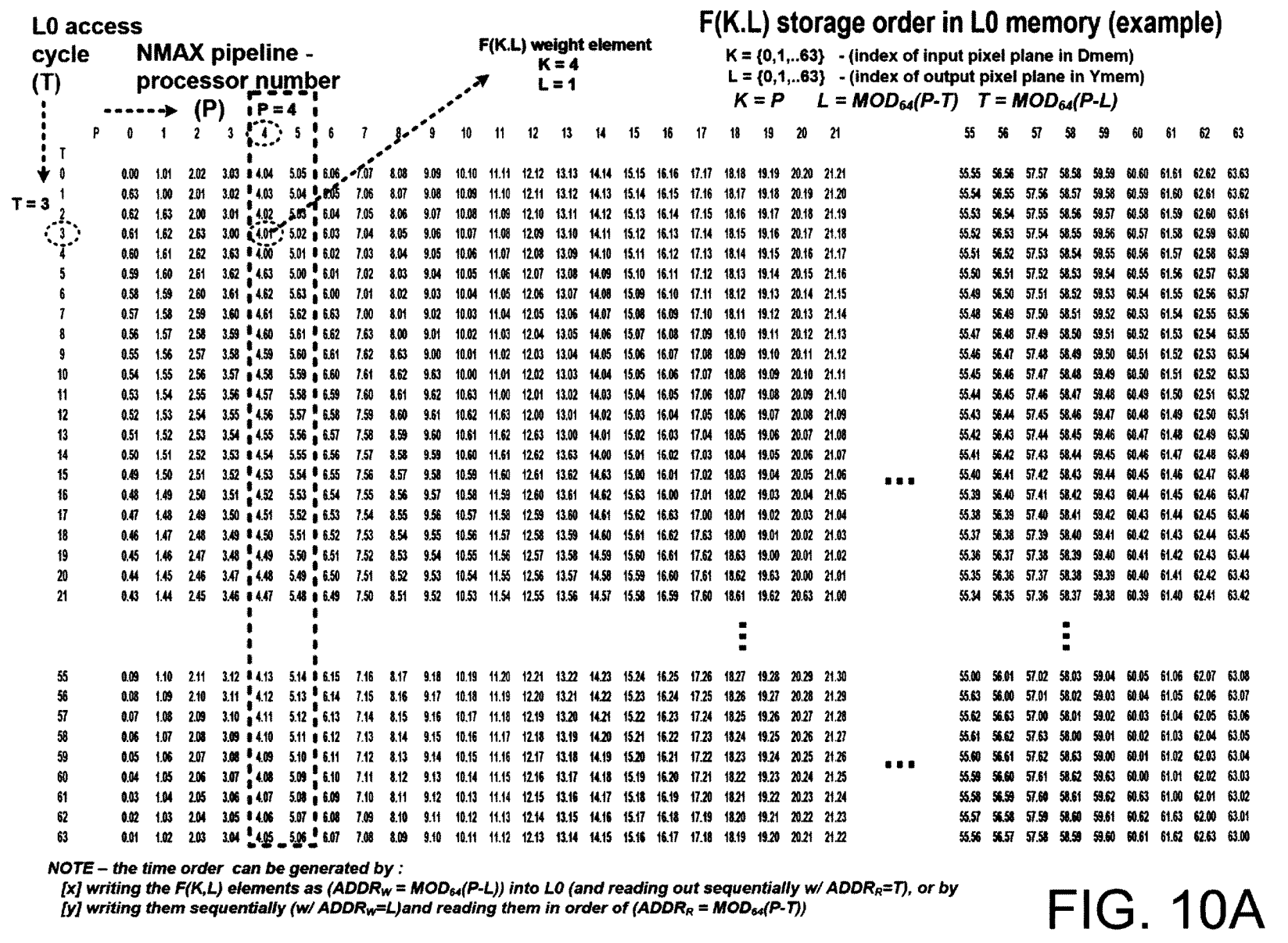

FIG. 10A illustrates an exemplary complete set of filter weights for an embodiment where there are 64 input planes of data/values (i.e., K=64 input planes) and 64 output planes of data/values (i.e., L=64 output planes) according to the embodiment of, for example, FIGS. 1A-1C (referred to, at times, as Embodiment A or Configuration A), according to aspects of the present inventions; and FIG. 10B illustrates an exemplary complete set of filter weights for an embodiment where there are 64 input planes of data/values (i.e., K=64 input planes) and 64 output planes of data/values (i.e., L=64 output planes) according to the embodiment of, for example, FIG. 2A-2C (referred to, at times, as Embodiment B or Configuration B), according to aspects of the present inventions FIG. 11 illustrates signal paths of an exemplary interconnect architecture of a plurality of MAC pipelines are connected, in this illustrative embodiment, via control/configure or NLINK circuits connected in series, wherein each NLINK circuit connected (and, in one embodiment, dedicated) to an associated MAC pipeline which, when the control/configure or NLINK circuits are connected, is a portion of a composite/larger linear MAC pipeline that is formed by serially connected MACs associated with each of the serially connected of the illustrative pipeline architecture, wherein in this embodiment, the MAC pipelines (or Tensor processors) form a circular shifting data path (e.g., a ring path) for rotating the input data between the MAC pipelines wherein each MAC pipeline, in one embodiment, may be configured as illustrated in FIGS. 2C, 3B and 3C wherein input data values ("D") are rotated, transferred or moved, on a cycle-by-cycle basis, from one MAC (e.g., MAC Processor 1) of the linear pipeline to the immediately following MAC (e.g., MAC Processor 2) of the execution pipeline (see, D_i[p]) and employed in the multiply operation of the multiplier circuit of that next MAC (e.g., MAC Processor 2) of the processing pipeline forming a serial circular path, including the plurality of MAC processors, via the plurality of rotate current D data paths connecting sequential MAC processors of the linear pipeline, intermediate accumulation values to traverse through the plurality of processing circuitry in a cluster (or portion thereof), according to certain aspects of the present inventions; for purposes of clarity, aside from the DI_I inputs into NLINK A for shifting in the "next data D", the shift-in data path connecting the plurality of MAC pipelines (one associated with each NLINK circuit) are not illustrated wherein such inputs, in one embodiment, are an open shift-in chain that connects each MAC pipeline associated with each NLINK circuit (see FIG. 5A of U.S. application Ser. No. 17/212,411) which form the composite linear processing pipeline; notably, in one embodiment, the MAC processors do not include a shift-in data path in the MACs (other than the first MAC of the pipeline) and/or in the control/configure circuits that connects the plurality of MAC pipelines; in the illustrated embodiment, the control/configure or NLINK circuits are configured to connect to one or more of such circuits via Rotate D conductors, paths and ports of the control/configure or NLINK circuit that, together with the MAC pipeline (including a plurality of serially or linearly connected MACs like those illustrated in FIGS. 2C, 3B and 3C) associated with each control/configure or NLINK circuit, form a circular shifting data path or chain of a linear processing pipeline; in this illustrated embodiment, each control/configure or NLINK circuit is connected (and, in one embodiment, dedicated) to a MAC pipeline (which may be a pipeline configured in a serial circular path (e.g., serial circular shifting path (e.g., rotate D path is in a ring data path configuration)), such as in FIG. 2B), or part of a larger pipeline as illustrated here); an exemplary control/configure or NLINK circuit is illustrated in U.S. application Ser. No. 17/212,411 and U.S. Provisional Application 63/012,111, which are hereby incorporated by reference in their entirety; the control/configure or NLINK circuits may be connected in series to form a circular data path or circular shifting data path or chain for rotating, transferring or moving between the MAC processors of the MAC pipeline to traverse through the plurality of MAC processors of the plurality of MAC pipelines in a cluster (or portion thereof), according to certain aspects of the present inventions; here, the NLINK circuits are configured to connect to one or more other NLINK circuits via Rotate D ports of the control/configure or NLINK circuit to form the shifting chain of a processing pipeline wherein, each control/configure or NLINK circuit connected (and, in one embodiment, dedicated) to a MAC pipeline including a plurality of associated MACs; notably, most of the connections, signals, signal paths/lines and ports in and between the control/configure or NLINK circuits in FIG. 11 have been omitted for purposes of clarity.

As stated above, the pseudo-code, operations, configurations, block/data width, data path width, bandwidths, data lengths, values, processes and/or algorithms described and/or illustrated in the FIGURES are exemplary and the inventions hereof are not limited to any particular or exemplary circuit, logical, block, functional and/or physical diagrams, number of multiplier-accumulator circuits employed in an execution pipeline, number of execution pipelines employed in a particular processing configuration/architecture, organization/allocation of memory, block/data width, data path width, bandwidths, values, processes, pseudo-code, operations, and/or algorithms illustrated and/or described in accordance with, for example, the exemplary circuit, logical, block, functional and/or physical diagrams. Moreover, although the illustrative/exemplary embodiments include a plurality of memories (e.g., L3 memory, L2 memory, L1 memory, L0 memory) which are assigned, allocated and/or used to store certain data (e.g., filter weights) and/or in certain organizations. Indeed, the organizations of the memories may be changed wherein one or more of memories may be added, and/or one or more memories may be omitted and/or combined/consolidated with other memories—for example, (i) the L3 memory or L2 memory and/or (ii) the L1 memory or L0 memory.

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed or illustrated separately herein.

DETAILED DESCRIPTION

In a first aspect, the present inventions are directed to one or more multiplier-accumulator processing pipelines (and methods of data processing as well as operating and configuring such pipeline(s)), wherein each pipeline includes a plurality of serially interconnected MACs wherein each MAC performs multiply and accumulate operations to process input data (e.g., image data). In one embodiment, the MACs of the serially or linearly connected pipeline perform multiply and accumulate operations to process input data in a concatenating manner. For example, in one embodiment, the input data are input or loaded into the plurality of MACs of the pipeline and, in operation, the accumulation values generated by the MACs are thereafter rotated, transferred or moved (e.g., before, during or at the completion of each execution cycle of the execution sequence (i.e., set of associated execution cycles)) through the plurality of serially interconnected MACs such that each accumulation value generated by a MAC is output before, during or at the completion of each execution cycle to the immediately following MAC of the linear pipeline. The rotated, transferred or moved accumulation values are employed in the accumulation operation, via the accumulator circuit, in respective MAC in the next execution cycle. In this embodiment, the input data input or loaded into the plurality of MACs of the pipeline do not rotate before, during or at the completion of each execution cycle of the execution sequence.

With reference to FIGS. 1A-1C, in one embodiment, the multiplier circuit of each MAC receives input data (Dijk) and an associated filter weight Fkl (e.g., from memory—see, e.g., FIG. 1B, Memory L0, RD(p)). Briefly, in operation, the MACs of the linear pipeline receive the filter weight and input data (D), provide such data to the multiplier circuit (MUL) to perform a multiply operation and, upon completion, provide the product result to an associated accumulator circuit (ADD). In this embodiment, the accumulator circuit of each MAC also receives the accumulation value (i.e., Rotated current Y) generated by the accumulator circuit of the immediately previous MAC in the previous execution cycle.

In one embodiment, a plurality of MACs (e.g., 64) are configured (via configuration control circuitry) in a linear multiplier-accumulator execution or processing pipeline. Each MAC (which may be included in, labeled as, and/or referred to as "processing element" or "MAC processor") includes multiplier circuit ("MUL") and an accumulator circuit ("ADD") and, in one embodiment, is connected to one or more "local" memory/register banks (which, in one embodiment, are associated with and dedicated to a particular MAC), to receive a plurality of filter weights, to be employed in connection with the multiply operations associated with the processing of an associated set of input data (e.g., image data).

In one embodiment, the MAC processor is connected to two (2) memory/register banks (e.g., L0 such as SRAM). (See, FIG. 1B). In this embodiment, the two memory/register banks are independent banks such that in each execution cycle, one of the banks for each MAC may be read (using the shared read address bus), placing the read data on an associated RD[p] signal line that is input into the multiplexer ("mux"). The read data is moved/written into the F register (D_r[p]) to be used in the execution cycle. The F register (D_r[p]) is written with a new filter weights (Fkl value) for each execution cycle. Notably, the MACs of the linear pipeline illustrated in FIG. 1A may employ one (1) memory/register bank, two (2) memory/register bank embodiment, or more than two (2) memory/register bank embodiment.

With continued reference to FIGS. 1A-1C, regarding the execution cycles (and sets thereof), each MAC processor includes the shifting chain (D_Sl[p]) for the data input (Dijk data). In one embodiment, the next Dijk data is shifted in while the current Dijk data is used in the current execution sequence. The current Dijk data is stored in the D_i[p] register during the execution cycles of the current execution sequence without changing.

The MAC processor includes a shifting chain (MAC_SO[p]) for preloading the Yijl sum. The next set of Yijl sums are shifted in while the current set of Yijl sums are calculated/generated during the execution cycles of the current execution sequence. In this embodiment, each MAC also uses the shifting chain (MAC_SO[p]) for unloading or outputting the Yijl sum. The previous Yijl sums are shifted out (e.g., rotated, transferred) while the current Yijl sums are generated during the execution cycles of the current execution sequence. Notably, in this embodiment, the Yijl shifting chain (MAC_SO[p]) may be employed for both preloading and unloading operations.

In an execution cycle of the execution sequence, the filter weight value (Fkl value) in the D_r[p] register is multiplied by the Dijk value in the D_i[p] register, via multiplier circuit, and the result is output to the MULT_r[p] register. In the next pipeline cycle this product (i.e., D*F value) is added to the Yijl accumulation value in the MAC_r[p−1] register (in the previous multiplier-accumulator circuit) and the result is stored in the MAC_r[p] register. This execution process is repeated for each execution cycle of the execution sequence. Notably, the Yijl accumulation values are output (moved or rotated), during or after each execution cycle of the execution sequence, to the immediately following MAC of the linear pipeline and subsequently employed in the accumulation operation. In this way, the accumulation values generated by the MACs are rotated, transferred or moved (e.g., before, during or at the completion of each execution cycle of the set of associated execution cycles) through the plurality of serially interconnected MACs of the pipeline such that each accumulation value generated by a MAC is output before, during or at the completion of each execution cycle to the immediately following MAC of the linear pipeline and subsequently employed in the accumulation operation of that immediately following MAC. Notably, the input data that are loaded or input into the plurality of MACs of the pipeline during operation do not rotate during each execution cycle of the execution sequence (i.e., set of associated execution cycles). Here, the input data are stored in the "D register" of the associated MAC during the execution sequence.

With reference to FIG. 1D, an integrated circuit may include a plurality of multi-bit MAC execution pipelines which are organized as one or more clusters of a processing component. Here, the component may include "resources" such as a bus interfaces (e.g., a PHY and/or GPIO) to facilitate communication with circuitry external to the component and memory (e.g., SRAM and DRAM) for storage and use by the circuitry of the component. For example, in one embodiment, four clusters are included in the component (labeled "X1") wherein each cluster includes a plurality of multi-bit MAC execution pipelines (for example, in this illustrative embodiment 16 64-MAC execution pipelines). Notably, one MAC execution pipeline of FIG. 1D is illustrated at the lower right for reference purposes (which in this illustrative embodiment includes m MAC processing circuits like that in FIG. 1A).

With continued reference to FIG. 1D, the memory hierarchy in this exemplary embodiment includes an L0 memory (e.g., SRAM) that stored filter weights or coefficients to be employed by multiplier-accumulator circuits in connection with the multiplication operations implemented thereby. In one embodiment, each MAC execution pipeline includes an L0 memory to store the filter weights or coefficients associated with the data under processing by the circuitry of the MAC execution pipeline. (See, FIG. 1B). An L1 memory (a larger SRAM resource) is associated with each cluster of MAC execution pipelines. These two memories may store, retain and/or hold the filter weight values Fkl employed in the multiply and accumulation operations.

Notably, the embodiment of FIG. 1D may employ an L2 memory (e.g., an SRAM memory that is larger than the SRAM of L1 or L0 memory). A network-on-chip (NOC) couples the L2 memory to the PHY (physical interface) to provide connection to an external memory (e.g., L3 memory—such as, external DRAM component(s)). The NOC also couples to a PCIe PHY which, in turn, couples to an external host. The NOC also couples to GPIO input/output PHYs, which allow multiple X1 components to be operated concurrently. The configuration control circuitry (which may be disposed in the "NLINK" or "NLINK circuit") connect to multiplier-accumulator circuitry (which includes a plurality (in one exemplary embodiment, 64) MACs or MAC processors) to, among other things, configure the overall execution pipeline by providing or "steering" data between one or more MAC pipeline(s), via programmable or configurable interconnect paths. In addition, the configuration control circuitry may configure the interconnection between the multiplier-accumulator circuitry and one or more memories—including external memories (e.g., L3 memory, such as external DRAM)—that may be shared by one or more (or all) of the clusters of MAC execution pipelines. These memories may store, for example, the input image pixels Dijk, output image pixels Yijl (i.e., image data processed via the circuitry of the MAC pipeline(s), as well as filter weight values Fkl employed in connection with such data processing.

Notably, although the illustrative or exemplary embodiments described and/or illustrated a plurality of different memories (e.g., L3 memory, L2 memory, L1 memory, L0 memory) which are assigned, allocated and/or used to store certain data and/or in certain organizations, one or more of other memories may be added, and/or one or more memories may be omitted and/or combined/consolidated—for example, the L3 memory or L2 memory, and/or the organizations may be changed. All combinations are intended to fall within the scope of the present inventions. (See, e.g., FIG. 1C).

Moreover, in the illustrative embodiments set forth herein (text and drawings), the multiplier-accumulator circuitry and/or multiplier-accumulator pipeline is, at times, labeled in the drawings as "NMAX", "NMAX pipeline", "MAC", or "MAC pipeline".

With continued reference to FIG. 1D, the integrated circuit(s) include a plurality of clusters (e.g., two, four or eight) wherein each cluster includes a plurality of MAC execution pipelines (e.g., 16). Each MAC execution pipeline may include a plurality of separate multiplier-accumulator circuits (e.g., 64) to implement multiply and accumulate operations. In one embodiment, a plurality of clusters are interconnected to form a processing component (such component is often identified in the figures as "X1" or "X1 component") that may include memory (e.g., SRAM, MRAM and/or Flash), a switch interconnect network to interconnect circuitry of the component (e.g., the multiplier-accumulator circuits and/or MAC execution pipeline(s) of the X1 component) and/or circuitry of the component with circuitry of one or more other X1 components. Here, the multiplier-accumulator circuits of the one or more MAC execution pipelines of a plurality of clusters of a X1 component may be configured to concurrently process related data (e.g., image data). That is, the plurality of separate multiplier-accumulator circuits of a plurality of MAC pipelines may concurrently process related data to, for example, increase the data throughput of the X1 component.

Notably, the X1 component may also include interface circuitry (e.g., PHY and/or GPIO circuitry) to interface with, for example, external memory (e.g., DRAM, MRAM, SRAM and/or Flash memory). Indeed, the NLINK circuitry and X1 component are discussed in detail in U.S. patent application Ser. No. 17/019,212 (filed Sep. 12, 2020) and U.S. Provisional Application 63/012,111, filed Apr. 18, 2020, which, as noted above, are incorporated by reference herein. Moreover, the MAC disposed on the integrated circuit of FIG. 1D may be configured into any of the execution pipeline(s) described and/or illustrated therein.

With reference to FIGS. 2A-2C, in another embodiment, a plurality of MACs are interconnected into a linear processing pipeline wherein the input data values are rotated, transferred or moved through the MACs of the pipeline (before, during or at the completion of an execution cycle of a execution sequence). In this embodiment, the accumulation values generated by each MAC are maintained, stored or held in the associated MAC (e.g., in the Y register of the associated MAC), during each execution cycle of the execution sequence (i.e., set of associated execution cycles), of the processing pipeline and used in the accumulation operation of the accumulator circuit of the associated MAC. In this regard, in one embodiment, in operation, after input or loading of the initial data input values into the MACs of the linear pipeline, the input data values are rotated, transferred or moved, on a cycle-by-cycle basis, from one MAC of the linear pipeline to the immediately following MAC of the pipeline after the multiply operation of a given execution cycle and subsequently employed in the multiply operation of the multiplier circuit of that next MAC of the processing pipeline in a subsequent execution cycle. As noted above, however, the accumulation values generated by each MAC are maintained, stored or held, during each execution cycle of the execution sequence, in respective MAC (e.g., the associated Y register) and used in the accumulation operation of the associated accumulator circuit thereof. Thus, in this embodiment, the input data are rotated, transferred or moved, on a cycle-by-cycle basis during an execution sequence, from one MAC of the linear pipeline to the immediately following MAC (of the pipeline) whereas, during processing of the execution sequence, the accumulation values generated by each MAC are not rotated, transferred or moved from one MAC of to the immediately following MAC but are maintained, held or stored in the MAC for use in subsequent processing during the associated execution cycles of the set of execution cycles (i.e., execution sequence).

With continued reference to FIGS. 2A-2C, in one embodiment, the multiplier circuit of each MAC receives input data (Dijk) and an associated filter weight Fkl (e.g., from memory—see, e.g., FIG. 2B, Memory L0, RD(p)). After the initial load of input data (from "Shift in next data D"), the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline. Here, each MAC processor (and the linear pipeline) includes a shifting chain (D_SI[p]) for input of the input data (Dijk data). In operation, the next Dijk data is shifted in while the current Dijk data is employed in the current execution cycle of the execution sequence. In one embodiment, the current Dijk data is shifted between the D registers of the MAC processors of the linear pipeline during the current set of execution cycles of the sequence (i.e., the data D_i are transferred or will move (rotate) during the execution sequence). Concurrently, the MACs receive the associated filter weights (associated with the input data and, in one embodiment, the particular MAC processor in the linear pipeline) wherein the multiplier circuit performs a multiply operation and, upon completion, the product is temporarily stored in register D*F and then output or provided to an associated accumulator circuit (ADD). Notably, the Fkl filter weights are distributed across the L0 SRAMs (there is one L0 SRAM associated with or located in each of the MAC processors and dedicated to the multiply-accumulate operations of that MAC) wherein in each execution cycle, the Fkl values (RD[p])) are read from memory (here, L0 memory) and provided or passed to the associated multiplier circuit of the MAC, via the associated register F.

In this embodiment, the linearly connected MAC pipeline is configured such that input data (D or Dijk data) rotates during the execution sequence, through or between the MAC processors of the pipeline, and current accumulations (Yijl data) remains in a MAC processor (see Y register) during execution sequence and the current accumulation is employed in the next accumulation operation of the accumulator circuit. That is, the Yijl accumulation values are not output (moved or rotated), during or after each cycle of the execution sequence (i.e., set of associated execution cycles), to the immediately following MAC and employed in the accumulation operation. With that in mind, the accumulator circuit receives the previous accumulation value output therefrom (see MAC_r[p]) for use in the next accumulation operation. Thus, in each execution cycle, the Fkl value in the (D_r[p]) F register is multiplied by the Dijk value (D_i[p]) in the D register, and the result (MULT_r[p]) is loaded in the D*F register. In the next pipeline cycle, the value in the D*F register is added, via the accumulator circuit, to the Yijl accumulation value (MAC_r[p]) stored in the Y register (of the same/associated MAC processor) and the sum/result is loaded in the Y register. This is repeated for the execution cycles of the current execution sequence. Here, the immediately previous accumulation values are provided to the accumulator circuit and employed, together with the product value stored in the D*F register, in the "current" accumulation operation.

With continued reference to FIGS. 2A-2C, regarding the execution cycles (and sets thereof), each MAC processor includes the shifting chain (D_Sl[p]) for the data input (Dijk data). In this embodiment, an initial input data value (Dijk data) is shifted into each of the MACs and an execution cycle is performed. Here, the Dijk data is stored in the D_i[p] register during the execution cycles of the current execution sequence. After completion of the execution cycle, the input data values ("D") are rotated, transferred or moved from one MAC (e.g., MAC Processor 1) of the linear pipeline to the immediately following MAC (e.g., MAC Processor 2) of the execution pipeline (see, D_i[p]) wherein the multiplexer may be controlled to select the input of the that rotated input data value ("Rotate current D") which is then employed in the multiply operation of the multiplier circuit of the MAC (e.g., MAC Processor 2) of the processing pipeline.

In this embodiment, the MACs are configured such that the output of the accumulator circuit ("ADD") is input back into the accumulator circuit ("ADD") of the associated MAC (see, MAC_r[p]) and employed in the accumulation operation. Moreover, the output of each accumulator circuit ("ADD") of the MACs is not rotated, transferred or moved to the immediately following MAC of the linear processing pipeline (compare FIGS. 1A-1C)—rather, the input data values ("D") are rotated, transferred or moved (e.g., before, during or at the completion of each execution cycle of the execution sequence (i.e., set of associated execution cycles)) through the plurality of serially connected MACs of the pipeline such that, in operation, after input of the initial data input values into the MACs of the linear pipeline (see "Shift in next D"), each input data value (see "Rotate current D") that is input into a MAC is output before, during or at the completion of each execution cycle to the immediately following MAC of the linear pipeline and employed in the multiplication operation of the multiplier circuit ("MUL") of that immediately following MAC.

The MAC processors also include a shifting chain (MAC_SO[p]) for preloading inputting, for example, initial values (Yijl). In this embodiment, each MAC also uses the shifting chain (MAC_SO[p]) for unloading or outputting the Yijl sums (final accumulation values) through and from the pipeline. In one embodiment, the previous Yijl sums (final accumulation values) are shifted out (i.e., rotated, transferred) while (concurrently) the next Yijl sums (initial values) are shifted in for use in/during the next execution sequence. Notably, in this embodiment, the Yijl shifting chain (MAC_SO[p]) may be employed for both preloading/inputting (e.g., initial values for use in a next execution sequence) and unloading/outputting (e.g., final accumulations of an immediately previous execution sequence). Thus, in this embodiment, the linearly connected pipeline architecture may be characterized by Yijl data that is fixed in place during execution and Dijk data that rotates during execution. That is, the input data values (Dijk data values) rotate through all of the MAC processors or MACs during the associated execution cycles of the execution sequence after being loaded from the Dijk shifting chain and the partial accumulations are not output or rotated through the MACs but instead are employed in the accumulation operations of the execution sequence. As noted above, in this embodiment, the Yijlk accumulation values will be held or maintained in a MAC processor during the associated execution cycles of the execution sequence—after being loaded from the Yijk shifting chain and the final Yijlk accumulation values will be unloaded via the same shifting chain.

With reference to FIG. 2D, the integrated circuit having a plurality of MACs, like that illustrated in FIG. 1D and described in relation thereto, may be programmed such that one or more linear pipelines of MACs are configured according to Configuration B (see, e.g., FIGS. 2A-2B) wherein, in operation, the input data values are rotated, transferred or moved through the MACs of the pipeline (before, during or at the completion of an execution cycle of a execution sequence). An execution pipeline of FIG. 2D is illustrated at the lower right of FIG. 2D for reference purposes (which in this illustrative embodiment includes m MAC processing circuits like that in FIG. 2A). Briefly, in this embodiment, the MACs of one or more (or all) of the linear pipelines, after input or loading of the initial data input values into the MACs of the linear pipeline, the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline. In addition, as noted above, the accumulation values generated by each MAC during an execution sequence are maintained, stored or held, during each execution cycle of the execution sequence, in respective MAC (e.g., a register such as the Y register in FIGS. 2B and 2C) and used in the accumulation operation of the associated accumulator circuit thereof. Thus, while the input data are rotated, transferred or moved, during the execution sequence, from one MAC of the linear pipeline to the immediately following MAC (of the pipeline), the accumulation values generated by each MAC during processing are not rotated, transferred or moved from one MAC of to the immediately following MAC but are maintained, held or stored in the MAC for use in subsequent processing (i.e., accumulation operations) during the associated execution cycles of the set of execution cycles (i.e., execution sequence). The discussion above of the features, circuitry (e.g., NLINKS and interconnect network), and operability of the integrated circuit illustrated in FIG. 1D is fully applicable to the integrated circuit of FIG. 2D and, for the sake of brevity will not be repeated here.

Notably, in one embodiment, one, more than one or all of the MAC pipelines (each including a plurality of MACs) disposed on the integrated circuit illustrated in FIGS. 1D and 2D may be configured to implement data processing according to Configuration A (as illustrated, e.g., in FIGS. 1A-1C) and one, more than one or all of the MAC pipelines (each including a plurality of MACs) disposed on the integrated circuit illustrated in FIGS. 1D and 2D may be configured to implement data processing according to Configuration B (as illustrated, e.g., in FIGS. 2A-2C). Indeed, in one embodiment, the integrated circuit of FIGS. 1D and 2D may be configured such that the MAC processing pipelines process data according to Configuration A and Configuration B concurrently (i.e., one or more pipelines are configured to implement processing according to Configuration A and concurrently one or more pipelines are configured to implement processing according to Configuration B).

In another embodiment, the MAC pipelines are configurable (e.g., one-time or more than one-time programable) between (i) an architecture that rotates, transfers or moves the accumulation values through the MACs of the linear pipeline (see, e.g., FIGS. 1A-1C) and (ii) an architecture that rotates, transfers or moves the input data values through the MACs of the linear pipeline (see, e.g., FIGS. 2A-2C). With reference to FIGS. 3A-3C, in one embodiment, the processing pipeline, and each MAC thereof, are configurable and/or re-configurable (e.g., via controlling the states of the MUX 1 and MUX 2) to process data (e.g., image data), according to:

(1) Configuration A which includes rotating, transferring or moving the accumulation values generated by the MACs (e.g., before, during or at the completion of each execution cycle of the execution sequence (i.e., set of associated execution cycles)) through the plurality of MACs of the linear pipeline such that each accumulation value generated by a MAC is output before, during or at the completion of each execution cycle to the immediately following MAC of the linear pipeline and employed in the accumulation operation of the accumulator circuit of that immediately following MAC during the next execution cycle (see, e.g., FIGS. 1A-1C); or (2) Configuration B which includes rotating, transferring or moving the input data values, on a cycle-by-cycle basis, after input or loading of the initial data input values into the MACs of the linear pipeline, from one MAC of the linear pipeline to the immediately following MAC of the pipeline and employed in the multiply operation of the multiplier circuit of that next MAC of the processing pipeline during the next execution cycle (see, e.g., FIGS. 2A-2C).

With continued reference to FIGS. 3A-3C, briefly, in the Configuration A, the MUX 1 and MUX 2 configure the MACs of the linear pipeline such that the output of each accumulator circuit ("ADD") of the MACs of the linear processing pipeline is coupled to the input of the accumulator circuit ("ADD") of the immediately following MAC so that the accumulation values ("Y") generated by the MACs (see, MAC_r[p]) are rotated, transferred or moved (e.g., before, during or at the completion of each execution cycle of the execution sequence) through the plurality of serially connected MACs of the pipeline. In this way, each accumulation value (see, MAC_r[p]—"Rotate current Y") generated by a MAC is output before, during or at the completion of each execution cycle to the immediately following MAC of the linear pipeline and employed in the accumulation operation of the accumulator circuit ("ADD") of that immediately following MAC.

In Configuration B, the MUX 1 and MUX 2 configure the MACs of the linear pipeline such that, the input data values ("D") are rotated, transferred or moved, on a cycle-by-cycle basis, from one MAC of the linear pipeline to the immediately following MAC of the execution pipeline (see, D_i[p]) and employed in the multiply operation of the multiplier circuit of that next MAC of the linear pipeline. In this embodiment, the output of each accumulator circuit ("ADD") of the MACs is input into the accumulator circuit ("ADD") of the associated MAC (see, MAC_r[p] and the Y register) and employed in the subsequent accumulation operation; moreover the output of each accumulator circuit ("ADD") of the MACs is not rotated, transferred or moved to the immediately following MAC of the linear processing pipeline (compare FIGS. 1A-1C). In this way, the input data values ("D") are rotated, transferred or moved (e.g., before, during or at the completion of each execution cycle of the execution sequence (i.e., set of associated execution cycles)) through the plurality of serially connected MACs of the linear pipeline. In operation, the data input values are input into the MACs of the linear pipeline (see "Shift in next D"), MUX 1 is configured to provide each input data value (see "Rotate current D") that is input into a MAC is output (D_i[p]) (before, during or at the completion of each execution cycle) to the immediately following MAC of the linear pipeline and employed in the multiplication operation of the multiplier circuit ("MUL") of that immediately following MAC. Notably, the configurable MACs illustrated in FIGS. 3A-3C may be implemented in any of the pipelines described and/or illustrated herein.

In one embodiment, the MACs of the linear pipeline are programmed or configured into a particular architecture via configuration control circuitry. With reference to FIG. 4, the configuration control circuitry may configure (e.g., one-time or more than one-time programable) the MACs of the processing pipeline and interconnection between the MACs of the processing pipeline. Here, in one embodiment, the configuration control circuitry may control MUX 1 and MUX 2, via control signals A and B (see, FIGS. 3A-3C), respectively, to configure the MACs of the processing pipeline between the Configuration A ("Rotate Current Y"—rotate, transfer or move the accumulation values, on a cycle-by-cycle basis) or Configuration B ("Rotate Current D"—rotate, transfer or move the input data values, on a cycle-by-cycle basis). In this way, the configuration control circuitry configures or implements an architecture of the linear pipeline by controlling, providing or enabling predetermined connection(s) between MACs and/or rows of interconnected MACs. Notably, the configuration control circuitry may program or configure the MACs, for example, in situ (i.e., during normal operation of the integrated circuit) and/or at or during power-up, start-up, initialization, re-initialization, configuration, re-configuration or the like, to implement the manner of processing the input data. Notably, the configuration control circuitry may be employed in any of the embodiments described and/or illustrated herein.

With continued reference to FIG. 4, in one embodiment, configuration memory (e.g., a configuration register) may store configuration data, including the architecture(s) of the MAC pipeline. Such configuration memory may be programmed at or during power-up, start-up, initialization, re-initialization and/or in situ; in one embodiment, the configuration control circuitry controls, via control signal(s), the states of the multiplexers MUX 1 and MUX 2 (see FIGS. 3A-3C) and thereby establish, configure and/or determine the architecture or manner of the data processing implemented by the MACs of the linear pipeline—e.g., whether rotating the accumulation values or rotating of input data values (see, FIGS. 3A-3C).

In addition thereto, the configuration control circuitry may also configure and control the number of MACs employed in the linear pipeline. For example, the configuration control circuitry may configure and control a plurality of separate MACs or rows/banks of interconnected (in series) MACs to configure the length of the linear pipeline for the multiply and accumulate operations. In one embodiment, the configuration control circuitry may configure or connect a selected number of MACs or rows/banks of MACs (see, e.g., FIGS. 1D and 2D) to, among other things, implement a predetermined multiplier-accumulator execution or processing pipeline or architecture thereof. (See U.S. Provisional Application 63/012,111, filed Apr. 18, 2020, which is hereby incorporated by reference in its entirety). Here, the configuration control circuitry may configure or determine the multiplier-accumulator circuits or rows/banks of interconnected multiplier-accumulator circuits that are connected in the linear pipeline and employed to perform the multiply and accumulate operations and/or the manner of processing implemented by the architecture or configuration implemented via connection of multiplier-accumulator circuits (or rows/banks of interconnected multiplier-accumulator circuits) employed to perform the multiply and accumulate operations. As noted above, the configuration control circuitry may be one-time programmable (e.g., at manufacture via, e.g., a programmable fuse array) or multiple-times programmable (including, e.g., at start-up/power-up, initialization, and/or in situ).

In one embodiment, the plurality of MACs are configured in a linear pipeline to process n×n data according to the Configuration A ("Rotate Current Y"—rotate, transfer or move the accumulation values, on a cycle-by-cycle basis). In this embodiment, the filter weights may also be organized as n×n blocks of associated filter weights. With reference to FIG. 5, in one embodiment, n=3 wherein the filter weights are organized as 3×3 blocks of associated filter weights. The 3×3 blocks of associated filter weights are associated with 3×3 blocks of input data (e.g., image data). In operation, a 3×3 block of filter weights is applied to a 3×3 block of image pixels at each (i,j) image pixel position in an input image layer. The sum of the nine multiplications (the inner product) generates a single value. This operation is repeated across a plurality of image layers (in the illustrative embodiment, 64 input image layers), and the 64 inner product values are summed into a single output pixel value at (i,j).

With continued reference to FIG. 5, in operation, the accumulation values generated by the MACs are rotated, transferred or moved (e.g., before, during or at the completion of each execution cycle of execution sequence (i.e., set of associated execution cycles)) through the plurality of serially connected MACs of the linear pipeline such that each accumulation value generated by a MAC is output (before, during or at the completion of each execution cycle of the execution sequence) to the immediately following MAC of the linear pipeline. Thereafter, that accumulation value is employed in the accumulation operation of the accumulator circuit of the associated MAC. In one exemplary embodiment, the linear execution pipeline of serially connected MACs process 3×3 blocks of data, and where the pipeline includes 64 MACs or MAC processors, the pipeline employs 9, 64-MAC execution cycles to process 64 input data/values (e.g., pixels) of Dij into the L=64 output data/values of Yij (i.e., processed data). In this illustrative embodiment, eight input data (D((i±1,j±1) pixels surrounding each pixel at Dij are also multiplied by the additional eight Fkl(i±1,j±1) weight values. As such, in one embodiment, (i) there are nine loading sequences for loading the 9×64 Dijk values from L2 memory, (ii) there are nine execution sequences with each performing 64×64 MAC operations, and (iii) there is a single unloading sequence at the end to move the 64 Yijl values to L2 memory.

In one embodiment, this operation is repeated across the data of a plurality of input image layers (e.g., 512×256 pixels/data) of a plurality of input image layers to produce one image layer (e.g., one 512×256 layer) of the output image (index K)—and, may be repeated a plurality of times (e.g., an additional 64 times) to form a plurality of output layers (e.g., 64 output layers (index L)). Notably, the multiplier-accumulator circuits, MAC execution pipelines and architectures, and the techniques employed and operations implemented thereby, in one embodiment, are described and/or illustrated in: (1) U.S. Non-Provisional patent application Ser. No. 16/545,345, (2) U.S. Non-Provisional patent application Ser. No. 16/816,164, (3) U.S. Provisional Patent Application No. 62/831,413; (4) U.S. Non-Provisional patent application Ser. No. 16/900,319, (5) U.S. Provisional Patent Application No. 62/865,113, (6) U.S. Non-Provisional patent application Ser. No. 17/019,212, (7) U.S. Provisional Patent Application No. 62/900,044, (8) U.S. Non-Provisional patent application Ser. No. 17/031,631, and (9) U.S. Provisional Patent Application No. 62/909,293; these nine (9) patent applications are incorporated herein by reference in their entirety.

In another embodiment, the plurality of MACs are configured in a linear pipeline to process n×n data according to Configuration B ("Rotate Current D"—rotate, transfer or move the input data values, on a cycle-by-cycle basis). In this embodiment, the filter weights are again be organized as n×n blocks of associated filter weights. With reference to FIGS. 6A and 6B, in one embodiment, n=3 wherein the filter weights are organized as 3×3 blocks of associated filter weights. The 3×3 blocks of associated filter weights are associated with 3×3 blocks of input data (e.g., image data). In operation, a 3×3 block of filter weights is applied to a 3×3 block of image pixels at each (i,j) image pixel position in an input image layer. The input data values (Dijk) are processed according to Configuration B wherein the input data are rotated, transferred or moved from one MAC of the linear pipeline to the immediately following MAC of the pipeline (see D_i[p] in FIG. 2A-2C) wherein the multiplexer may be controlled to select the input of the rotated data value ("Rotate current D") which is then employed in the multiply operation of the multiplier circuit of the MAC (e.g., MAC Processor 2) of the processing pipeline.

With continued reference to FIGS. 6A and 6B, in this embodiment, before, during or after each execution cycle of the execution sequence, the input data are rotated, transferred or moved from a MAC of the linear pipeline to successive MAC thereof wherein the rotated, transferred or moved input data are input or applied to the multiplier circuit of associated MAC during or in connection with the multiply operation of that MAC. The accumulation values generated by each MAC are maintained, stored or held, during each execution cycle of the execution sequence, in respective MAC and used in the accumulation operation of the associated accumulator circuit thereof and employed in subsequent processing. In operation, the linear pipeline is configured to employ 9, 64-MAC execution cycles to process 64 input data/values (e.g., pixels) of Dij into the L=64 output data/values of Yij (i.e., processed data). In this illustrative embodiment, eight input data (D((i±1,j±1) pixels surrounding each pixel at Dij are also multiplied by the additional eight Fkl(i±1,j±1) weight values. As such, in one embodiment, (i) there are nine loading sequences for loading the 9×64 Dijk values from L2 memory, (ii) there are nine execution sequences with each performing 64×64 MAC operations, and (iii) there is a single unloading sequence at the end to move the 64 Yijl values to L2 memory. The sum of the nine multiplications (the inner product) generates a single value. This operation may be repeated across a plurality of image layers (e.g., 64 input image layers), and the 64 inner product values are summed into a single output pixel value at (i,j).

Notably, in the illustrative embodiment, n=3 such that the linear execution pipeline of serially connected MACs processes 3×3 blocks of data. However, n may be any whole number, e.g., n=2, 3, 4, etc.).

With reference to FIG. 7, in one embodiment, the plurality of MACs of the linear pipeline may be configured in Configuration B ("Rotate Current D"—rotate, transfer or move the input data values, on a cycle-by-cycle basis) to process the input data via Winograd type processing. In this embodiment, the input data and the filter weights or coefficients are converted and organized (via Winograd conversion circuitry) into a plurality of groups for Winograd type processing via the MAC processing pipelines wherein input data values (Dijk) are rotated, transferred or moved, on a cycle-by-cycle basis, from one MAC of the linear pipeline to the immediately following MAC of the pipeline and employed in the multiply operation of the multiplier circuit of that next MAC of the processing pipeline. In operation of the pipeline, before, during or after each execution cycle of the execution sequence (i.e., set of associated execution cycles), the input data are rotated, transferred or moved from a MAC of the linear pipeline to successive MAC thereof wherein the rotated, transferred or moved input data are input or applied to the multiplier circuit of associated MAC during or in connection with the multiply operation of that MAC. The accumulation values generated by each MAC are maintained, stored or held, during each execution cycle of the execution sequence, in respective MAC and used in the accumulation operation of the associated accumulator circuit thereof.

With continued reference to FIG. 7, the plurality of associated filter weights of each group (as sixteen filter weights), arranged as a matrix (e.g., a 4×4) or block, in or converted into a Winograd format (Hkl), are available to or input into the plurality of MACs of the execution pipelines which implement/perform the multiply and accumulate operations to process the input data (Dij, e.g., image data). In this embodiment, the input data is also in, or converted into, a Winograd format (Eij) via Winograd conversion circuitry. In this embodiment, the linear pipelines, configured in Configuration B, implement Winograd processing techniques, to process the image data, as described and/or illustrated in U.S. Non-Provisional patent application Ser. No. 16/796,111, entitled "Multiplier-Accumulator circuit having Processing Pipelines and Methods of Operating Same", filed Feb. 20, 2020 and/or U.S. Provisional Patent Application No. 62/823,161, entitled "Multiplier-Accumulator circuit having Processing Pipeline and Methods of Operating and Using Same", filed Mar. 25, 2019; U.S. Non-Provisional patent application Ser. No. 17/031,631, entitled "MAC Processing Pipeline having Conversion Circuitry, and Methods of Operating Same", filed Sep. 24, 2020, and/or U.S. Provisional Patent Application No. 62/909,293, entitled "Multiplier-Accumulator circuit Processing Pipeline and Methods of Operating Same", filed Oct. 2, 2019. As noted above, these four (4) patent applications are incorporated herein by reference.

With reference to FIGS. 1A-1C and 8A, in one embodiment, the sequence of operation of Configuration A (Rotate Current Y) includes loading input data into the MACs, performing multiply and accumulation operations, and rotating, transferring or moving the accumulation values (Current Y) through the plurality of serially interconnected MACs of the linear pipeline such that each accumulation value generated by a MAC is output before, during or at the completion of each execution cycle to the immediately following MAC of the linear pipeline and employed in the accumulation operation of the accumulator circuit of that immediately following MAC. Here, the input data that are input or loaded into the plurality of MACs of the pipeline do not rotate during each execution cycle of the execution sequence (i.e., during operation).

Briefly, with reference to FIG. 8A (which illustrates operations and timing intervals of MAC processor 4 and MAC processor 5 of a linear pipeline including 64 MAC processors), the two D_SI[p][15:0] waveforms at the top illustrating a shifting chain for the 16 bit data values in the first 64-cycle sequence. Note, the waveforms for MAC processor 4 and MAC processor 5 are offset by one pipeline cycle.

The two D_i[p][15:0] waveforms in the center 64-cycles (see the column heading "Execution Sequence 1") illustrate the fixed (non-rotating) input data that is read into the registers of the multiplier circuit, which is 16 bit data values that are held or maintained in the MAC processor (here, MAC processor 4 and MAC processor 5 of a linear pipeline; which, in this illustrative embodiment includes 64 MAC processors) for the execution cycles of the execution sequence (D[4] and D[5]). That is, in Configuration A, the input data under processing do not rotate during the execution cycles of the execution sequence.

With continued reference to FIG. 8A, after the data input waveforms (D_i), the next group of waveforms illustrate access of the filter weights in L0 memory (SRAM). The first three waveforms illustrate the write slots for preloading the filter weights (shaded brown and labeled "Preload next Fkl filter weights into L0 SRAM") for the next execution sequence. The next waveform illustrates the read address RA[6:0] and the read-enables RE0/RE1 for accessing the 8 bit filter weights for current execution (the 64-cycle sequence in the center). In one embodiment, the L0 SRAM memory is read sequentially, with the same RA address shared by all MAC processors of the linear pipeline (64 MACs in this illustrative example/embodiment). Here, the multiple banks of the L0 memory, as illustrated in FIG. 2B, allows one of the banks of the L0 memory to be written (preloaded) while the other bank is being read by the associated MAC processor in order to acquire or obtain filter weights (Fkl) to be employed by the multiplier circuit in connection with the multiply operation. The timing diagram of FIG. 8A illustrates the concurrent read-write operation of the L0 memory.

Notably, embodiments employing a single bank of L0 SRAM, in which the Fkl filter weights are written, and then read out repeatedly for a range of {i,j} pixel values before written with a new set of filter weight values (Fkl), will likely have a slightly higher execution overhead as a result.

Further, after the read address RA[6:0] waveform, the next waveforms illustrate the sequence of RD[p][7:0] filter weight values that are written into the MAC processor 4 and MAC processor 5. The last two waveforms (D_r) of that group illustrate the read data (filter weights) after having been loaded into the D_r[p] register associated with the multiplier circuit of the MAC processor 4 and MAC processor 5 for each execution cycle of the execution sequence.

With continued reference to FIG. 8A, the next four waveforms illustrate the 24 bit output of the multiply register MULT_r[p][23:0] and the 32 bit output of the accumulator register MAC_r[p][23:0]. Note, the waveforms corresponding to the operation in MAC processor 4 and MAC processor 5 are offset by one pipeline cycle. Other pipeline latencies may be employed. These accumulation totals will be rotated through the MAC processors (including 64 MAC processors) of the execution pipeline during the 64 execution cycles of the execution sequence.

The two MAC_SO[p][31:0] waveforms at the bottom of FIG. 8A illustrate the shifting chain for loading the initial 32 bit MAC values in the first 64-cycle sequence and movement or rotation of the accumulation values through/between the MAC processors during the execution sequence. Again, the waveforms corresponding to the operation in MAC processor 4 and MAC processor 5 are offset by one pipeline cycle. The shifting chain also unloads the 32 bit MAC values in the third 64-cycle execution sequence.

With reference to FIGS. 2A-2C and 8B, in one embodiment, the sequence of operation of Configuration B (Rotate Current D) includes loading initial input data into the MACs, performing multiply and accumulation operations, and rotating, transferring or moving the input data (D) through the plurality of serially interconnected MACs of the pipeline such that the input data values are rotated, transferred or moved, on a cycle-by-cycle basis, from one MAC of the linear pipeline to the immediately following MAC of the pipeline and employed in the multiply operation of the multiplier circuit of that next MAC of the processing pipeline. Here, the accumulation values generated in each MAC of the pipeline do not rotate or move during or after each execution cycle of the execution sequence (but are used in the subsequent accumulation operation of the accumulator circuit of the associated MAC).

Briefly, with reference to FIG. 8B (which illustrates operations and timing intervals of MAC processor 4 and MAC processor 5 of a linear pipeline including 64 MAC processors), the two D_SI[p][15:0] waveforms at the top illustrate a shifting chain for the 16 bit data values in the first 64-cycle sequence. Note, the waveforms for MAC processor 4 and MAC processor 5 are offset by one pipeline cycle.

The two D_i[p][15:0] waveforms in the center 64-cycles (see the column heading "Execution Sequence 1") illustrate the rotating input data, which is 16b data values that moved, rotated or transferred between the MAC processor (here, MAC processor 4 and MAC processor 5) of a linear pipeline (in this illustrative embodiment, 64 MAC processors) for the execution cycles of the execution sequence (D[4] and D[5]). That is, in Configuration B, the input data under processing rotates or moves (through/between the MAC processors) during the execution cycles of the execution sequence.

With continued reference to FIG. 8B, after the data input waveforms (D_i), the next group of waveforms illustrate access of the filter weights in L0 memory (SRAM). The first three waveforms illustrate the write slots for preloading the filter weights (shaded brown and labeled "Preload next Fkl filter weights into L0 SRAM") for the next execution sequence. The next waveform illustrate the read address RA[6:0] and the read-enables RE0/RE1 for accessing the 8 bit filter weights for current execution (the 64-cycle sequence in the center). In one embodiment, the L0 SRAM memory is read sequentially, with the same RA address shared by all MAC processors of the linear pipeline (64 MACs in this illustrative example/embodiment). Here, the multiple banks of the L0 memory, as illustrated in FIG. 2B, allows one of the banks of the L0 memory to be written (preloaded) while the other bank is being read by the associated MAC processor in order to acquire or obtain filter weights (Fkl) to be employed by the multiplier circuit in connection with the multiply operation. The timing diagram of FIG. 8B illustrates the concurrent read-write operation of the L0 memory.

Notably, as mentioned above, embodiments employing a single bank of L0 SRAM, in which the Fkl filter weights are written, and then read out repeatedly for a range of {i,j} pixel values before written with a new set of filter weight values (Fkl), will likely have a slightly higher execution overhead as a result.

Further, after the read address RA[6:0] waveform, the next two waveforms (labeled "RD") illustrate the sequence of RD[p][7:0] filter weight values that are written into the MAC processor 4 and MAC processor 5. The last two waveforms of that group (i.e., D_r) illustrate the read data (filter weights) after having been loaded into the D_r[p] register of the MAC processor 4 and MAC processor 5 for each execution cycle of the execution sequence.

With continued reference to FIG. 8B, the next four waveforms illustrate the 24 bit output of the multiply register MULT_r[p][23:0] and the 32 bit output of the accumulator register MAC_r[p][23:0]. Note, the waveforms corresponding to the operation in MAC processor 4 and MAC processor 5 are offset by one pipeline cycle. Here again, other pipeline latencies may be employed. These accumulation totals will be rotated through the MAC processors of the execution pipeline during the 64 execution cycles of the execution sequence.

The two MAC_SO[p][31:0] waveforms at the bottom of FIG. 8B illustrate the shifting chain for loading the initial 32 bit MAC values in the first 64-cycle sequence. Here, the waveforms illustrate the fixed (non-rotating) accumulation data, which are held or maintained in the MAC processor (here, MAC processor 4 and MAC processor 5 of the 64 MAC linear pipeline) for the execution cycles of the execution sequence. That is, in Configuration B, the accumulation data (Current Y) does not rotate during the execution cycles of the execution sequence—but is maintained in the MAC processor.

Again, note the waveforms corresponding to the operation in MAC processor 4 and MAC processor 5 are offset by one pipeline cycle. The shifting chain also unloads the 32 bit MAC values in the third 64-cycle execution sequence.

With reference to FIG. 9A, in one embodiment, the mapping of the tensors to the MAC processors of the linear pipeline implementing Configuration A (e.g., FIGS. 1A-1C—Rotate Current Y) are different from the mapping of the tensors to the MAC processors of the linear pipeline implementing Configuration B (e.g., FIGS. 2A-2C—Rotate Current D). In this regard, the [K] and [L] indexes will be mapped to the processor index [P] and timing cycle index [T] differently for the two configurations—these mappings are:

Configuration A: K=P L=$MOD_N$ (P−T) T=$MOD_N$ (P−L)
Configuration B: L=P K=$MOD_N$ (P−T) T=$MOD_N$ (P−K)
Note that "N" is the total number of MAC Processors in the execution pipeline (64 in this example), and "$MOD_N$" is the modulus (remainder) function for the base value of "N".

For Configuration A, the [K] index is equivalent to the [P] index because each element of the D[K] input tensor1 is fixed at a particular processor element and does not move during the 64 timing cycles. The [L] index is equivalent to the value $MOD_N$[P−T] (where N=64 in this exemplary embodiment) because each element of the Y[L] output tensor1 rotates through each processor element during the 64 timing cycles. The [T] index can be calculated as the value $MOD_N$[P−L].

For Configuration B, the [L] index is equivalent to the [P] index because each element of the Y[L] output tensor1 is fixed at a particular processor element and does not move during the 64 timing cycles. The [K] index is equivalent to the value $MOD_N$[P−T] (where N=64 in this exemplary embodiment) because each element of the D[K] input tensor1 rotates through each processor element during the 64 timing cycles. The [T] index can be calculated as the value $MOD_N$[P−K].

With reference to FIG. 9B, the Configuration A and Configuration B map of the tensors to the memory (DRAM and L2 memories (e.g., SRAM)) in the same manner. In this regard, the accumulation example has a input tensor3 (of three dimensions) D[Dw,Dh,Dd] held in DRAM memory, with a subset of D[32,32, Dd] held in the L2 SRAM memory. A single input tensor1 D[Io,Jo,Dd] is multiplied by the filter tensor2 F[K,L], producing the output tensor1 Y[IO,Jo,Yd]. This is repeated 256×512 times to fill the output tensor3 Y[Yw,Yh,Yd]. The [I,J] indexes step through the [Dw,Dh] ranges, the K index steps through the input depth [Dd], and L index steps through the output depth [Yd].

The filter weights (F(K,L)) may map to memory (e.g., L0 memory (SRAM)) using a number of different techniques/architectures. For example, in one embodiment, the filter weights may map to the memory as illustrated in FIG. 10A—where the horizontal axis depicts the MAC Processor number P increasing from left to right, and the vertical axis depicts the L0 access cycle T increasing from top to bottom. In this exemplary embodiment, there 64 input planes of data/values (i.e., K=64 input planes) and 64 output planes of data/values (i.e., L=64 output planes)—that is, there are 64×64 filter weights F[K,L]. Note that this access cycle corresponds to sequential read addresses from a starting location, with all L0 SRAMs using the same read (or write) address (see memory control architecture of FIG. 1B).

In Method A (which may be employed in the architecture of Configuration A), the K index is made identical to the P index. The write address is made identical to MOD 64(P−L). In other words, a value F[K,L] is written in the L0 SRAM of MAC Processor P, at the address of the modulo difference of the processor number and the L index. The filter weights are read using the T index (i.e. the read address is the same for all processing elements). It would be possible to scramble the write data in the L3/L2/L1 memory hierarchy so it is always in the right loading order for L0 for Method A.

With continued reference to FIG. 10A, the example of the F[K,L] element for K=4,L=1. For Method A, this weight is stored in the L0 SRAM for MAC Processor 4 (i.e., P=4), at the sequential address T=3.

Notably, an alternative method (Method B—not illustrated) may include a value F[K,L] which is written in the L0 SRAM of processor P, at the write address L (i.e. the write address is the same for all processing elements). When the weights are read, the L0 SRAM of MAC Processor P generates address MOD 64(P−T). In one embodiment, this may be managed by adding a small adder in the address path, so the "T" value is supplied on the RA control wires, and the "P" value is generated in the MAC Processor.

With reference of FIG. 10B, as for Configuration B, the filter weights also maps to memory (e.g., L0 memory (SRAM)) using a number of different techniques/architectures. Because the input data values rotate during an execution sequence, the mapping of the filter weights employed in an architecture of Configuration B is different from that of FIG. 10A. In this regard, the loading of the filter weight (F[K,L]) elements for (e.g., K=4,L=1) values in the L0 memory for Method B will be the transpose of the loading for Method A shown in FIG. 10A; that is, at processor P and at cycle T the stored filter weight value is:

Method A: F [P, $MOD_N$ (P−T)]
Method B: F [$MOD_N$ (P−T), P]

For example, at processor P=4 and cycle T=3, the stored F[K,L] values are:

Method A: F [4, 1]

Method B: F [1, 4]

This relationship will generate a table for Method B in FIG. 10B that has a similar structure as the table for Method A in FIG. 10A.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the embodiments, features, attributes and advantages of the inventions described and illustrated herein are not exhaustive and it should be understood that such other, similar, as well as different, embodiments, features, attributes and advantages of the present inventions are within the scope of the present inventions.

For example, in one embodiment, the circuitry employed to implement the configuration of the MACs between Configuration A (Rotate Current Y) and Configuration B (Rotate Current D) in each MAC are one or more multiplexers. Such configurability may be implemented via other types of circuitry including, for example, fuses, switches, pass gates, and/or logic. Indeed, any circuitry now known or later developed to implement the aforementioned configurability is intended to fall within the scope of the present inventions. Notably, the configuration circuitry may be one-time or more than one-time programmable. Such circuitry may be programmed at manufacture and/or at or during power-up, start-up, initialization, re-initialization and/or in situ.

For example, with reference to FIGS. 1D, 2D and 2A-2C, and 3A-3C, in one embodiment, the MAC execution pipeline may be any size or length (e.g., 16, 32, 64, 96 or 128 MACs). Indeed, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like).

In another embodiment, the one or more integrated circuits include a plurality of components or X1 components (e.g., 2, 4, . . . ), wherein each component includes a plurality of the clusters having a plurality of MAC execution pipelines. For example, in one embodiment, one integrated circuit includes a plurality of components or X1 components (e.g., 4 clusters) wherein each cluster includes a plurality of execution or processing pipelines (e.g., 16, 32 or 64) which may be configured or programmed to process, function and/or operate concurrently to process related data (e.g., image data) concurrently. In this way, the related data is processed by each of the execution pipelines of a plurality of the clusters concurrently to, for example, decrease the processing time of the related data and/or increase data throughput of the X1 components.

In one embodiment, the present inventions may also be employed or implemented in the concurrent and/or parallel processing techniques of the multiplier-accumulator execution or processing pipelines (and methods of operating such circuitry) which increase throughput of the pipelines, as described and/or illustrated in U.S. patent application Ser. No. 16/816,164 and U.S. Provisional Patent Application No. 62/831,413, both of which are incorporated by reference herein in their entirety.

In another embodiment, the embodiments of FIGS. 2A-2C and 3A-3C may be employed in conjunction with the activation circuitry described and/or illustrated in U.S. Patent Application No. 63/144,553, entitled "MAC Processing Pipeline having Activation Circuitry, and Methods of Operating Same", filed Feb. 2, 2021. Here, the activation circuitry described and/or illustrated in the '553 application may be employed in the same manner (e.g., disposed on the output of a MAC processing pipeline, to further process the data initially processed by the MAC processing pipeline) in connection with linear pipelines implementing (or programmed to implement) Configuration B that are described and/or illustrated herein. Indeed, the activation circuitry may include one or more circuits to process data output by such linear pipelines (Rotate Current D) via one or more operations, including, for example, linear and/or non-linear activation operations and/or threshold functions. The one or more circuits of the activation circuitry, alone or in combination, may perform a particular operation, including, for example, a particular linear or non-linear activation operation or threshold function. The '553 application is hereby incorporated by reference herein in its entirety.

As discussed in the '164 and '413 applications, both of which are incorporated by reference herein in their entirety, a plurality of execution or processing pipelines of one or more clusters of a plurality of the X1 components may be interconnected to process data (e.g., image data) In one embodiment, such execution or processing pipelines may be interconnected in a ring configuration or architecture to concurrently process related data. Here, a plurality of MAC execution pipelines of one or more (or all) of the clusters of a plurality of X1 components (which may be integrated/manufactured on a single die or multiple dice) may be interconnected in a ring configuration or architecture (wherein a bus interconnects the components) to concurrently process related data. For example, a plurality of MAC execution pipelines of one or more (or all) of the clusters of each X1 component are configured to process one or more stages of an image frame such that circuitry of each X1 component processes one or more stages of each image frame of a plurality of image frames. In another embodiment, a plurality of MAC execution pipelines of one or more (or all) of the clusters of each X1 component are configured to process one or more portions of each stage of each image frame such that circuitry of each X1 component is configured to process a portion of each stage of each image frame of a plurality of image frames. In yet another embodiment, a plurality of MAC execution pipelines of one or more (or all) of the clusters of each X1 component are configured to process all of the stages of at least one entire image frame such that circuitry of each X1 component is configured to process all of the stage of at least one image frame. Here, each X1 component is configured to process all of the stages of one or more image frames such that the circuitry of each X1 component processes a different image frame.

Moreover, in addition to configuring the architecture of the pipeline and configuration of the MACs thereof, according to Configuration A or Configuration B, the extent or length of the concatenation (i.e., number of MACs interconnected or incorporated in the linear pipeline to implement or perform the multiply and accumulate operations) may be adjusted (i.e., increased or decreased), for example, in situ (i.e., during operation of the integrated circuit) via configuration of the NLINK circuits. Indeed, in one embodiment, the rows of multiplier-accumulator circuits may be connected or disconnected to adjust the extent or length of the concatenation (i.e., increase or decrease the number of multiplier-accumulator circuits interconnected to perform the multiply and accumulate operations in, e.g., the execution or processing pipeline) via control of circuitry (e.g., multiplexers) in NLINK circuits associated with rows of multiplier-accumulator circuits. (See, e.g., the '345 and '212 applications (see, e.g., FIGS. 7A-7C of the '345 application; notably, certain details of the NLINK circuits/structures described and illustrated herein correlate to circuitry/structures described and/or illustrated in the '345 and '212 applications which is referred to and/or identified as NLINX (e.g., NLINX conductors, NLINX interface, NLINX interface connector, NLINX circuits, etc.)). As mentioned above, the '345 and '212 applications are hereby incorporated by reference herein in their entirety.

Indeed, with reference to FIG. 11, in one embodiment, the MAC execution pipeline may be configured via interconnection of a plurality of NLINK circuits and plurality of MAC pipelines (one MAC pipeline associated with a NLINK circuit) wherein the size or length of the pipeline is configured or reconfigured, via interconnection of the NLINK circuits, to form a circular shifting data path (e.g., a ring path) for rotating, transferring or moving the input data between the MAC pipeline of each NLINK circuit. In this embodiment, the control/configure or NLINK circuits are connected in series, wherein each NLINK circuit connected (and, in one embodiment, dedicated) to an associated MAC pipeline which, when the control/configure or NLINK circuits are connected, is a portion of a composite/larger linear MAC pipeline that is formed by serially connected MACs associated with each of the serially connected of the illustrative pipeline architecture, wherein in this embodiment, the MAC pipelines (or Tensor processors) form a circular shifting data path (e.g., a ring path) for rotating the input data between the MAC pipelines wherein each MAC pipeline, in one embodiment, may be configured as illustrated in FIGS. 2C, 3B and 3C wherein input data values ("D") are rotated, transferred or moved, on a cycle-by-cycle basis, from one MAC (e.g., MAC Processor 1) of the linear pipeline to the immediately following MAC (e.g., MAC Processor 2) of the execution pipeline (see, D_i[p]) and employed in the multiply operation of the multiplier circuit of that next MAC (e.g., MAC Processor 2) of the processing pipeline forming a serial circular path, including the plurality of MAC processors, via the plurality of rotate current D data paths connecting sequential MAC processors of the linear pipeline, intermediate accumulation values to traverse through the plurality of processing circuitry in a cluster (or portion thereof).

With continued reference to FIG. 11, the NLINK circuits may be configured to connect to one or more other NLINK circuits via Rotate D conductors, paths and ports of the control/configure or NLINK circuit to form a circular shifting data path or chain, including a plurality of serially interconnected MAC pipelines like those illustrated in FIGS. 2C, 3B and 3C, of a linear processing pipeline. In this illustrated embodiment, each control/configure or NLINK circuit is connected (and, in one embodiment, dedicated) to a MAC pipeline (which may be a pipeline configured in a serial circular path (e.g., serial circular shifting path (e.g., rotate D path is in a ring data path configuration)), such as in FIG. 2B, or part of a larger pipeline as illustrated here). An exemplary control/configure or NLINK circuit is illustrated in U.S. application Ser. No. 17/212,411 and U.S. Provisional Application 63/012,111 (albeit Rotate D conductors, paths and ports are not themselves described and/or illustrated, other conductors, paths and ports are wherein one skilled in the art may employ such conductors, paths and ports and/or additional conductors, paths and ports to implement the Rotate D conductors, paths and ports in the control/configure circuits). The control/configure or NLINK circuits may be connected in series to form a circular data path or circular shifting data path or chain for rotating, transferring or moving between the MAC processors of the MAC pipeline to traverse through the plurality of MAC processors of the plurality of MAC pipelines in a cluster (or portion thereof). The NLINK circuits are configured to connect to one or more other NLINK circuits via Rotate D ports of the control/configure or NLINK circuit to form the shifting chain of a processing pipeline wherein, each control/configure or NLINK circuit connected (and, in one embodiment, dedicated) to a plurality of associated MACs. Importantly, most of the connections, signals, signal paths/lines, and ports in and between the control/configure or NLINK circuits in FIG. 11 have been omitted for purposes of clarity As noted above, the size or length of the pipeline may be configurable or programmable (e.g., one-time or multiple times—such as, in situ (i.e., during operation of the integrated circuit) and/or at or during power-up, start-up, initialization, re-initialization, configuration, re-configuration or the like).

In addition, the MAC processing pipelines or architectures, and circuitry to configure and control such pipelines/architectures, of the present inventions may employ or implement the concurrent and/or parallel processing techniques, architectures, pipelines, and configurations described and/or illustrated in U.S. patent application Ser. No. 16/816,164, entitled "Multiplier-Accumulator Processing Pipelines and Processing Component, and Methods of Operating Same", filed Mar. 11, 2020) and U.S. Provisional Patent Application No. 62/831,413, entitled "Multiplier-Accumulator circuit and System having Processing Pipeline and Methods of Operating and Using Same", filed Apr. 9, 2019). Here, the configuration control circuitry may be programmed to configure the pipelines to implement the concurrent and/or parallel processing techniques described and/or illustrated in the '164 and '413 applications to, for example, increase the throughput of data processing; such applications are incorporated by reference herein in their entirety.

In one embodiment, the MAC processing pipelines or architectures, and circuitry to configure and control such pipelines/architectures, of the present inventions may be employed in conjunction with Winograd processing techniques to process the input data (e.g., image data). For example, in one embodiment, the MACs and the MAC processing pipeline implementing or employing Winograd processing techniques may be configured according to Configuration A (Rotate Current Y—see FIGS. 1A-1C) or Configuration B (Rotate Current D—see FIGS. 2A-2C) or be configurable between Configuration A and Configuration B (see FIGS. 3A-3C). Notably, details of, among other things, the circuitry, structures, architectures, function and operation of Winograd conversion circuitry and the MAC pipelines implementing Winograd processing techniques are described and/or illustrated in: (1) U.S. patent application Ser. No. 16/796,111, entitled "Multiplier-Accumulator circuit having Processing Pipelines and Methods of Operating Same", filed Feb. 20, 2020, and/or (2) U.S. Provisional Patent Application No. 62/909,293, entitled "Multiplier-Accumulator circuit Processing Pipeline and Methods of Operating Same", filed Oct. 2, 2019). These patent applications are incorporated herein by reference.

Further, the present inventions may employ the circuitry, functions, processes and operations of enhancing the dynamic range of the filter weights or coefficients as described and/or illustrated in in this exemplary embodiment, the MAC may implement the processing techniques, to process the image data, described and/or illustrated in U.S. Non-Provisional patent application Ser. No. 17/074,670, entitled "MAC Processing Pipeline using Filter Weights having Enhanced Dynamic Range, and Methods of Operating Same", filed Oct. 20, 2020 and/or U.S. Provisional Patent Application No. 62/930,601, entitled "Processing Pipeline Circuitry using Filter Coefficients having Enhanced Dynamic Range and Methods of Operating", filed Nov. 5, 2019. That is, the present inventions may use the circuitry and techniques to enhance the dynamic range of the filter weights or coefficients of the '670 and '601 applications, which are incorporated by reference herein in their entirety.

Notably, the configuration, selection, modification and/or adjustment of the MACs, and the architecture of the linear pipeline thereof, may be implemented, for example, in situ (i.e., during operation of the integrated circuit) to, for example, perform or provide a particular operation and/or meet or exceed system requirements or constraints (e.g., temporal-based requirements or constraints).

Importantly, the present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof.

Further, although the memory cells in certain embodiments are illustrated as static memory cells or storage elements, the present inventions may employ dynamic or static memory cells or storage elements. Indeed, as stated above, such memory cells may be latches, flip/flops or any other static/dynamic memory cell or memory cell circuit or storage element now known or later developed.

Notably, various circuits, circuitry and techniques disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, circuitry, layout and routing expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other formats and/or languages now known or later developed. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

Moreover, the various circuits, circuitry and techniques disclosed herein may be represented via simulations using computer aided design and/or testing tools. The simulation of the circuits, circuitry, layout and routing, and/or techniques implemented thereby, may be implemented by a computer system wherein characteristics and operations of such circuits, circuitry, layout and techniques implemented thereby, are imitated, replicated and/or predicted via a computer system. The present inventions are also directed to such simulations of the inventive circuits, circuitry and/or techniques implemented thereby, and, as such, are intended to fall within the scope of the present inventions. The computer-readable media corresponding to such simulations and/or testing tools are also intended to fall within the scope of the present inventions.

Notably, reference herein to "one embodiment" or "an embodiment" (or the like) means that a particular feature, structure, or characteristic described in connection with the embodiment may be included, employed and/or incorporated in one, some or all of the embodiments of the present inventions. The usages or appearances of the phrase "in one embodiment" or "in another embodiment" (or the like) in the specification are not referring to the same embodiment, nor are separate or alternative embodiments necessarily mutually exclusive of one or more other embodiments, nor limited to a single exclusive embodiment. The same applies to the term "implementation." The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Further, an embodiment or implementation described herein as "exemplary" is not to be construed as ideal, preferred or advantageous, for example, over other embodiments or implementations; rather, it is intended convey or indicate the embodiment or embodiments are example embodiment(s).

Although the present inventions have been described in certain specific aspects, many additional modifications and variations would be apparent to those skilled in the art. It is therefore to be understood that the present inventions may be practiced otherwise than specifically described without departing from the scope and spirit of the present inventions. Thus, embodiments of the present inventions should be considered in all respects as illustrative/exemplary and not restrictive.

The terms "comprises," "comprising," "includes," "including," "have," and "having" or any other variation thereof, are intended to cover a non-exclusive inclusion, such that a process, method, circuit, article, or apparatus that comprises a list of parts or elements does not include only those parts or elements but may include other parts or elements not expressly listed or inherent to such process, method, article, or apparatus. Further, use of the terms "connect", "connected", "connecting" or "connection" herein should be broadly interpreted to include direct or indirect (e.g., via one or more conductors and/or intermediate devices/elements (active or passive) and/or via inductive or capacitive coupling)) unless intended otherwise (e.g., use of the terms "directly connect" or "directly connected").

The terms "a" and "an" herein do not denote a limitation of quantity, but rather denote the presence of at least one of the referenced item. Further, the terms "first," "second," and the like, herein do not denote any order, quantity, or importance, but rather are used to distinguish one element/circuit/feature from another.

In addition, the term "integrated circuit" means, among other things, any integrated circuit including, for example, a generic or non-specific integrated circuit, processor, controller, state machine, gate array, SoC, PGA and/or FPGA. The term "integrated circuit" also means, for example, a processor, controller, state machine and SoC—including an embedded FPGA. In addition, the term "multiplexers" means multiplexers and/or switches.

Further, the term "circuitry", means, among other things, a circuit (whether integrated or otherwise), a group of such circuits, one or more processors, one or more state machines, one or more processors implementing software, one or more gate arrays, programmable gate arrays and/or field programmable gate arrays, or a combination of one or more circuits (whether integrated or otherwise), one or more state machines, one or more processors, one or more processors implementing software, one or more gate arrays, programmable gate arrays and/or field programmable gate arrays. The term "data" means, among other things, a current or voltage signal(s) (plural or singular) whether in an analog or a digital form, which may be a single bit (or the like) or multiple bits (or the like).

Notably, the term "MAC circuit" (or the like—e.g., "MAC") means a multiplier-accumulator circuit of the multiplier-accumulator circuitry of the multiplier-accumulator pipeline. For example, a multiplier-accumulator circuit is described and illustrated in the exemplary embodiment of FIGS. 1A-1C of U.S. patent application Ser. No. 16/545,345, and the text associated therewith. Notably, however, the term "MAC circuit" (or the like) is not limited to the particular circuit, logical, block, functional and/or physical diagrams, block/data width, data path width, bandwidths, and processes illustrated and/or described in accordance with, for example, the exemplary embodiment of FIGS. 1A-1C of the '345 application, which, as indicated above, is incorporated by reference.

In the claims, "row" means row, column, and/or row and column. For example, in the claims, a "row of MAC circuits" means (i) a row of MAC circuits, (ii) a column of MAC circuits and/or (iii) a row of MAC circuits and a column of MAC circuits—all of which are intended to fall within the meaning of row of MAC circuits in connection with the scope of the claim.

Notably, the limitations of the claims are not written in means-plus-function format or step-plus-function format. It is applicant's intention that none of the limitations be interpreted pursuant to 35 USC § 112, ¶6 or § 112(f), unless such claim limitations expressly use the phrase "means for" or "step for" followed by a statement of function and is void of any specific structure Again, there are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations.

What is claimed is:

1. An integrated circuit comprising:
a plurality MAC processors, interconnected into a linear pipeline, configurable to process input data during a plurality of execution cycles of an execution sequence, wherein each MAC processor of the plurality of the MAC processors includes:
a multiplier circuit to (i) receive first input data at a first input and (ii) receive multiplier weight data at a second input, (iii) multiply first input data by multiplier weight data to generate product data, and (iv) output the product data,
an accumulator circuit, coupled to the multiplier circuit of the associated MAC processor, to (i) receive accumulation data at a first input, (ii) receive the product data output by the associated multiplier circuit, (iii) add the accumulation data and the product data output by the associated multiplier circuit to generate second accumulation data, and (iv) output the second accumulation data via an output of the accumulation circuit, and
an accumulation data path to couple the output of the accumulation circuit of the associated MAC processor to the first input thereof;
a plurality of rotate input data paths, wherein each rotate input data path couples two sequential MAC processors of the linear pipeline including the first input of the multiplier circuit of a first MAC processor of sequential MAC processors to the first input of the multiplier circuit of the immediately following MAC processor of the associated sequential MAC processors of the linear pipeline; and
wherein each rotate input data path is configurable to provide rotate input data from a first MAC processor of sequential MAC processors of the linear pipeline to the immediately following MAC processor of the associated sequential MAC processors thereby forming a serial circular path, including the plurality of MAC processors of the linear pipeline, via the plurality of rotate input data paths.

2. The integrated circuit of claim 1 wherein:
each MAC processor of the plurality of the MAC processors further includes an accumulation register disposed in the accumulation data path of the associated MAC processor between the output of the accumulation circuit of the associated MAC processor and the first input thereof.

3. The integrated circuit of claim 2 wherein:
accumulation register, in operation, stores the second accumulation data output from the accumulation circuit of the associated MAC processor on a first execution cycle and the accumulator circuit inputs second accumulation data at the first input as accumulation data on an execution cycle that follows the first execution cycle.

4. The integrated circuit of claim 2 wherein:
after a multiply-accumulate operation of the linear pipeline, the accumulation register of each MAC processor stores a different second accumulation data output from the accumulation circuit of the associated MAC processor.

5. The integrated circuit of claim 1 wherein:
each MAC processor of the plurality of the MAC processors further includes an input data register connected to an output of the rotate input data path to store rotate input data provided from the immediately preceding MAC processor of the plurality of the MAC processors of the linear pipeline, via the associated rotate input data path, thereby forming a circular serial shift path between the plurality of MAC processors of the linear pipeline.

6. The integrated circuit of claim 1 wherein:
each MAC processor of the plurality of the MAC processors further includes an input data register disposed between the first input of the multiplier circuit of the first MAC processor and the first input of the multiplier circuit of the second MAC processor of each associated pair of MAC processors to store rotate input data provided from the immediately preceding MAC processor, via the associated rotate input data path, after a multiply-accumulate operation of the plurality of the MAC processors of the linear pipeline.

7. The integrated circuit of claim 1 wherein:
each MAC processor of the plurality of the MAC processors further includes a data input register, connected to an output of the associated rotate input data path, to store rotate input data.

8. The integrated circuit of claim 1 wherein:
each MAC processor of the plurality of the MAC processors further includes a memory dedicated to the associated MAC processor, wherein the memory is configurable to store filter weight data corresponding to the associated MAC processor.

9. The integrated circuit of claim 8 wherein:
the memory includes a plurality of memory banks, each bank is configurable to store filter weight data for each execution cycle of the execution sequence.

10. An integrated circuit comprising:
a plurality MAC processors, interconnected into a linear pipeline, configurable to process input data during a plurality of execution cycles of an execution sequence, wherein each MAC processor of the plurality of the MAC processors includes:
  a multiplier circuit to (i) receive first input data at a first input and (ii) receive multiplier weight data at a second input, (iii) multiply first input data by multiplier weight data to generate product data, and (iv) output the product data,
  an accumulator circuit, coupled to the multiplier circuit of the associated MAC processor, to (i) receive accumulation data at a first input, (ii) receive the product data output by the associated multiplier circuit, (iii) add the accumulation data and the product data output by the associated multiplier circuit to generate second accumulation data, and (iv) output the second accumulation data via an output of the accumulation circuit, and
  an accumulation data path to couple the output of the accumulation circuit of the associated MAC processor to the first input thereof;
a plurality of rotate input data paths, wherein each rotate input data path couples two sequential MAC processors of the linear pipeline including the first input of the multiplier circuit of a first MAC processor of sequential MAC processors to the first input of the multiplier circuit of the immediately following MAC processor of the associated sequential MAC processors of the linear pipeline;
a plurality of rotate accumulation data paths, wherein each rotate accumulation data path couples two sequential MAC processors of the linear pipeline including the output of the accumulator circuit of a first MAC processor of sequential MAC processors to the first input of the accumulator circuit of the immediately following MAC processor of the associated sequential MAC processors of the linear pipeline;
wherein each rotate input data path is configurable to provide rotate input data from a first MAC processor of sequential MAC processors to the immediately following MAC processor of the associated sequential MAC processors thereby forming a first configurable serial circular path, including the plurality of MAC processors of the linear pipeline, via the plurality of rotate input data paths; and
wherein each rotate accumulation data path is configurable to provide rotate accumulation data from the first MAC processor of sequential MAC processors to the immediately following MAC processor of the associated sequential MAC processors thereby forming a second configurable serial circular path, including the plurality of MAC processors of the linear pipeline, via the plurality of rotate accumulation data paths.

11. The integrated circuit of claim 10 wherein:
each MAC processor includes circuitry to responsively connect (1) the rotate input data path between each of the sequential MAC processors of the linear pipeline or (2) the rotate accumulation data path between each of the sequential MAC processors of the linear pipeline.

12. The integrated circuit of claim 10 wherein:
each MAC processor of the plurality of the MAC processors further includes a multiplexer having (i) a first input connected to an output of the rotate input data path from the immediately preceding MAC processor, (ii) a second input connected to a shift in data path of the linear pipeline, and (iii) and output coupled to the first input of the multiplier circuit of the associated MAC processor.

13. The integrated circuit of claim 10 wherein:
each MAC processor of the plurality of the MAC processors further includes a multiplexer having (i) a first input connected to an output of the rotate accumulation data path from the immediately preceding MAC processor, (ii) a second input connected to the output of the accumulator circuit of the associated MAC processor, and (iii) and output coupled to the first input of the accumulator circuit of the associated MAC processor.

14. The integrated circuit of claim 10 wherein:
each MAC processor of the plurality of the MAC processors further includes:
a first multiplexer having (i) a first input connected to an output of the rotate input data path from the immediately preceding MAC processor, (ii) a second input connected to a shift in data path of the linear pipeline, and (iii) and output coupled to the first input of the multiplier circuit of the associated MAC processor; and
a second multiplexer having (i) a first input connected to an output of the rotate accumulation data path from the immediately preceding MAC processor, (ii) a second input connected to the output of the accumulator circuit of the associated MAC processor, and (iii) and output coupled to the first input of the accumulator circuit of the associated MAC processor.

15. The integrated circuit of claim 10 wherein:

each MAC processor of the plurality of the MAC processors further includes an accumulation register disposed in the accumulation data path of the associated MAC processor between the output of the accumulation circuit of the associated MAC processor and the first input thereof.

16. The integrated circuit of claim 15 wherein:

accumulation register, in operation, stores the second accumulation data output from the accumulation circuit of the associated MAC processor on a first execution cycle and the accumulator circuit inputs second accumulation data at the first input as accumulation data on an execution cycle that follows the first execution cycle.

17. The integrated circuit of claim 15 wherein:

after a multiply-accumulate operation, the accumulation register of each MAC processor stores a different second accumulation data output from the accumulation circuit of the associated MAC processor.

18. The integrated circuit of claim 10 wherein:

each MAC processor of the plurality of the MAC processors further includes an input data register connected to an output of the rotate input data path to store rotate input data provided from the immediately preceding MAC processor of the plurality of the MAC processors of the linear pipeline, via the associated rotate input data path, thereby forming a circular serial shift path between the plurality of MAC processors of the linear pipeline.

19. The integrated circuit of claim 10 wherein:

each MAC processor of the plurality of the MAC processors further includes an input data register disposed between the first input of the multiplier circuit of the first MAC processor and the first input of the multiplier circuit of the second MAC processor of each associated pair of MAC processors to store rotate input data provided to the first MAC processor after a multiply-accumulate operation of the plurality of the MAC processors of the linear pipeline.

20. The integrated circuit of claim 10 wherein:

each MAC processor of the plurality of the MAC processors further includes an input data register to store rotate input data after a multiply-accumulate operation of the plurality of the MAC processors of the linear pipeline.

* * * * *